(12) United States Patent
Yamazaki et al.

(10) Patent No.: US 8,218,899 B2
(45) Date of Patent: Jul. 10, 2012

(54) IMAGE PROCESSING DEVICE, IMAGE PROCESSING METHOD, AND IMAGE PROCESSING PROGRAM

(75) Inventors: Akio Yamazaki, Shiojiri (JP); Goro Ishida, Jakarta (ID); Kosuke Shingai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 927 days.

(21) Appl. No.: 12/200,691

(22) Filed: Aug. 28, 2008

(65) Prior Publication Data

US 2009/0060394 A1    Mar. 5, 2009

(30) Foreign Application Priority Data

Aug. 30, 2007 (JP) ................. 2007-224874

(51) Int. Cl.
 *G06K 9/36* (2006.01)
 *G06K 9/00* (2006.01)
(52) U.S. Cl. ........ 382/276; 382/118; 382/199; 382/282; 382/289; 382/291; 382/294; 382/296; 382/302
(58) Field of Classification Search .............. 382/276, 382/118, 199, 296, 282, 289, 291, 302
See application file for complete search history.

(56) References Cited

U.S. PATENT DOCUMENTS

| | | | | |
|---|---|---|---|---|
| 5,500,732 A * | 3/1996 | Ebel et al. | ...................... | 356/124 |
| 5,777,626 A * | 7/1998 | Takashima et al. | ........... | 345/443 |
| 5,877,819 A * | 3/1999 | Branson | ........................ | 348/701 |
| 6,687,420 B1 * | 2/2004 | Matsuda et al. | .............. | 382/286 |
| 6,834,127 B1 | 12/2004 | Yamamoto | | |
| 7,034,848 B2 * | 4/2006 | Sobol | ............................ | 345/620 |
| 7,346,212 B2 * | 3/2008 | Cheatle | ........................ | 382/173 |
| 7,693,304 B2 * | 4/2010 | Obrador | ....................... | 382/112 |
| 8,014,575 B2 * | 9/2011 | Weiss et al. | ................... | 382/128 |
| 2001/0008562 A1 * | 7/2001 | Rogers et al. | ................. | 382/132 |
| 2003/0012414 A1 * | 1/2003 | Luo | ................................ | 382/118 |
| 2005/0231510 A1 * | 10/2005 | Santos | ......................... | 345/473 |
| 2006/0215924 A1 * | 9/2006 | Steinberg et al. | ............. | 382/254 |
| 2007/0115371 A1 * | 5/2007 | Enomoto et al. | ........... | 348/222.1 |
| 2007/0273934 A1 | 11/2007 | Shirahata et al. | | |

FOREIGN PATENT DOCUMENTS

| | | |
|---|---|---|
| CN | 1947155 A | 4/2007 |
| JP | 2001211315 A | 8/2001 |
| JP | 2004-318204 | 11/2004 |

OTHER PUBLICATIONS

"Brief Discussion on the Region Selection Function of the Photoshop" pp. 4-6, Oct. 2005 (with English translation).

* cited by examiner

*Primary Examiner* — Michael A Newman
(74) *Attorney, Agent, or Firm* — DLA Piper LLP (US)

(57) ABSTRACT

An image processing device that executes deformation of an image. A candidate area setting unit sets candidate areas, each of which includes a specific image, on a target image used as a target for a deformation process. An exclusion determination unit, when there is a candidate area that partially extends off a cropped image that is clipped from the target image through predetermined cropping, excludes the candidate area, which at least partially extends off the cropped image, from the target for the deformation process. A deformation processing unit performs deformation of an image on the candidate areas other than the excluded candidate areas.

10 Claims, 30 Drawing Sheets

FIG. 10A    FIG. 10B
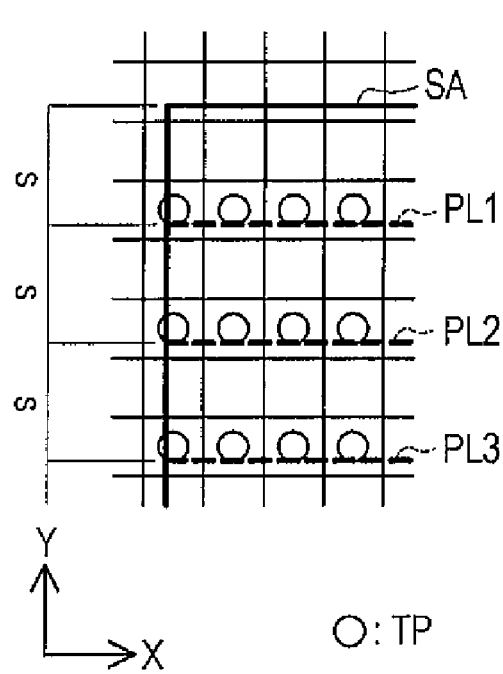
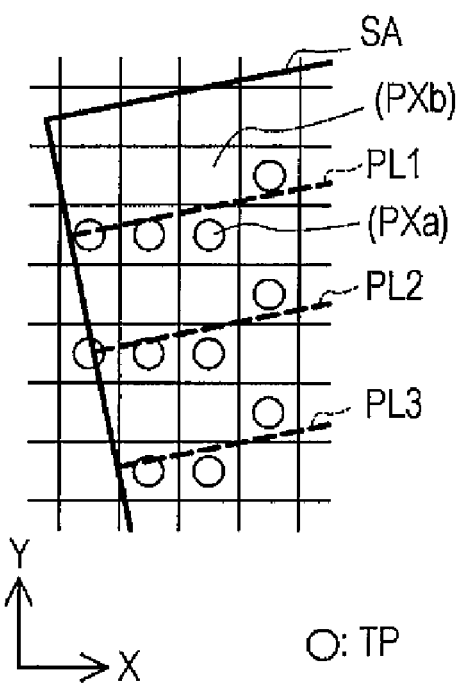
FIG. 11
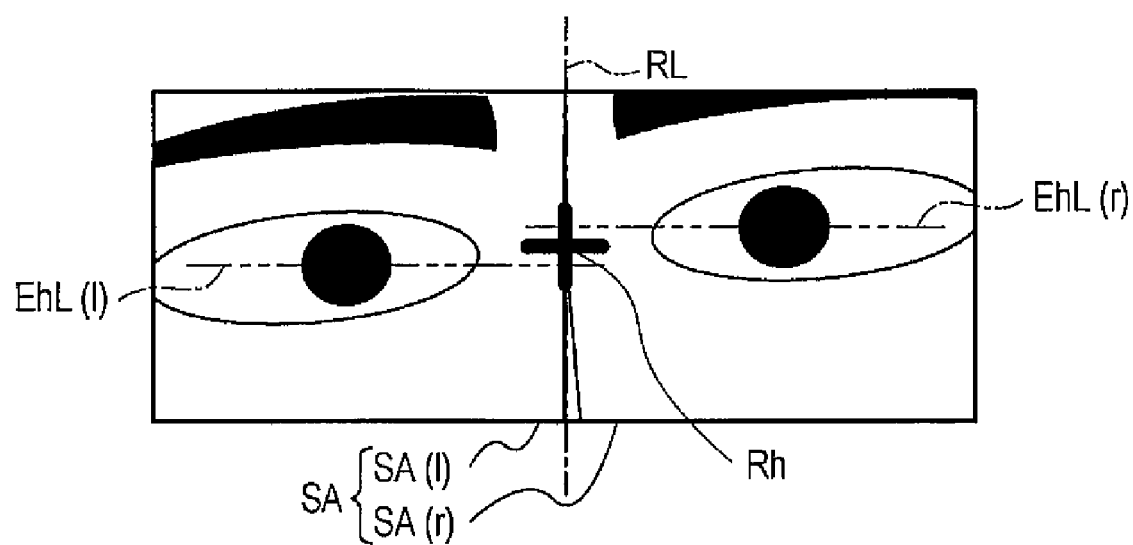

|     | H  | V  |
|-----|----|----|
| D11 | 7  | 14 |
| D21 | 7  | 14 |
| D31 | -7 | 14 |
| D41 | -7 | 14 |
| D12 | 7  | 0  |
| D22 | 0  | 0  |
| D32 | 0  | 0  |
| D42 | -7 | 0  |

430

| INCLINATION OF FACE AREA | UPPER LIMIT OF SIZE (NUMBER OF PIXELS) |
|---|---|
| 0 | m1 |
| β1 | m2 |
| β2 | m3 |
| βL | m4 |

$(0 < β1 < β2 < βL, \ m4 < m3 < m2 < m1)$

IMAGE PROCESSING DEVICE, IMAGE PROCESSING METHOD, AND IMAGE PROCESSING PROGRAM

CROSS-REFERENCE TO RELATED APPLICATIONS

This application claims the benefit of priority under 35 USC 119 of Japanese application no. 2007-224874, filed on Aug. 30, 2007, which is hereby incorporated by reference.

BACKGROUND

1. Technical Field

The invention relates to an image processing technology for executing deformation of an image.

2. Related Art

An image processing technology for deforming a digital image has been known, which is, for example, described in JP-A-2004-318204. JP-A-2004-318204 describes an image processing that deforms the shape of a face in such a manner that portion of an area on the image of the face (an area that shows the image of a cheek) is set as a correction area, the correction area is divided into a plurality of small areas in accordance with a predetermined pattern, and the image is enlarged or reduced by a scaling factor set for each small area.

In this existing image processing for image deformation, because enlargement or reduction of an image is performed for each of a plurality of small areas by a scaling factor that is set for each of the small areas, the processing is complicated. In addition, the above existing image processing for image deformation is exclusively configured for correcting the line of a cheek, and it is difficult to be used for other various deformation modes. Incidentally, a cropping process that clips part of an area from original image data is sometimes performed on image data. When a human face is included in image data targeted for image processing, an image area that includes the face may extend off a cropped image that is clipped through cropping. If an image area that is at least partially trimmed by cropping is targeted for image deformation in this manner, a natural deformation result is not always obtained, so that it is inappropriate. Thus, some measures need to be taken for handling the above image area that is partially trimmed by cropping; however, there has been no method for appropriately handling the image area so far.

SUMMARY

An advantage of some aspects of the invention is that it easily and effectively implements image processing for image deformation that is available in various deformation modes. Another advantage of some aspects of the invention is that it performs appropriate image deformation when an image area that can be a target for image deformation extends off an area that is clipped through cropping. Another advantage of some aspects of the invention is that it reduces an operating load of an image processing device with a reduced processing load and reduced memory consumption for image processing.

An aspect of the invention provides an image processing device that executes deformation of an image and that includes a candidate area setting unit, an exclusion determination unit and a deformation processing unit. The candidate area setting unit sets candidate areas, each of which includes a specific image, on a target image used as a target for deformation process. The exclusion determination unit determines an area, which is excluded from the target for the deformation process, for the set at least one candidate area in accordance with a predetermined exclusion condition. The deformation processing unit performs deformation of an image on the candidate areas other than the candidate areas determined to be excluded by the exclusion determination unit. In the existing art, when a human face is detected, the detected face (the area of a portion of a face) is simply corrected to be deformed. Therefore, when a plurality of faces are present in image data, all the faces will be a target for deformation. However, when the deformation process is always performed on all the faces, it results in increases in amounts of processing and memory utilization for a buffer, or the like, at the time of computing. In particularly, an increase in memory consumption or processing load owing to the above deformation process becomes a large burden on an image processing apparatus called a multifunctional printer having multiple functions, such as printer, copy and scanner functions and, hence, interferes with operation of the image processing apparatus. However, according to the aspect of the invention, because, among the candidate areas used as a target for deformation process and present on the target image, only the candidate areas, other than the areas excluded on the basis of a predetermined exclusion condition, are used as a target for deformation process, increases in memory consumption and amounts of processing involved in a deformation process are appropriately suppressed.

The exclusion determination unit may employ various exclusion conditions. In one example, the exclusion determination unit, when there is a candidate area that partially extends off a cropped image that is clipped from the target image through predetermined cropping, excludes the candidate area, which at least partially extends off the cropped image, from the target for the deformation process. When there is a candidate area that partially or entirely extends off the cropped image, in order to perform the deformation process on a specific image included in that candidate area, it is necessary to reset the candidate area that includes that specific image. Such a resetting process places a large burden on the image processing device. As described above, by excluding the candidate area that at least partially extends off the cropped image from a target for deformation process, increases in memory consumption and amounts of processing involved in the deformation process are suppressed. In this way, appropriate processing is provided for a case in which an image region that can be a target for image deformation process partially extends off a region that is clipped through cropping.

Specifically, the exclusion determination unit may acquire information of a plurality of aspect ratios used for image output and may exclude a candidate area, which at least partially extends off an image region that is common to cropped images clipped through cropping on the basis of the acquired aspect ratios, from the target for the deformation process. The image output includes printing and image display. According to the above configuration, when the target image is able to be output with various aspect ratios, only the candidate area that is entirely included in a possible output image can always be a target for the deformation process. Thus, there will be no candidate area on which the deformation process is performed or not performed depending on a difference in aspect ratio for output.

Alternatively, the exclusion determination unit may exclude a candidate area, which at least partially extends off a cropped image that is clipped on the basis of a cropping command that is externally entered, from the target for the deformation process. That is, a candidate area, which partially extends off or is entirely located outside of a cropped image that is clipped through cropping that is selectively instructed by the user, is also excluded from the target for the deformation process. As a result, the resetting process of the candidate area is avoided to thereby suppress memory consumption and processing load.

In another example, the exclusion determination unit may acquire the size of each specific image and the inclination of each specific image on the target image, may determine whether the acquired size falls within a size upper limit that is determined in accordance with the acquired inclination, and may exclude a candidate area, which includes the specific image of which the acquired size exceeds the corresponding size upper limit, from the target for the deformation process. The memory utilization required for deforming the candidate area that includes the specific image depends not only simply on the size of the specific image but also on the inclination of that specific image. According to the above configuration, because the candidate area, which includes the specific image that exceeds an allowable size in accordance with the inclination of the specific image, is excluded from the target for the deformation process, increases in memory consumption and processing load involved in the deformation process are appropriately suppressed.

Specifically, the exclusion determination unit determines whether the acquired size falls within the corresponding size upper limit by referencing size upper limit restriction information that defines a size upper limit such that the size upper limit decreases as the inclination approaches to a predetermined upper limit angle. Depending on the content of the deformation process performed by the deformation processing unit, memory utilization required for deforming the candidate area that includes the specific image may increase as the inclination of the specific image approaches a predetermined upper limit angle. According to the above configuration, by strictly setting the size upper limit for a specific image, of which the inclination is large, that tends to consume a large amount of memory at the time of deformation process, the specific image is more likely to be excluded from the target for the deformation process. Thus, increases in memory consumption and processing load involved in the deformation process are suppressed.

In another example, when there is an overlap between the candidate areas, the exclusion determination unit may exclude one or more candidate areas from the target for the deformation process so as to eliminate the overlap. In order to perform the deformation process on each of the overlapped candidate areas, it is necessary to save the deformed image data regarding one of the areas to deform the one of the areas first and then deform the other area. This greatly increases memory utilization. However, according to the above configuration, because the predetermined candidate areas are excluded from the target for the deformation process so as to eliminate the overlap between the candidate areas, memory consumption is significantly suppressed.

Various specific methods may be used to eliminate an overlap between the candidate areas. The exclusion determination unit may repeat a process to select one candidate area from among a plurality of the candidate areas in accordance with a predetermined order of selection and, when another candidate area overlaps the selected one candidate area, exclude the another candidate area from the target for the deformation process to thereby eliminate the overlap between the candidate areas. More specifically, the exclusion determination unit may select one candidate area from among the remaining candidate areas in descending order of the size of the specific image. That is, because a large-size specific image may presumably be an important image portion for the user, the large-size specific image is preferentially selected and another candidate area that overlaps the large-size specific image is excluded. As a result, on the target image, the candidate areas that do not overlap each other and that respectively have relatively large-size specific images are left as the target for deformation.

Alternatively, the exclusion determination unit may select one candidate area in accordance with a command, to select a candidate area, which is externally entered. That is, the candidate area is selected in accordance with a selection command issued by the user, and another candidate area that overlaps this candidate area is excluded from the target for the deformation process. As a result, the candidate area selected by the user preferentially becomes a target for the deformation process.

In another example, the exclusion determination unit may determine whether the inclination of each specific image on the target image belongs to a predetermined angular range and may exclude a candidate area, of which the inclination of the specific image falls outside the predetermined angular range, from the target for the deformation process. That is, a certain angular range, which may be expected as the inclination of each specific image, is determined in advance, and a candidate area that includes the specific image of which the inclination falls outside the angular range is excluded. As a result, memory consumption and processing load required for the deformation process is adequately reduced, and erroneous deformation of an image portion, which is not a specific image, is prevented.

To perform deformation process on each of the candidate areas on the target image, if the top sides of the specific images of the candidate areas are oriented randomly, results in increases in processing load or memory consumption. Thus, the deformation processing unit may perform the deformation process on the candidate areas, of which the top sides of the specific images are substantially the same, from among the candidate areas. The exclusion determination unit, when there are candidate areas of which the top sides of the specific images are different from each other, may exclude a candidate area, other than the candidate area(s) of which the top side of the specific image is oriented in a direction in which the number of candidate areas having the specific images of which the top sides are oriented in the same direction is maximal, from the target for the deformation process. According to the above configuration, the deformation process is performed on the limited candidate areas of which the top side of the specific image is substantially oriented in the same direction. As a result, memory consumption and processing load are adequately reduced, and the specific image, which is presumably important on the target image, is set as a target for deformation.

Furthermore, the exclusion determination unit, when there are a plurality of directions in which the number of candidate areas of which the top sides are substantially oriented in the same direction is maximal, may exclude a candidate area, other than the candidate areas of which the top side of each specific image is oriented in a direction, in which the candidate areas having the maximum-size specific image are oriented, among the plurality of directions, from the target for the deformation process. Furthermore, in addition to or in place of the above configuration, the exclusion determination unit, when there are a plurality of directions in which the number of candidate areas of which the top side is substantially oriented in the same direction is maximal, may exclude a candidate area, other than the candidate areas of which the top side of each specific image is oriented in one direction that is selected from among the plurality of directions in a predetermined order of priority, from the target for the deformation process. For example, when there are a plurality of directions in which the number of candidate areas having the top sides that are oriented substantially in the same direction is maximal and, among the plurality of directions, there are a plurality of directions in which the candidate area having the maximum-size specific image is oriented, one direction is selected in accordance with the above order of priority. When two or three determination criteria are provided in this way, the deformation processing unit is able to reliably perform the deformation process only on the candidate areas of which the specific images are substantially oriented in a certain one direction.

In yet another example, the exclusion determination unit, when the number of candidate areas exceeds a predetermined threshold, may select a candidate area of which the number falls within the threshold in accordance with the size of the specific image and may exclude a non-selected candidate area from the target for the deformation process. Because processing load naturally increases as the number of candidate areas used as a target for deformation process increases, the number of candidate areas used as a target for the deformation process is set within a predetermined number (threshold). For example, when the candidate areas of which the number falls within the threshold are selected in descending order of the size of the specific image, the specific image, which is presumably more important on the target image, can be set as a target for deformation.

The candidate area setting unit may detect a face image from the target image as the specific image and may set a candidate area for each face image on the basis of the detected face image. In this manner, it is possible to perform the deformation process on the candidate areas, other than the candidate areas excluded in accordance with the above described exclusion condition, from among the candidate areas that are set on the basis of the respective face images detected from the target image. The deformation processing unit may arrange a plurality of dividing points in candidate areas, which serve as a target for deformation, may divide each candidate area, which serves as a target for deformation, into a plurality of small areas using straight lines that connect the dividing points and may perform deformation of an image in such a manner that at least one position of the dividing point is moved to deform the small areas. In this way, because image deformation may be performed so that dividing points are arranged in the candidate areas that become a target for deformation in the end and then the arranged dividing points are moved, image processing for image deformation corresponding to various deformation modes is easily and efficiently implemented. Furthermore, the image processing device may include a printing unit that prints out the target image on which the above image deformation is performed. In this manner, printing of an image on which image deformation corresponding to various deformation modes is performed is easily and effectively implemented.

The technical idea regarding the aspects of the invention is described as an image processing device; however, an aspect of the invention may also provide an image processing method that includes steps corresponding to units of the image processing device, or may further provide a computer readable recording medium that stores a computer program, executable on a computer, that includes instructions for implementing functions corresponding to the units of the image processing device.

BRIEF DESCRIPTION OF THE DRAWINGS

The invention is described with reference to the accompanying drawings, wherein like numbers reference like elements.

FIG. 10A and FIG. 10B are views, each of which illustrates one example of a method of selecting evaluation target pixels.

FIG. 11 is a view that illustrates one example of a method of determining a height reference point.

DESCRIPTION OF EXEMPLARY EMBODIMENTS

Figure 1:
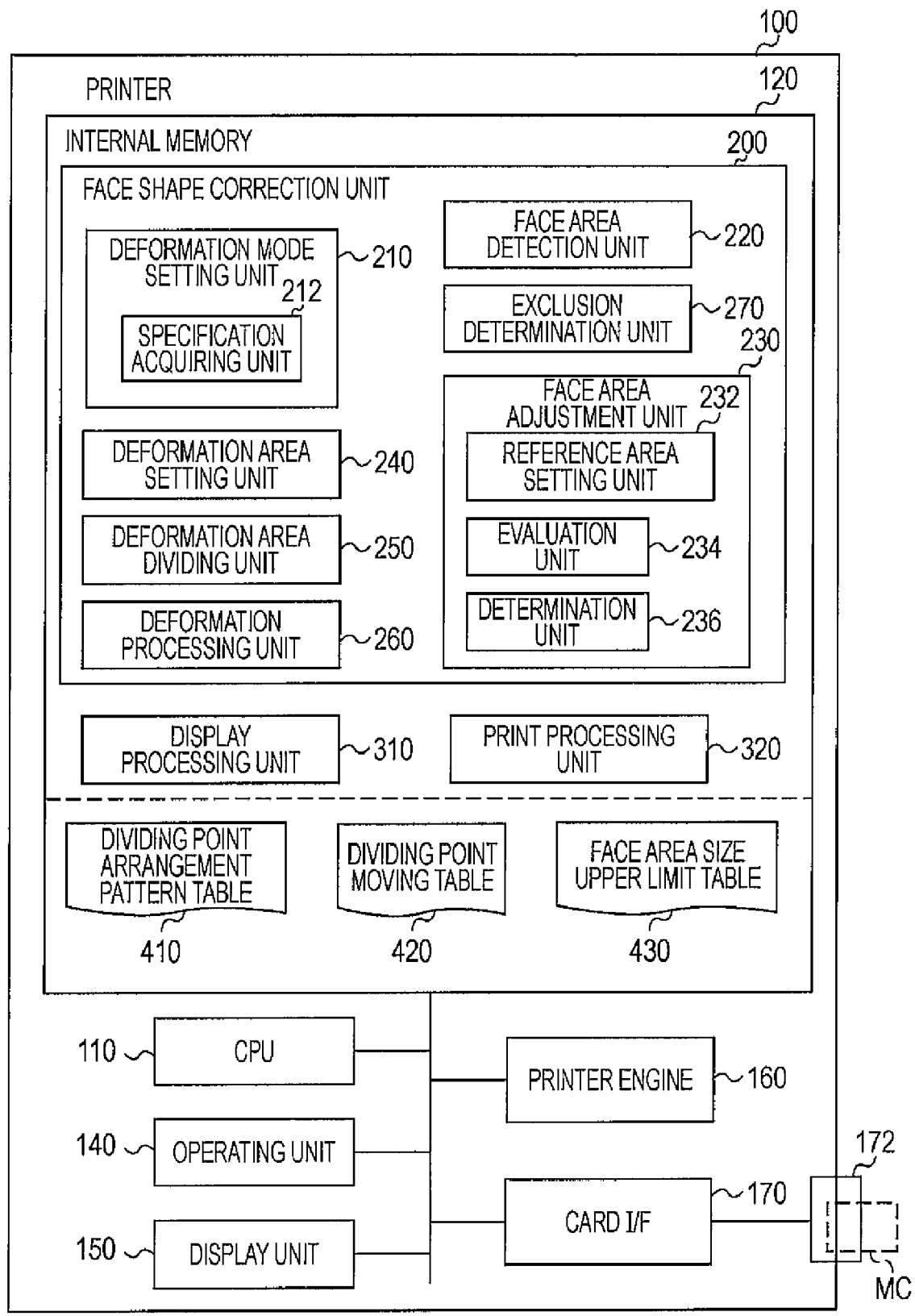
FIG. 1 is a view that schematically illustrates the configuration of a printer, which serves as an image processing device.

An example embodiment of the invention is now described in accordance with the following order.
(1) Schematic Configuration of Image Processing Device
(2) Face Shape Correction Printing Process
(2-1) From Selection of Target Image Until Setting of Deformation Area
(2-2) Deformation Area Exclusion Process
(2-3) From Division of Deformation Area Until Printing Process
(3) Additional Description and Other Alternative Example Embodiments
(4) Resetting of Deformation Area
(1) Schematic Configuration of Image Processing Device FIG. 1 schematically illustrates the configuration of a printer 100, which serves as one example of an image processing device according to the aspects of the invention. The printer 100 is a stand-alone color ink jet printer that prints out an image on the basis of image data acquired from a recording medium (for example, a memory card MC, or the like), which is so-called direct print. The printer 100 is a multifunctional apparatus that has copy and/or scanner functions in addition to a printer function. In this regard, the printer 100 may be termed as a so-called multifunctional printer.

The printer 100 includes a CPU 110, an internal memory 120, an operating unit 140, a display unit 150, a printer engine 160 and a card interface (card I/F) 170. The CPU 110 controls portions of the printer 100. The internal memory 120 is, for example, formed of ROM and/or RAM. The operating unit 140 is formed of buttons and/or a touch panel. The display unit 150 is formed of a liquid crystal display. The printer 100 may further include an interface that performs data communication with other devices (for example, a digital still camera). The components of the printer 100 are connected through a bus with one another.

The printer engine 160 is a printing mechanism that performs printing on the basis of print data. The card interface 170 transmits or receives data to or from the memory card MC that is inserted in a card slot 172. In the present example embodiment, the memory card MC contains image data as RGB data, and the printer 100 acquires the image data stored in the memory card MC through the card interface 170.

The internal memory 120 contains a face shape correction unit 200, a display processing unit 310 and a print processing unit 320. The face shape correction unit 200 is a computer program that executes a face shape correction process, which will be described later, under a predetermined operating system. The display processing unit 310 is a display driver that controls the display unit 150 to display a processing menu or a message on the display unit 150. The print processing unit 320 is a computer program that generates print data using image data, controls the printer engine 160 and then executes printing of an image on the basis of the print data. The CPU 110 reads out these programs from the internal memory 120 and then executes the programs to thereby implement the functions of these units.

The face shape correction unit 200 includes, as a program module, a deformation mode setting unit 210, a face area detection unit 220, a face area adjustment unit 230, a deformation area setting unit 240, an exclusion determination unit 270, a deformation area dividing unit 250 and a deformation processing unit 260. The deformation mode setting unit 210 includes a specification acquiring unit 212. The face area adjustment unit 230 includes a reference area setting unit 232, an evaluation unit 234 and a determination unit 236. The functions of these units are described together later with the face shape correction printing process.

The internal memory 120 also contains a face area size upper limit table 430, a dividing point arrangement pattern table 410 and a dividing point moving table 420. The contents of the face area size upper limit table 430, dividing point arrangement pattern table 410 and dividing point moving table 420 are described together later with the face shape correction printing process.

(2) Face Shape Correction Printing Process

The printer 100 prints out an image on the basis of image data stored in the memory card MC. As the memory card MC is inserted into the card slot 172, a user interface that includes a list of images stored in the memory card MC is displayed on the display unit 150 by the display processing unit 310.

Figure 2:
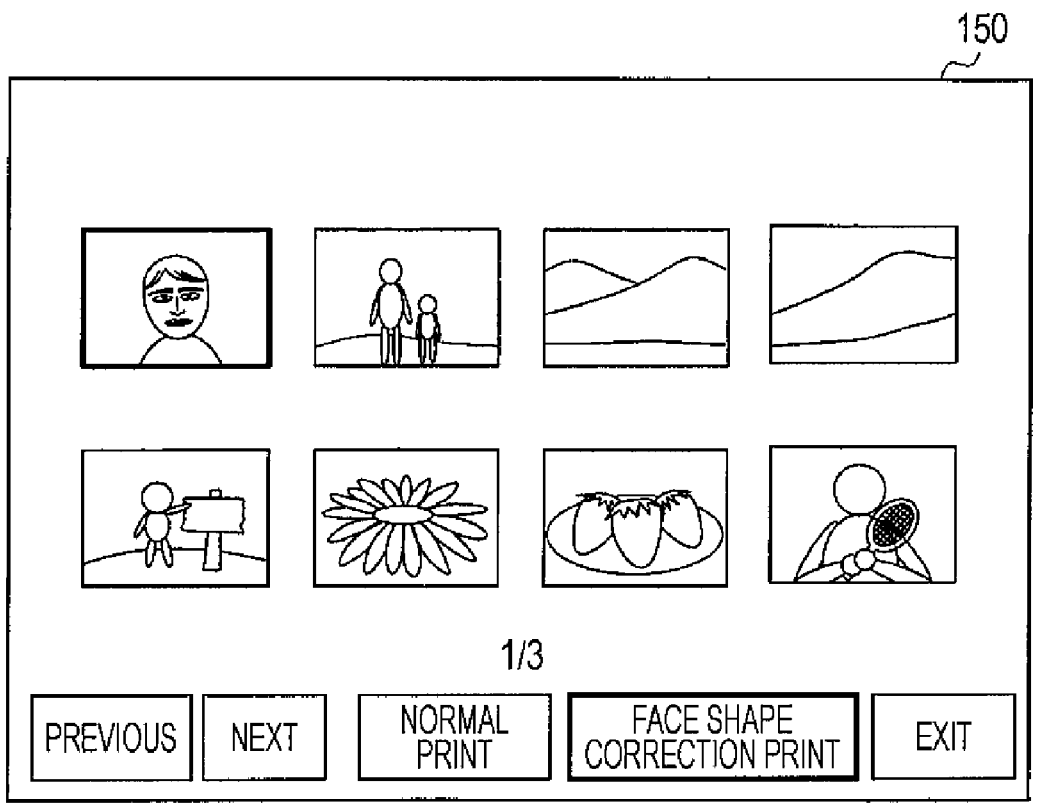
FIG. 2 is a view that illustrates one example of a user interface that includes a list of images.

FIG. 2 illustrates one example of a user interface that includes a list of images. A list of images is displayed using thumbnail images included in the image data (image file) that are stored in the memory card MC. The printer 100, when the user selects an image (or multiple images) and in addition selects a normal print button using the user interface shown in FIG. 2, executes a normal printing process in which the printer 100 prints out the selected image as usual. On the other hand, when the user selects an image (or multiple images) and in addition selects a face shape correction print button using the user interface, the printer 100 executes a face shape correction printing process on the selected image, in which the printer 100 corrects the shape of a face in the image and then prints out the corrected image.

Figure 3:
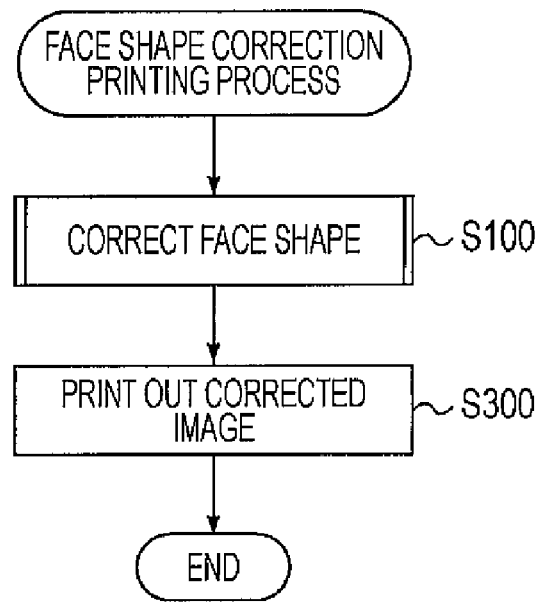
FIG. 3 is a flowchart of a face shape correction printing process that is performed by the printer.

FIG. 3 is a flowchart of a face shape correction printing process that is performed by the printer 100 according to the present example embodiment. In step S100 (hereinafter, "step" is omitted), the face shape correction unit 200 (FIG. 1) executes a face shape correction process. The face shape correction process is a process in which, when a face is present in an image, it is determined on the basis of a predetermined condition whether a correction is performed on the face, and, when it is determined to perform correction, at least part of the face (for example, the shape of a contour of a face or the shape of the eyes) is corrected.

(2-1) From Selection of Target Image Until Setting of Deformation Area

Figure 4:
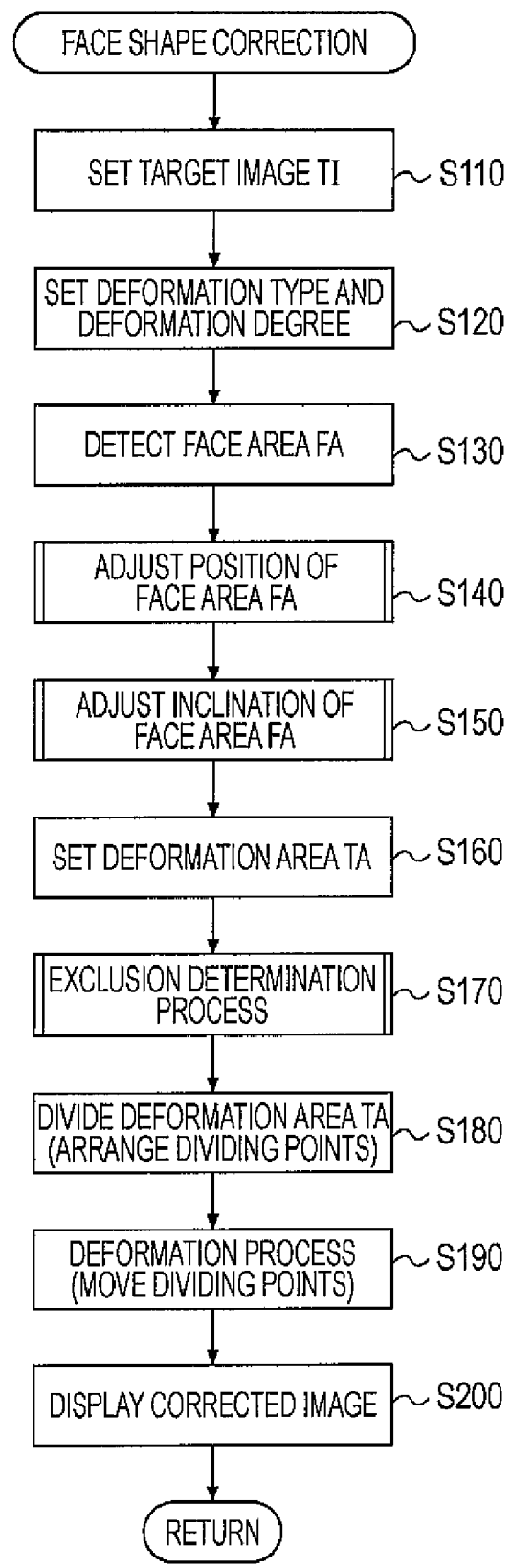
FIG. 4 is a flowchart of a face shape correction process.

FIG. 4 is a flowchart of a face shape correction process according to the present example embodiment. In S110, the face shape correction unit 200 (FIG. 1) sets a target image TI on which the face shape correction process will be executed. The face shape correction unit 200 sets the image, which is selected by the user through the user interface shown in FIG. 2, as the target image TI. The image data of the set target image TI is acquired by the printer 100 from the memory card MC through the card interface 170 and is stored in a predetermined area of the internal memory 120.

In S120 (FIG. 4), the deformation mode setting unit 210 (FIG. 1) sets the type of image deformation and the degree of image deformation for face shape correction. The deformation mode setting unit 210 instructs the display processing unit 310 to display a user interface, with which the type and degree of image deformation are set, on the display unit 150, selects the type and degree of image deformation that are specified by the user through the user interface, and then sets the type and degree of image deformation used for processing.

Figure 5:
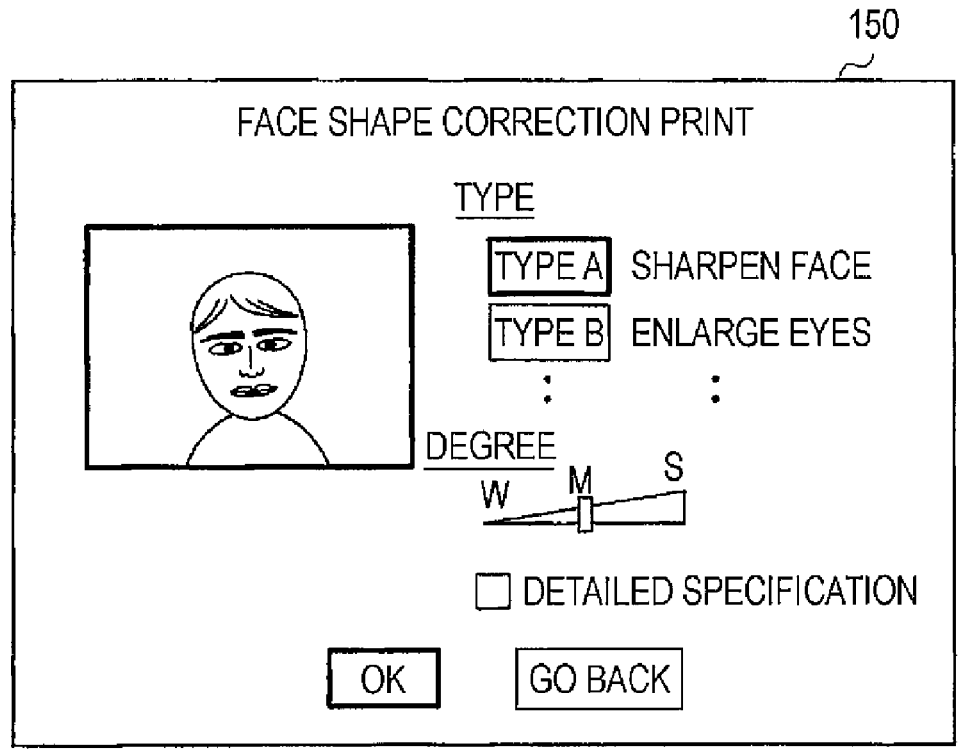
FIG. 5 is a view that illustrates one example of a user interface for setting the type and degree of image deformation.

FIG. 5 illustrates one example of a user interface for setting the type and degree of image deformation. As shown in FIG. 5, this user interface includes an interface for setting the type of image deformation. In the present example embodiment, for example, a deformation type "type A" in which the shape of a face is sharpened, a deformation type "type B" in which the shape of eyes is enlarged, and the like, are set in advance as choices. The user specifies the type of image deformation using this interface. The deformation mode setting unit 210 sets the image deformation type, which is specified by the user, as an image deformation type used for actual processing.

In addition, the user interface shown in FIG. 5 includes an interface for setting the degree (extent) of image deformation. As shown in FIG. 5, in the present example embodiment, the degree of image deformation is set in advance as three choices consisting of three steps Strong (S), Middle (M) and Weak (W). The user specifies the degree of image deformation using this interface. The deformation mode setting unit 210 sets the degree of image deformation, which is specified by the user, as the degree of image deformation used for actual processing.

In the present example embodiment, the user is able to specify a deformation mode in detail. When the checkbox provided on the user interface shown in FIG. 5 is checked to indicate that the user desires to specify the deformation mode in detail, a detailed specification of the deformation mode may be performed by the user. However, in the following description, it is assumed that the deformation type "type A" in which the shape of a face is sharpened is set as the type of image deformation, the degree "Middle" is set as the degree of image deformation, and a detailed specification is not desired by the user.

In S130, the face area detection unit 220 (FIG. 1) detects a face area (face image) FA in the target image TI. Here, the face area FA means an image area on the target image TI and includes at least part of an image of a face. The face area FA may be regarded as an example of a specific image according to the aspects of the invention. The detection of the face area FA using the face area detection unit 220 is executed by means of a known face detection method, such as a method through pattern matching using, for example, templates (refer to JP-A-2004-318204).

Figure 6:
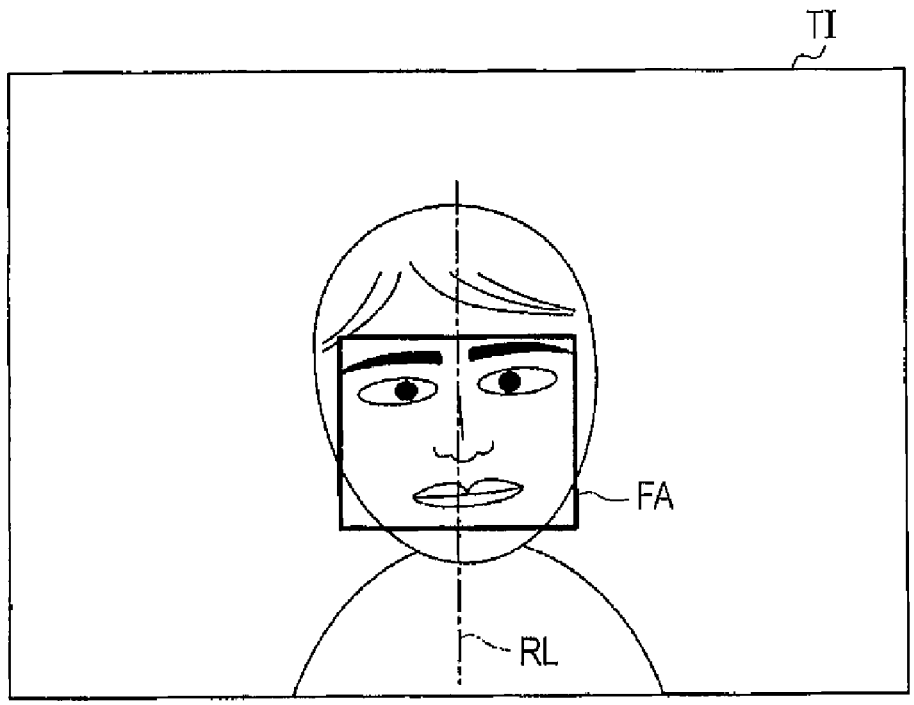
FIG. 6 is a view that illustrates one example of a detected face area.

FIG. 6 illustrates one example of a detected face area FA. As shown in FIG. 6, according to the face detection method used in the present example embodiment, a rectangular area that includes images of eyes, nose, and mouth on the target image TI is detected as the face area FA. The face area FA may have a square shape. The reference line RL shown in FIG. 6 defines the height direction (vertical direction) of the face area FA and indicates the center of the width direction (lateral direction) of the face area FA. That is, the reference line RL is a straight line that passes through the center of gravity of the rectangular face area FA and is parallel to the rectangular boundary lines that substantially extend along the vertical direction of the face. In S130, when no face area FA is detected, the user is notified to that effect through the display unit 150. In this case, normal printing that does not accompany face shape correction may be performed or a detection process to detect a face area FA may be performed again using another face detection method.

Here, the known face detection method, such as a method through pattern matching using templates, generally does not minutely detect the position or inclination (angle) of the entire face or portions of a face (eyes, a mouth, or the like) but sets an area in the target image TI, in which it may be regarded that the image of a face is probably included, as the face area FA. On the other hand, the printer 100 according to the present example embodiment sets an area (deformation area TA) on which an image deformation process for face shape correction is performed on the basis of the detected face area FA, which will be described later. Because generally the image of a face highly attracts viewer's attention, an image on which face shape correction has been performed may be unnatural depending on the relationship in position and/or angle between the set deformation area TA and the image of a face. In order to achieve more natural and desirable face shape correction, position adjustment and inclination adjustment described below are performed on the face area FA that has been detected in S130.

In S140, the face area adjustment unit 230 (FIG. 1) adjusts the position, in the vertical direction, of the face area FA that has been detected in S130. The adjustment of position of the face area FA in the vertical direction means resetting the face area FA in the target image TI by adjusting the position of the face area FA along the reference line RL (see FIG. 6).

Figure 7:
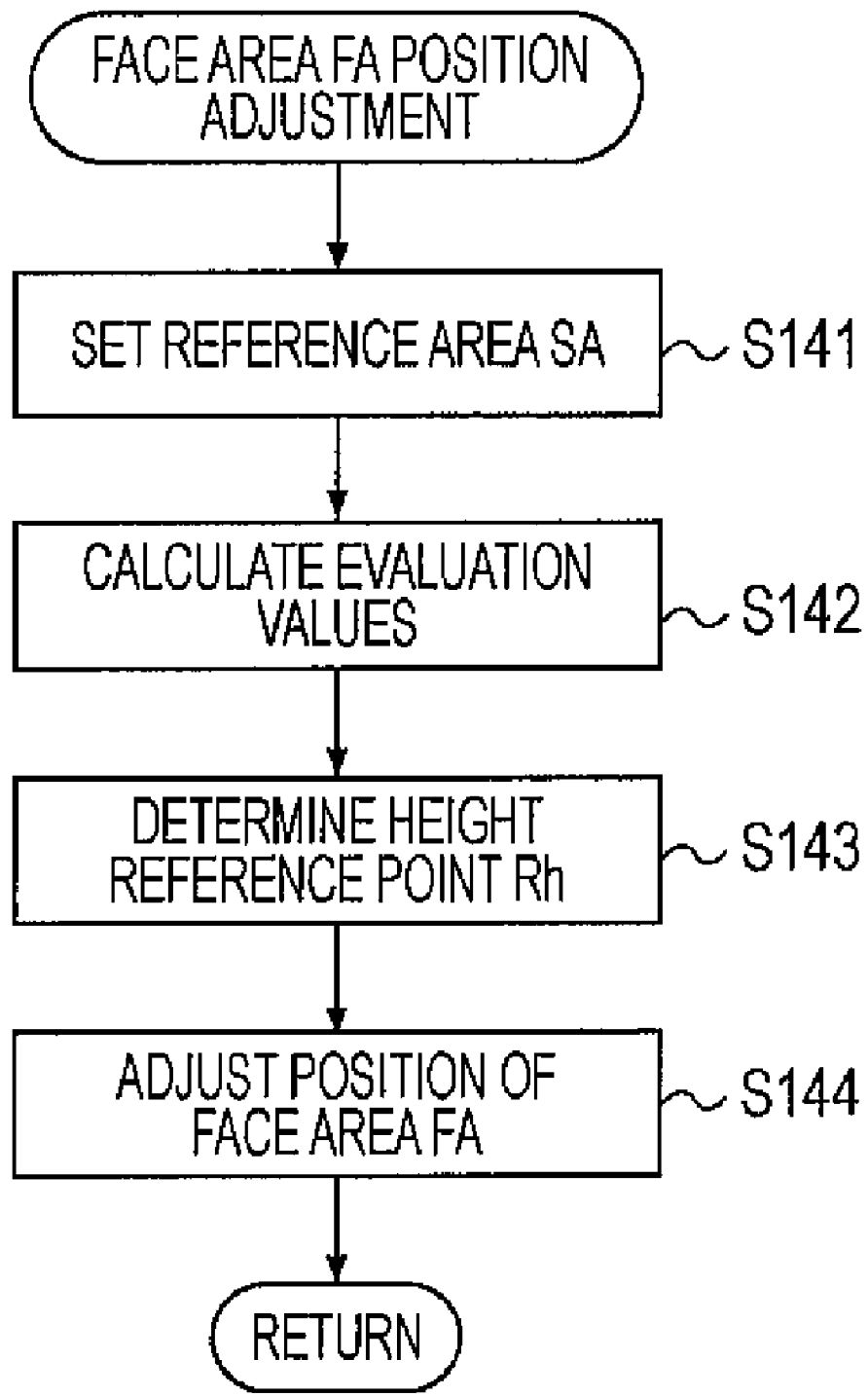
FIG. 7 is a flowchart of a position adjustment process in which the position of the face area in the height direction is adjusted.

FIG. 7 is a flowchart of a position adjustment process in which the position of the face area FA in the vertical direction is adjusted. In S141, the reference area setting unit 232 (FIG. 1) sets a reference area SA. The reference area SA is an area on the target image TI and includes an image of a predetermined reference subject that is referenced when the adjustment of position of the face area FA in the vertical direction is executed. In the present example embodiment, the reference subject is set to "eyes", and the reference area SA is set to include the image of "eyes".

Figure 8:
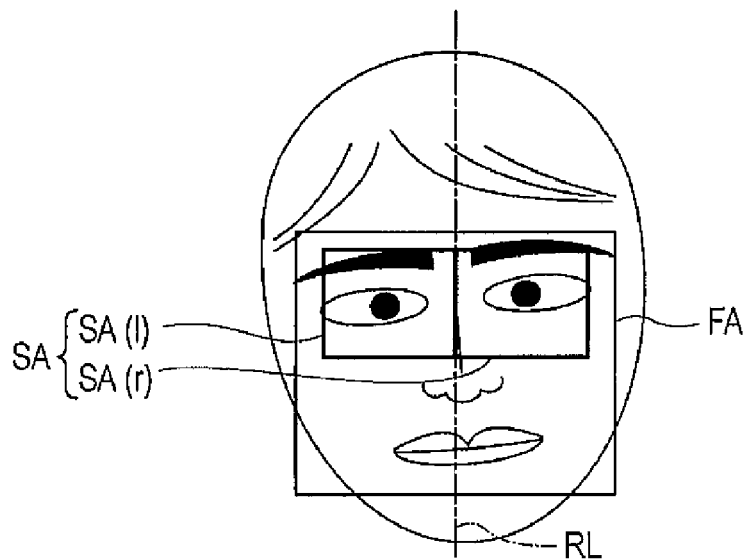
FIG. 8 is a view that illustrates one example of a specific area.

FIG. 8 is a view that illustrates one example of the reference area SA. In the present example embodiment, the reference area setting unit 232 sets the reference area SA on the basis of the relationship with the face area FA. Specifically, the reference area SA is obtained by reducing (or enlarging) the size of the face area FA by a predetermined ratio in a direction perpendicular to the reference line RL and in a direction parallel to the reference line RL and that has a predetermined positional relationship with the position of the face area FA. That is, the predetermined ratio and positional relationship are determined in advance so that the reference area SA includes the image of both eyes when the reference area SA is set on the basis of the relationship with the face area FA that is detected by the face area detection unit 220. The reference area SA is desirably set to be as small as possible in so far as the area includes the image of both eyes so as not to include a confusing image (for example, the image of hair) with the image of eyes as much as possible.

In addition, as shown in FIG. 8, the reference area SA is set to have a rectangular shape that is symmetrical with respect to the reference line RL. The reference area SA is divided by the reference line RL into a left side area ("left divided area SA(l)") and a right side area ("right divided area SA(r)"). The reference area SA is set so that one of the eyes is included in each of the left divided area SA(l) and the right divided area SA(r). In S142, the evaluation unit 234 (FIG. 1) calculates evaluation values for detecting the position of the image of each eye in the reference area SA.

Figure 9:
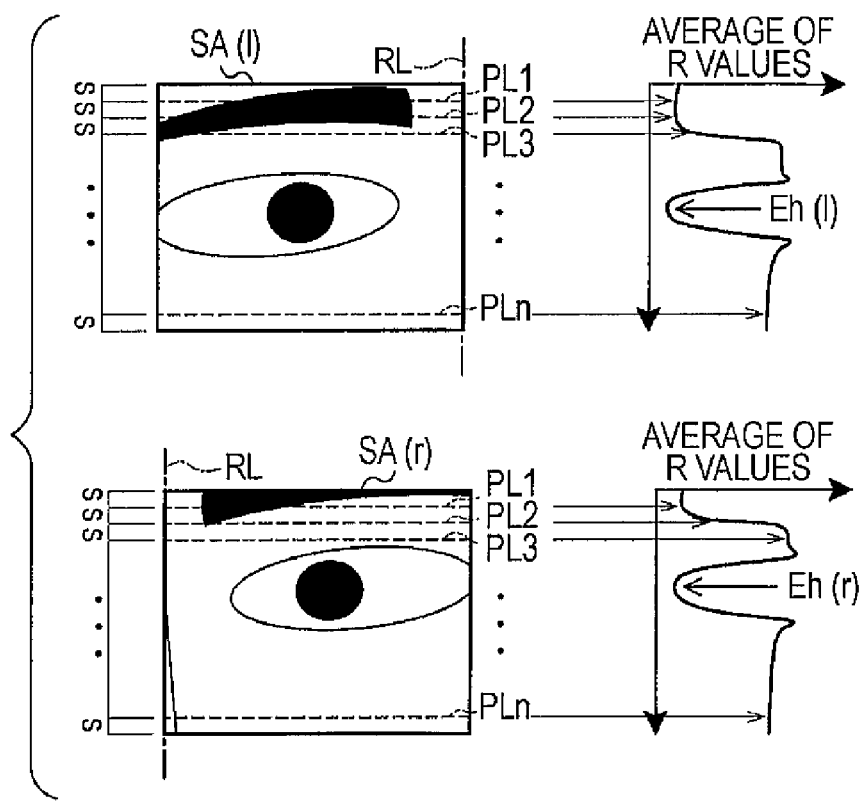
FIG. 9 is a view that illustrates one example of a method of calculating evaluation values.

FIG. 9 illustrates one example of a method of calculating evaluation values. In the present example embodiment, R values (R component values) of pixels of the target image TI, which are RGB image data, are used for calculation of the evaluation values. This is because there is a large difference in R values between the image of portion of a skin and the image of portion of an eye and, therefore, it may be expected to improve the detection accuracy of the image of an eye using R values for calculation of evaluation values. In addition, because the data of the target image TI is acquired as RGB data, evaluation values can be effectively calculated using R values. As shown in FIG. 9, calculation of evaluation values is separately performed for two divided areas (the right divided area SA(r) and the left divided area SA(l)).

The evaluation unit 234, as shown in FIG. 9, sets n straight lines ("target pixel specifying lines PL1 to PLn") perpendicular to the reference line RL within each of the divided areas (the right divided area SA(r) and the left divided area SA(l)). The target pixel specifying lines PL1 to PLn are straight lines that equally divide the height (the size along the reference line RL) of each of the divided specific areas into (n+1) parts. That is, the interval between any adjacent target pixel specifying lines PL is an equal interval s. The evaluation unit 234 selects pixels ("evaluation target pixels TP") used for calculation of evaluation values from among pixels that constitute the target image TI for each of the target pixel specifying lines PL1 to PLn.

FIGS. 10A and 10B illustrate examples of methods of selecting evaluation target pixels TP. The evaluation unit 234 selects the pixels that overlap each of the target pixel specifying lines PL from among the pixels that constitute the target image TI as the evaluation target pixels TP. FIG. 10A shows the case where the target pixel specifying lines PL are parallel to the row direction (X direction in FIG. 10A) of the pixels of the target image TI. In this case, the pixels arranged in each pixel row that overlaps each of the target pixel specifying lines PL (pixels to which symbol "○" is assigned in FIG. 10A) are selected as the evaluation target pixels TP with respect to a corresponding one of the target pixel specifying lines PL.

On the other hand, depending on a method of detecting the face area FA or a method of setting the reference area SA, the target pixel specifying lines PL may possibly be not parallel to the row direction (X direction) of the pixels of the target image TI, as shown in FIG. 10B. In such a case as well, as a rule, the pixels that overlap each of the target pixel specifying lines PL are selected as the evaluation target pixels TP with respect to each of the target pixel specifying lines PL. However, for example, as in the case of the relationship between a target pixel specifying line PL1 and pixels PXa and PXb, shown in FIG. 10B, when one target pixel specifying line PL overlaps two pixels arranged in the same column (that is, having the same Y coordinate) of the pixel matrix of the target image TI, one of the pixels (for example, the pixel PXb) that overlaps the target pixel specifying line PL shorter in distance than the other is excluded from the evaluation target pixel TP. That is, for each of the target pixel specifying lines PL, only one pixel is selected from one column of the pixel matrix as the evaluation target pixel TP.

When the inclination of the target pixel specifying line PL exceeds 45 degrees with respect to the X direction, the relationship between the column and row of the pixel matrix in the above description is inverted and, therefore, only one pixel is selected from one row of the pixel matrix as the evaluation target pixel TP. In addition, depending on the relationship in size between the target image TI and the reference area SA, one pixel may be selected as the evaluation target pixel TP with respect to a plurality of the target pixel specifying lines PL.

The evaluation unit 234 calculates the average of R values of the evaluation target pixels TP for each of the target pixel specifying lines PL. However, in the present example embodiment, with respect to each of the target pixel specifying lines PL, a portion of pixels each having a large R value within the plurality of selected evaluation target pixels TP are excluded from calculation of evaluation values. Specifically, for example, when k evaluation target pixels TP are selected with respect to one target pixel specifying line PL, the evaluation target pixels TP are separated into two groups: a first group, which is composed of 0.75 k pixels each having a relatively large R value, and a second group, which is composed of 0.25 k pixels each having a relatively small R values, and then only the pixels that belong to the second group are used to calculate the average of R values as an evaluation value. The reason that a portion of evaluation target pixels TP are excluded from calculation of evaluation values is described later.

As described above, in the present example embodiment, the evaluation value with respect to each of the target pixel specifying lines PL is calculated by the evaluation unit 234. Because the target pixel specifying lines PL are straight lines that are perpendicular to the reference line RL, the evaluation values may be calculated with respect to a plurality of positions (evaluation positions) along the reference line RL. In addition, each of the evaluation values may be expressed as a value that represents the characteristics of distribution of pixel values arranged in a direction perpendicular to the reference line RL with respect to each of the evaluation positions.

In S143, the determination unit 236 (FIG. 1) detects the position of each eye in the reference area SA and then determines a height reference point Rh on the basis of the detected positions of eyes. First, with respect to each of the divided areas, the determination unit 236, as shown on the right side in FIG. 9, creates a curve that represents a distribution of evaluation values (average of R values) along the reference line RL and then detects a position, at which the evaluation value takes a minimum value along the direction of the reference line RL, as an eye position Eh. The eye position Eh in the left divided area SA(l) is denoted as Eh(l) and the eye position Eh in the right divided area SA(r) is denoted as Eh(r).

In the case of a yellow human race, it may be presumed that the portion that displays the image of a skin in the divided area has a large R value, while, on the other hand, the portion that displays the image of an eye (more specifically, a black eye portion of the center of each eye) has a small R value. Therefore, as described above, the position, at which the evaluation value (the average of R values) takes a minimum value along the reference line RL, may be determined as the eye position Eh. As shown in FIG. 9, the divided area may possibly include another image (for example, the image of an eyebrow or the image of hair) having a small R value, in addition to the image of an eye. For this reason, the determination unit 236, when the curve that represents a distribution of evaluation values along the reference line RL takes multiple minimum values, determines the position that corresponds to one minimum value as the eye position Eh on the basis of a predetermined criterion. For example, among the positions on the reference line RL, corresponding to multiple minimum values, the position that is closest to the center position of the reference line RL within the reference area SA is set as the eye position Eh. This is because it is expected that, because the reference area SA is set as an area as small as possible in so far as the area includes the image of both eyes as described above, the positions of eyes are located near the center position of the reference line RL within the reference area SA, whereas an eyebrow or hair is located adjacent to the boundary lines of each divided area.

In addition, even when the above curve is located at a position other than the position of the image of an eye, because there is a possibility that the curve may take a minimum value despite its large evaluation value, minimum values that exceed a predetermined threshold value may be ignored. Alternatively, the position of the target pixel specifying line PL, which corresponds to a minimum value among evaluation values calculated with respect to each of the target pixel specifying lines PL, may be simply determined as the eye position Eh.

In the present example embodiment, an eye (a black eye portion of the center of each eye), at which it may be presumed that a difference in color from its surrounding is large in the face, is used as a reference subject for adjusting the position of the face area FA. However, because the average value of R values as the evaluation value is calculated for the plurality of evaluation target pixels TP on each of the target pixel specifying lines PL, there is a possibility that the accuracy of detection of a black eye portion may be deteriorated, for example, due to the influence of an image of a white eye portion that surrounds the black eye. As described above, the accuracy of detection of a reference subject is further improved in such a manner that a portion of evaluation target pixels TP (for example, pixels having a relatively large R value, belonging to the above described first group), which may be regarded to have a large color difference in comparison with the reference subject, are excluded from calculation of evaluation values. Next, the determination unit 236 determines a height reference point Rh on the basis of the detected eye position Eh.

FIG. 11 i illustrates one example of a method of determining the height reference point Rh. The height reference point Rh is used as a reference when the position of the face area FA in the height direction is adjusted. In the present example embodiment, as shown in FIG. 11, the point that is located at the middle of two right and left eye positions Eh(l) and Eh(r) on the reference line RL is set as the height reference point Rh. That is, the middle point of the intersection point of a straight line EhL(l), which indicates the left eye position Eh(l), and the reference line RL and the intersection point of a straight line EhL(r), which indicates the right eye position Eh(r), and the reference line RL is set as the height reference point Rh. The determination unit 236 calculates an approximate inclination angle ("approximate inclination angle RI") of a face image on the basis of the detected eye position Eh. The approximate inclination angle RI of a face image is obtained by estimating how many angles at which the image of a face in the target image TI is approximately inclined with respect to the reference line RL of the face area FA.

Figure 12:
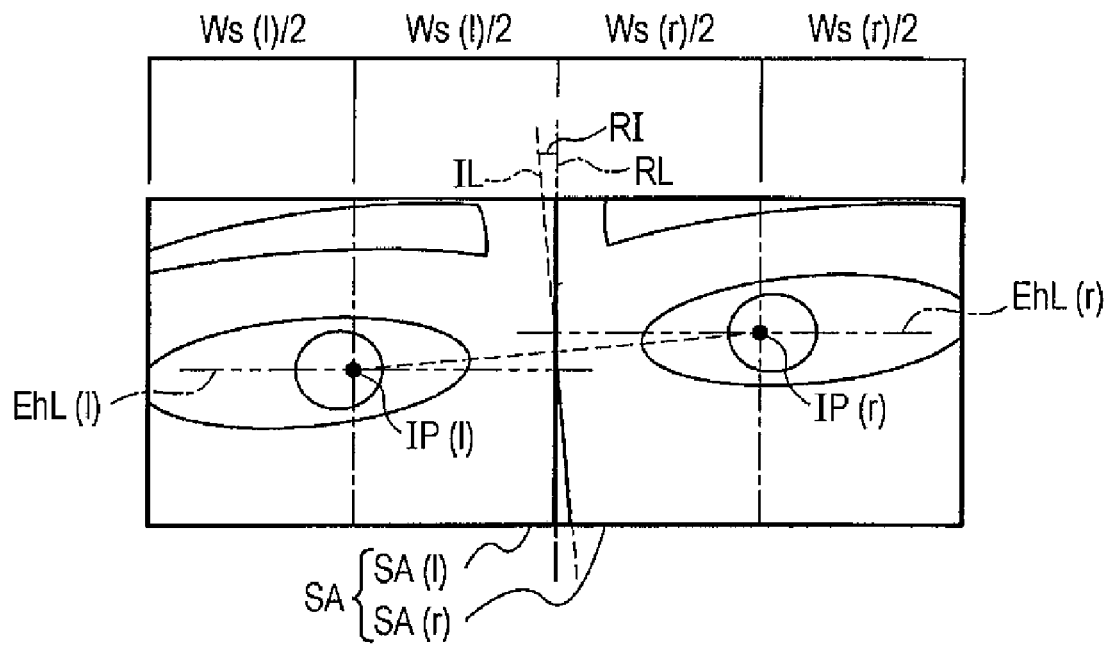
FIG. 12 is a view that illustrates one example of a method of calculating an approximate inclination angle.

FIG. 12 illustrates one example of a method of calculating the approximate inclination angle RI. As shown in FIG. 12, the determination unit 236 first determines an intersection point IP(l) of a straight line, which divides the width Ws(l) of the left divided area SA(l) in half, and the straight line EhL(l) and an intersection point IP(r) of a straight line, which divides the width Ws(r) of the right divided area SA(r) in half, and the straight line EhL(r). Then, an angle that is made by a straight line IL perpendicular to the straight line that connects the intersection point IP(l) and the intersection point IP(r) with the reference line RL is calculated as the approximate inclination angle RI. In S144, the face area adjustment unit 230 (FIG. 1) adjusts the position of the face area FA in the vertical direction.

Figure 13:
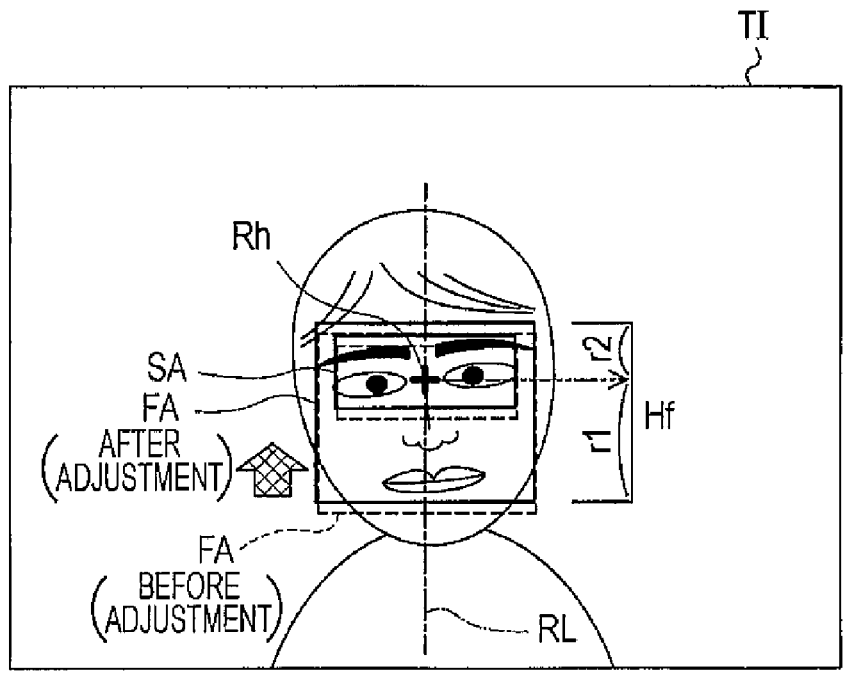
FIG. 13 is a view that illustrates one example of a method of adjusting the position of the face area in the height direction.

FIG. 13 illustrates one example of a method of adjusting the position of the face area FA in the height direction. The adjustment of the position of the face area FA in the height direction is performed in such a manner that the face area FA is reset so as to place the height reference point Rh at a predetermined position in the face area FA of which the position has been adjusted. Specifically, as shown in FIG. 13, the position of a rectangular frame that defines the face area FA is adjusted along the reference line RL so that the height reference point Rh is located at a position at which the height Hf of the face area FA in the vertical direction is divided by a predetermined ratio r1 to r2. In the example shown in FIG. 13, moving upward the face area FA of which the position has not yet been adjusted as shown by the dotted line allows resetting the face area FA of which the position has been adjusted as shown by the solid line.

After the position of the face area FA has been adjusted, in S150 (FIG. 4), the face area adjustment unit 230 (FIG. 1) adjusts the inclination (angle) of the face area FA. Here, the adjustment of inclination of the face area FA means resetting the face area FA so that the inclination of the face area FA in the target image TI is adjusted to conform to the inclination of the image of the face. In the present example embodiment, the predetermined reference subject that is referenced when the adjustment of inclination of the face area FA is executed is set to "both eyes". In the adjustment of inclination of the face area FA, a plurality of evaluation directions that represent the choices of adjustment angles of inclination are set, and the evaluation reference area ESA corresponding to each of the evaluation directions is set as an area that includes the image of both eyes. Then, in regard to each of the evaluation directions, evaluation values are calculated on the basis of pixel values of the image of the evaluation reference area ESA, and the inclination of the face area FA is adjusted using the adjustment angle of inclination determined on the basis of the evaluation values.

Figure 14:
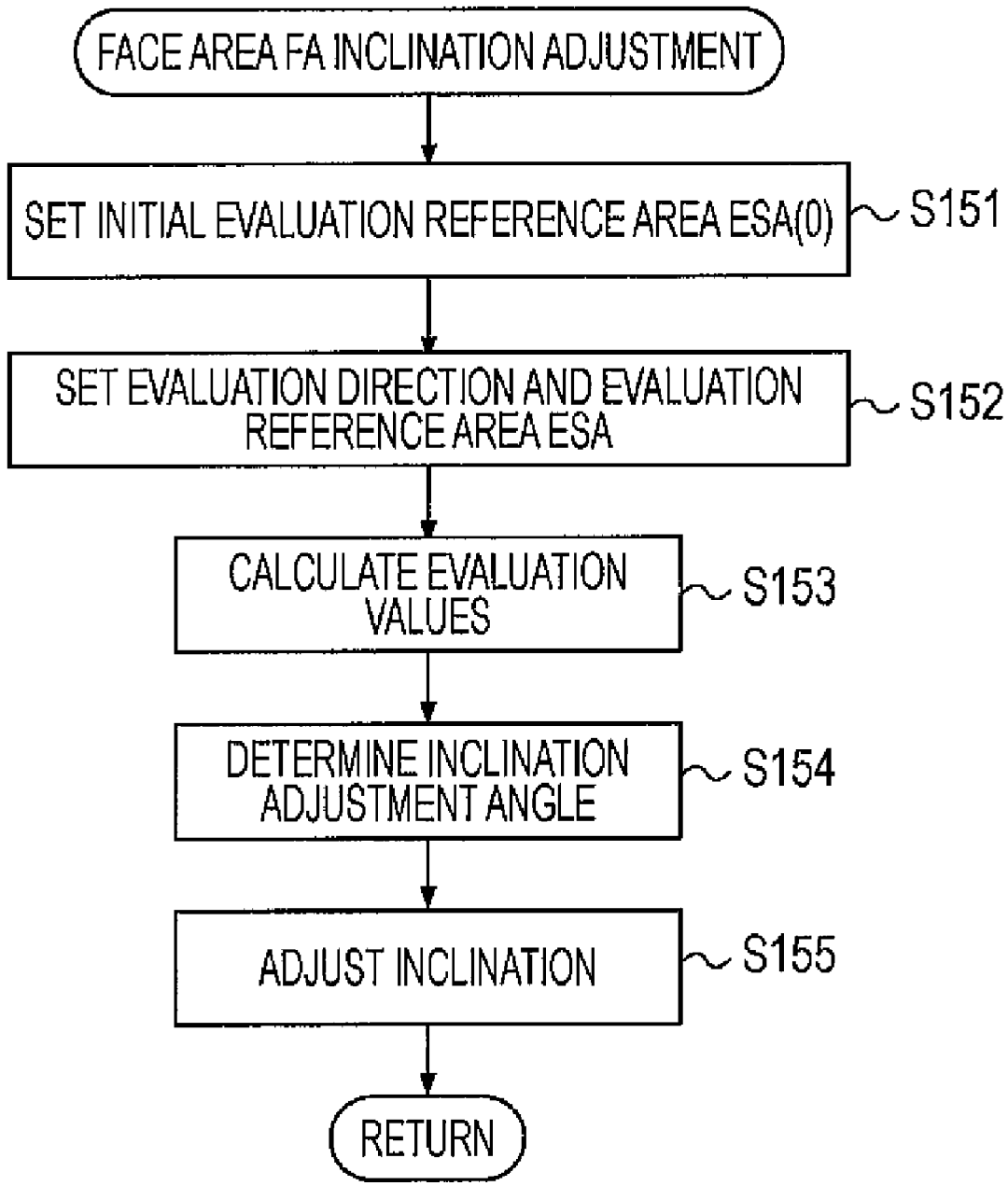
FIG. 14 is a flowchart of an inclination adjustment process in which the inclination of the face area is adjusted.
Figure 15:
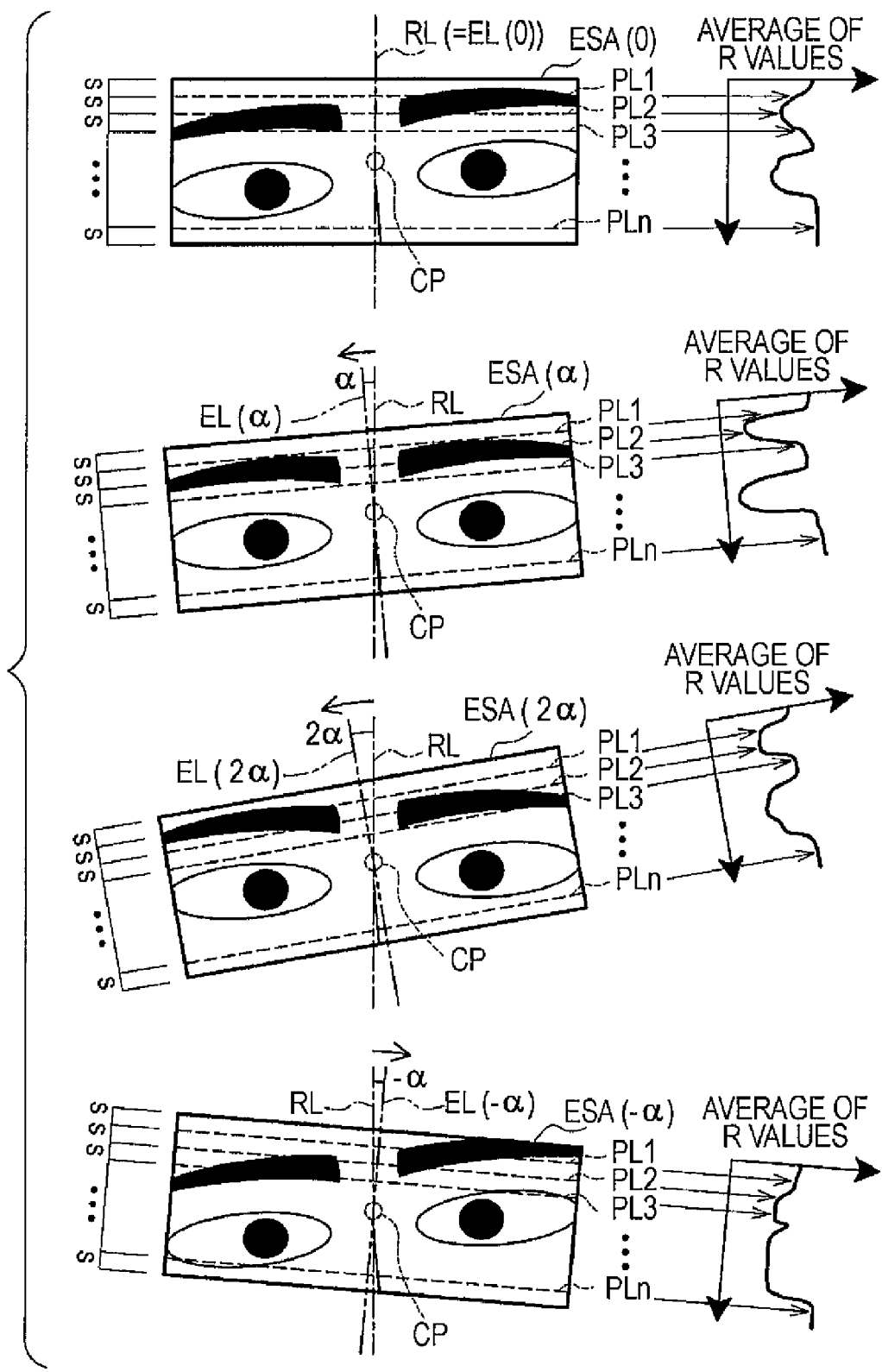
FIG. 15 is a view that illustrates one example of a method of calculating evaluation values used for adjusting the inclination of the face area.

FIG. 14 is a flowchart of an inclination adjustment process in which the inclination of the face area FA is adjusted according to the present example embodiment. FIG. 15 is a view that illustrates one example of a method of calculating evaluation values used for adjusting the inclination of the face area FA. In S151, the reference area setting unit 232 (FIG. 1) sets an initial evaluation reference area ESA(0). The initial evaluation reference area ESA(0) is associated with a direction ("initial evaluation direction") parallel to the reference line RL (see FIG. 13) that is obtained after the position of the face area FA has been adjusted. The reference area SA (see FIG.

13) corresponding to the face area FA of which the position has been adjusted is directly set as the initial evaluation reference area ESA(0). The evaluation reference area ESA is not divided into two right and left areas, different from the reference area SA that is used when the position of the face area FA is adjusted. The set initial evaluation reference area ESA(0) is shown in the uppermost drawing of FIG. 15.

In S152, the reference area setting unit 232 (FIG. 1) sets a plurality of evaluation directions and an evaluation reference area ESA corresponding to each of the evaluation directions. The plurality of evaluation directions are set as directions that represent the choices of adjustment angles of inclination. In the present example embodiment, a plurality of evaluation direction lines EL, of which an angle that is made with the reference line RL falls within a predetermined range, are set, and directions parallel to the evaluation direction lines EL are set as evaluation directions. As shown in FIG. 15, straight lines that are determined in such a manner that the reference line RL is rotated about the center point (center of gravity) CP of the initial evaluation reference area ESA(0) on a predetermined angle α basis in a counterclockwise direction or in a clockwise direction are set as the plurality of evaluation direction lines EL. The evaluation direction line EL of which an angle that is made with the reference line RL is φ degrees is denoted as EL(φ).

In the present example embodiment, the above described predetermined range with respect to an angle that is made by each evaluation direction line EL with the reference line RL is set to a range of ±20 degrees. In this description, a rotation angle is indicated by a negative value when the reference line RL is rotated in a clockwise direction, and a rotation angle is indicated by a positive value when the reference line RL is rotated in a counterclockwise direction. The reference area setting unit 232 rotates the reference line RL in a counterclockwise direction or in a clockwise direction while increasing a rotation angle like α degrees, 2α degrees, . . . within a range that does not exceed 20 degrees to thereby set the plurality of evaluation direction lines EL. FIG. 15 shows the evaluation direction lines EL (EL(α), EL(2α), EL(−α)) that are respectively determined by rotating the reference line RL at α degrees, 2α degrees, and −α degrees. The reference line RL may also be expressed as an evaluation direction line EL(0).

The evaluation reference area ESA corresponding to the evaluation direction line EL that represents each of the evaluation directions is obtained by rotating the initial evaluation reference area ESA(0) about the center point CP at the same angle as the rotation angle at which the evaluation direction line EL is set. The evaluation reference area ESA corresponding to the evaluation direction line EL(φ) is denoted as an evaluation reference area ESA(φ). FIG. 15 shows the evaluation reference areas ESA (ESA(α), ESA(2α), and ESA(−α)) that respectively correspond to the evaluation direction lines EL(α), EL(2α), and EL(−α). The initial evaluation reference area ESA(0) is also treated as one of the evaluation reference areas ESA.

In S153, the evaluation unit 234 (FIG. 1) calculates evaluation values on the basis of pixel values of an image of the evaluation reference area ESA with respect to each of the plurality of evaluation directions. In the present example embodiment, the average values of R values are used as evaluation values for adjusting the inclination of the face area FA as in the case of the above described evaluation value for adjusting the position of the face area FA. The evaluation unit 234 calculates evaluation values for the plurality of evaluation positions located along the evaluation direction.

The method of calculating the evaluation value is the same as the above described method of calculating the evaluation value for adjusting the position of the face area FA. That is, the evaluation unit 234, as shown in FIG. 15, sets the target pixel specifying lines PL1 to PLn perpendicular to the evaluation direction line EL within each of the evaluation reference areas ESA, selects the evaluation target pixels TP with respect to each of the target pixel specifying lines PL1 to PLn, and then calculates the average of R values of the selected evaluation target pixels TP as the evaluation value.

A method of setting the target pixel specifying lines PL within the evaluation reference area ESA or a method of selecting the evaluation target pixels TP are similar to the method of adjusting the position of the face area FA shown in FIG. 9, FIG. 10A and FIG. 10B except whether an area is divided into right and left areas. As in the case of the adjustment of position of the face area FA, a portion of the selected evaluation target pixels TP (for example, 0.75 k pixels having a relatively large R values among the evaluation target pixels TP) may be excluded from a target for calculation of evaluation values. On the right side of FIG. 15, in regard to each of the evaluation directions, a distribution of the calculated evaluation values along the evaluation direction line EL is shown.

The target pixel specifying line PL is a straight line perpendicular to the evaluation direction line EL, so that the evaluation values may be calculated with respect to a plurality of positions (evaluation positions) along the evaluation direction line EL. In addition, the evaluation value may be regarded as a value that represents the characteristics of a distribution of pixel values along the direction perpendicular to the evaluation direction line EL with respect to each of the evaluation positions.

In S154, the determination unit 236 (FIG. 1) determines an adjustment angle that is used to adjust the inclination of the face area FA. With respect to each of the evaluation directions, the determination unit 236 calculates a distribution of the evaluation values, calculated in S153, along the evaluation direction line EL and selects an evaluation direction that has a maximum variance. Then, an angle made by the evaluation direction line EL, which corresponds to the selected evaluation direction, with the reference line RL is determined as an adjustment angle used for adjusting the inclination.

Figure 16:
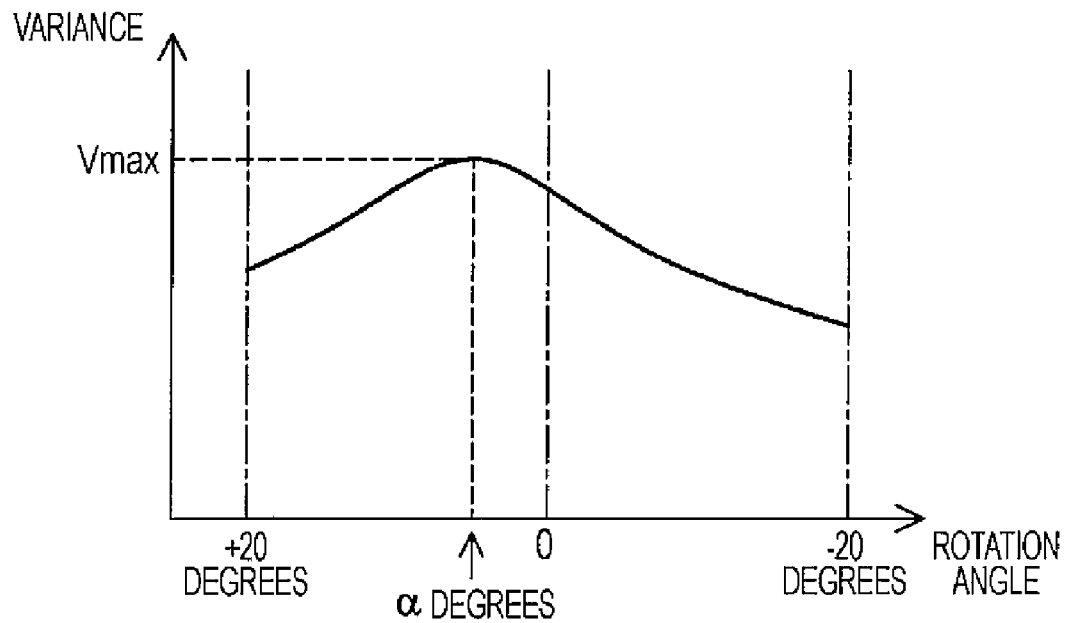
FIG. 16 is a view that illustrates one example of a calculated variance of evaluation values with respect to each evaluation direction.

FIG. 16 illustrates one example of a calculated variance of evaluation values with respect to each evaluation direction. In the example shown in FIG. 16, the variance takes a maximum value Vmax in the evaluation direction of which the rotation angle is α degrees. Thus, α degrees, that is, a rotation angle of α degrees in a counterclockwise direction is determined as an adjustment angle used for adjusting the inclination of the face area FA.

The reason that an angle corresponding to the evaluation direction in which the value of a variance of evaluation values becomes maximal is determined as an adjustment angle used for adjusting the inclination is now described. As shown by the second drawing of FIG. 15 from the upper side, in the evaluation reference area ESA(α) in which the rotation angle is α degrees, the images of the center portions (black eye portions) of right and left eyes are arranged so that they are aligned in a direction substantially parallel to the target pixel specifying line PL (that is, a direction perpendicular to the evaluation direction line EL). In addition, at this time, similarly, the images of right and left eyebrows are also arranged so that they are aligned in a direction substantially perpendicular to the evaluation direction line EL. Accordingly, the evaluation direction corresponding to the evaluation direction line EL at this time may be regarded as a direction that substantially represents the inclination of a face image. At this time, the positional relationship between the image of an eye or an eyebrow generally having small R values and the image of a skin portion generally having large R values will be a positional relationship in which both of the images have less overlapping portions along the direction of the target pixel specifying line PL. Therefore, the evaluation value at a position of the image of an eye or an eyebrow is relatively small, and the evaluation value at a position of the image of a skin portion is relatively large. Thus, the distribution of evaluation values along the evaluation direction line EL will be a distribution having a relatively large dispersion (large amplitude), as shown in FIG. 15, and the value of a variance becomes large.

On the other hand, as shown in the uppermost, third and fourth drawings of FIG. 15, in the evaluation reference areas ESA(0), ESA(2α), and ESA(−α) in which the rotation angles are respectively 0 degree, 2α degrees, and −α degrees, the images of the center portions of right and left eyes or the images of right and left eyebrows are not aligned in a direction perpendicular to the evaluation direction line EL but deviated from each other. Thus, the evaluation direction corresponding to the evaluation direction line EL at this time does not represent the inclination of the face image. At this time, the positional relationship between the image of an eye or an eyebrow generally having small R values and the image of a skin portion generally having large R values will be a positional relationship in which both of the images have much overlapping portions along the direction of the target pixel specifying line PL. Thus, the distribution of evaluation values along the evaluation direction line EL will be a distribution having a relatively small dispersion (small amplitude), as shown in FIG. 15, and the value of a variance becomes small.

As described above, when the evaluation direction is close to the direction of inclination of the face image, the value of a variance of the evaluation values along the evaluation direction line EL becomes large, and, when the evaluation direction is remote from the direction of inclination of the face image, the value of a variance of the evaluation values along the evaluation direction line EL becomes small. Thus, when an angle corresponding to the evaluation direction in which the value of a variance of the evaluation values becomes maximum is determined as an adjustment angle used for adjusting the inclination, it is possible to implement such the adjustment of inclination of the face area FA that the inclination of the face area FA conforms to the inclination of the face image.

In the present example embodiment, when the calculated variance of the evaluation values is a critical value within the range of angles, that is, the calculated variance becomes a maximum value at an angle of −20 degrees or 20 degrees with respect to the reference line RL, it may be presumed that the inclination of a face is probably not properly evaluated. Thus, the adjustment of inclination of the face area FA is not executed in this case. In addition, the determined adjustment angle is compared with the approximate inclination angle RI that has been calculated when the position of the face area FA is adjusted as described above. When a difference between the adjustment angle and the approximate inclination angle RI is larger than a predetermined threshold value, it may be presumed that an error has occurred when evaluation or determination has been made in adjusting the position of the face area FA or in adjusting the inclination thereof. Thus, the adjustment of position of the face area FA and the adjustment of inclination thereof are not executed in this case. In S155, the face area adjustment unit 230 (FIG. 1) adjusts the inclination of the face area FA.

Figure 17:
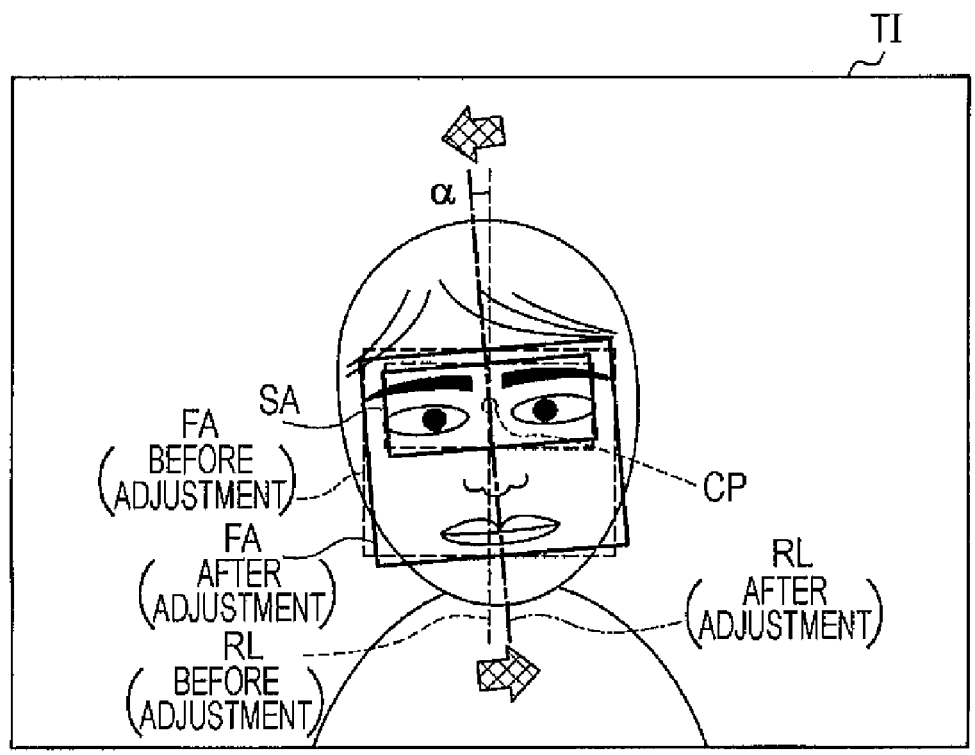
FIG. 17 is a view that illustrates one example of a method of adjusting the inclination of the face area.

FIG. 17 illustrates one example of a method of adjusting the inclination of the face area FA. The adjustment of inclination of the face area FA is performed in such a manner that the face area FA is rotated about the center point CP of the initial evaluation reference area ESA(0) by the adjustment angle that is determined in S154. In the example of FIG. 17, rotating the face area FA of which the angle has not yet been adjusted, indicated by the broken line, in a counterclockwise direction by α degrees sets the face area FA of which the angle has been adjusted, indicated by the solid line. In S160 after the adjustment of inclination of the face area FA has been completed, the deformation area setting unit 240 (FIG. 1) sets a deformation area TA. The deformation area TA is an area on the target image TI and will be a candidate on which image deformation process is performed for face shape correction. In this regard, the deformation area TA set in S160 may be regarded as an example of a candidate area according to the aspects of the invention.

Figure 18:
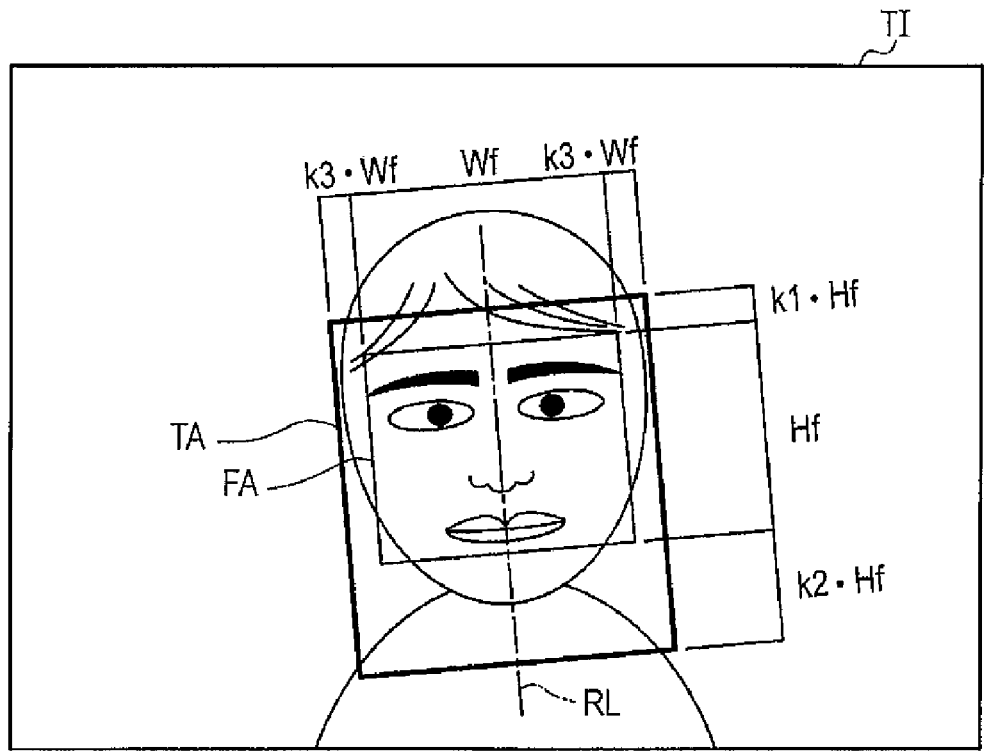
FIG. 18 is a view that illustrates one example of a method of setting a deformation area.

FIG. 18 illustrates one example of a method of setting the deformation area TA. As shown in FIG. 18, in the present example embodiment, the deformation area TA is set as an area such that the face area FA is extended (or contracted) in a direction parallel to the reference line RL (height direction) and in a direction perpendicular to the reference line RL (width direction). Specifically, where the size of the face area FA in the height direction is Hf and the size of the face area FA in the width direction is Wf, the deformation area TA is set so that the face area FA is extended upward by an amount of k1·Hf and downward by an amount of k2·Hf and the rectangular face area FA is extended to the right side and to left side, respectively, by an amount of k3·Wf. Note that k1, k2, and k3 are predetermined coefficients.

When the deformation area TA is set in this manner, the reference line RL, which is a straight line parallel to the contour line of the face area FA in the height direction, is also parallel to the contour line of the deformation area TA in the height direction. In addition, the reference line RL divides the width of the deformation area TA in half.

As shown in FIG. 18, the deformation area TA is set to include the image substantially from the jaw to the forehead with respect to the height direction of the face and includes the images of right and left cheeks with respect to the width direction of the face. That is, in the present example embodiment, the coefficients k1, k2, and k3 are set in advance on the basis of the relationship with the size of the face area FA so that the deformation area TA becomes an area that substantially includes the image of the above described range. Here, the deformation area setting unit 240 may be regarded as a candidate area setting unit according to the aspects of the invention. In addition, the above face area detection unit 220, face area adjustment unit 230 and deformation area setting unit 240 may be collectively termed as a candidate area setting unit. Note that FIG. 6, and the like, illustrates the case in which only one human face is present in the target image TI; however, when multiple faces are present in the target image TI, in the above S130 to S160, the multiple faces are detected and setting of the face area FA, position adjustment and inclination adjustment of the face area FA and setting of the deformation area TA are performed for each of the multiple faces.

(2-2) Deformation Area Exclusion Process

After the deformation areas TA are set on the target image TI through the process until S160, in S170, the exclusion determination unit 270 (FIG. 1) determines whether each deformation area TA is used as a target for deformation process in accordance with various exclusion conditions, which will be described later, and a deformation area that is determined to be not used as a target for deformation process is excluded from a target for deformation process. That is, in the present example embodiment, not all the deformation areas TA that have been set through the process until S160 are used as a target for image deformation, which will be described later, but only the set deformation areas TA to which the various exclusion conditions do not apply are used as a target for image deformation. As a result, it is possible to appropriately suppress a processing load of the printer 100 and memory space consumption in the internal memory 120, or the like, associated with image deformation.

Figure 27:
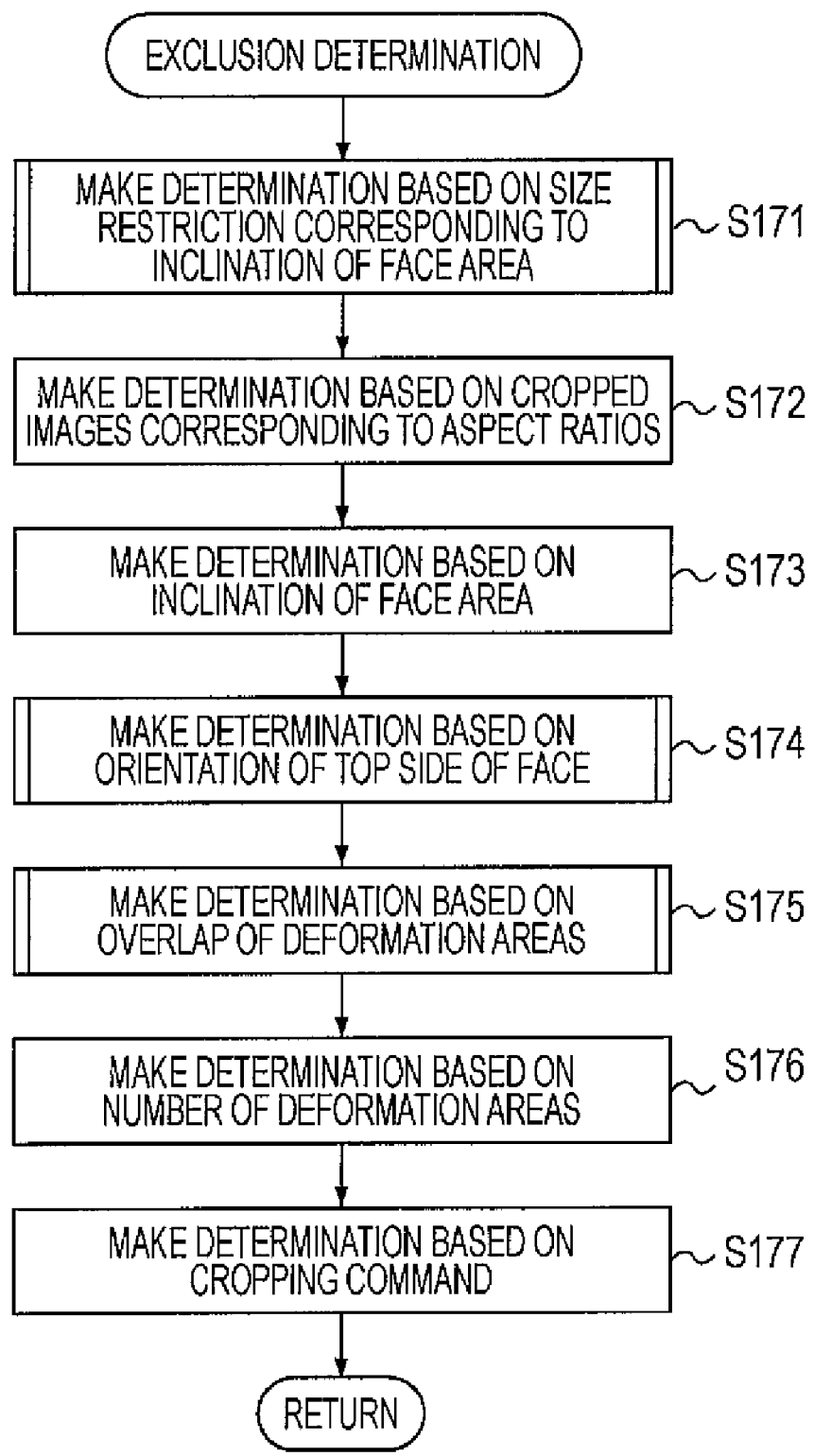
FIG. 27 is a flowchart of one example of an exclusion determination process.

FIG. 27 is a flowchart that shows one example of the exclusion determination process in S170. In S171, as a first exclusion determination, the exclusion determination unit 270 individually determines whether the deformation area TA is excluded from a target for deformation process on the basis of size restriction corresponding to the inclination of the face area FA.

Figure 28:
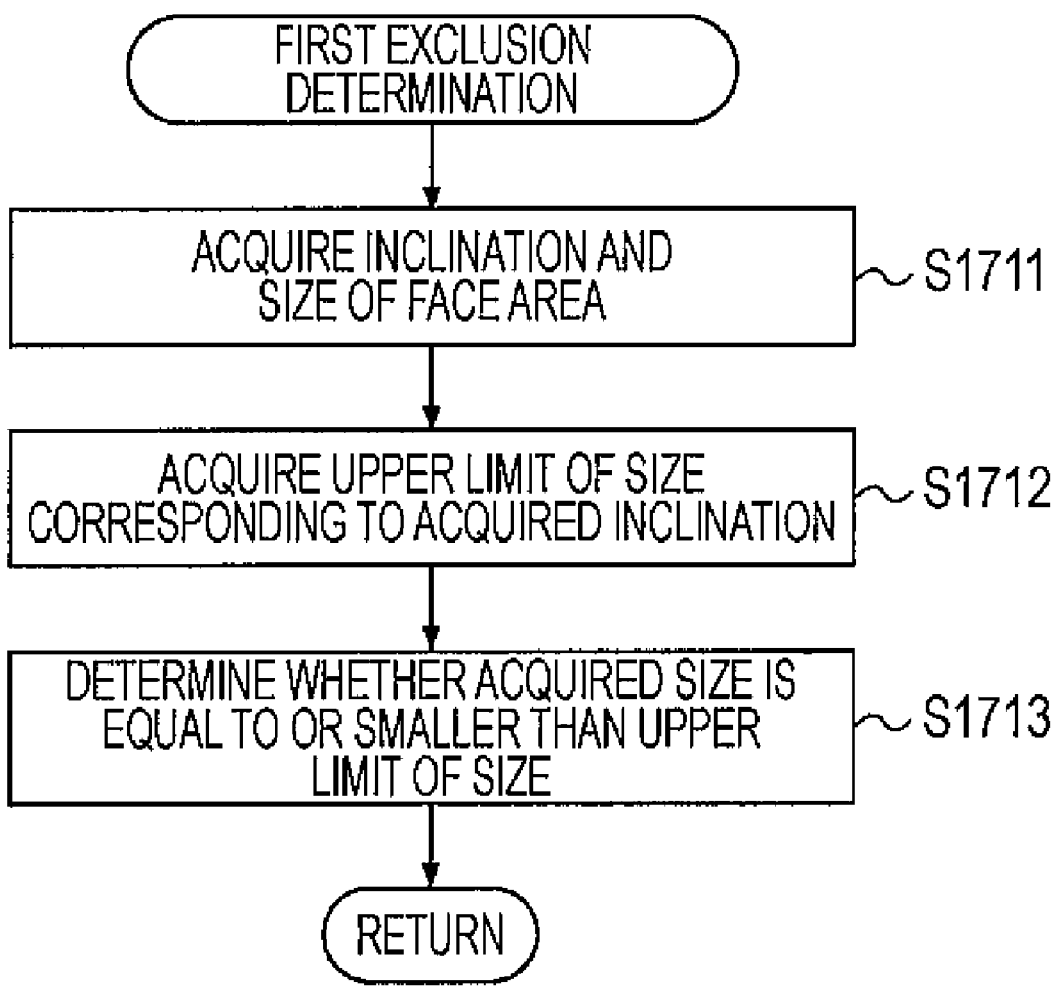
FIG. 28 is a flowchart of one example of a detailed portion of the exclusion determination process.

FIG. 28 is a flowchart that shows the detail of the process in S171. In S1711, the exclusion determination unit 270 acquires the inclination and size of the face area FA for each deformation area TA. The inclination acquired in S1711 indicates an angle made by a vertical reference line Vs that is oriented in the vertical direction of the target image TI or a horizontal reference line Hs that is oriented in the horizontal direction of the target image TI with the reference line RL of the face area FA.

Figures 29, 30:
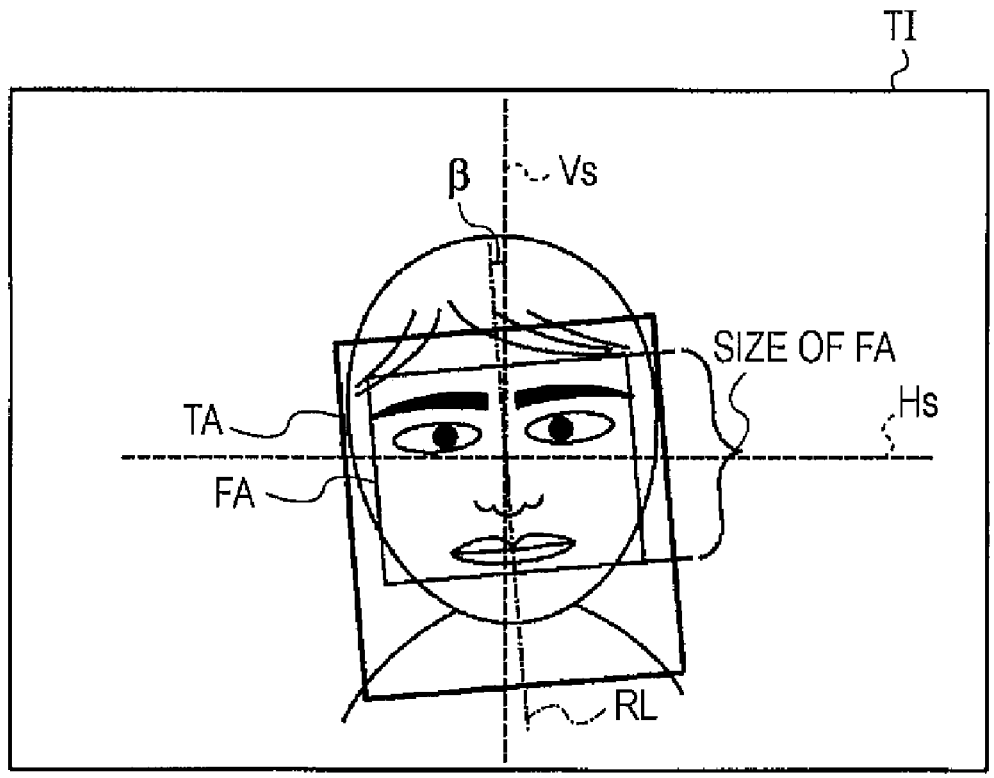
FIG. 29 is a view that shows a state in which an angle made by the face area with a vertical reference line or a horizontal reference line is acquired.
FIG. 30 is a view that shows one example of a face area size upper limit table.

FIG. 29 illustrates that the inclination of the face area FA is acquired for a certain deformation area TA in S1711. Here, it is initially determined whether the reference direction used for comparison to acquire the inclination is set to the vertical reference line Vs or the horizontal reference line Hs. In this case, it is determined on the basis of which one of the vertical reference line Vs and the horizontal reference line Hs the reference line RL is inclined closer to. That is, on the target image TI, when the top side of a face is oriented to the substantially top side or the substantially bottom side of the target image TI, the vertical reference line Vs will be a reference to acquire the inclination, whereas when the top side of a face is oriented to the substantially right-hand side or substantially left-hand side of the target image TI, the horizontal reference line Hs will be a reference to acquire the inclination.

In the example shown in FIG. 29, because the reference line RL is inclined closer to the vertical reference line Vs than to the horizontal reference line Hs in the target image TI, in S1711, an angle β made by the vertical reference line Vs with the reference line RL is detected as the inclination of the face area FA. The angle β is an angle made by the reference line RL with the vertical reference line Vs (or the horizontal reference line Hs) and is acquired as a positive value. In S1711, the size of each face area FA is also acquired. The size of the face area FA may employ various values, such as an area of the face area FA. In the present example embodiment, among the sides of the rectangular face area FA, the length (Hf) of each side in the height direction is set as an example of size of the face area FA. In this case, the length Hf on the target image TI is acquired in the number of pixels on the target image TI. However, the length (Wf) of each side in the width direction may also be acquired as the size of the face area FA. If the face area FA has a square shape as described above, the length of one of the four sides of the face area FA may be acquired as the size of the face area FA.

In S1712, the exclusion determination unit 270 references the face area size upper limit table 430 (FIG. 1) to acquire the upper limit of the size of the face area FA corresponding to the acquired inclination of the face area FA. FIG. 30 shows one example of the face area size upper limit table 430. The face area size upper limit table 430 defines beforehand upper limits of the allowable size (in the present example embodiment, the number of pixels of a side of the face area FA in the height direction) of the face area FA in regard to a plurality of inclinations acquired as described above. In the present example embodiment, in view of a situation that as the inclination of a face area FA approaches to a certain predetermined upper limit angle (referred to as angle βL), memory consumption required for deformation process of the deformation area TA that includes the above face area FA increases (the situation will be described later), the employed face area size upper limit table 430 defines that the upper limit of the size is reduced as a value that indicates the inclination of the face area FA approaches to the angle βL.

If the upper limit of size corresponding to the inclination (angle β) that is acquired in S1711 is directly defined in the face area size upper limit table 430, the exclusion determination unit 270 just needs to read out the directly defined upper limit. On the other hand, if the upper limit of size corresponding to the acquired inclination (angle β) is not directly defined in the face area size upper limit table 430, the exclusion determination unit 270 just needs to acquire an upper limit corresponding to the acquired inclination (angle β) through interpolation calculation, or the like, based on other upper limits defined.

In S1713, the exclusion determination unit 270 determines whether the size of each face area FA acquired in S1711 falls within the upper limit of size acquired in S1712 and, when the size exceeds the upper limit, determines that the deformation area TA that includes the face area FA having a size that exceeds the upper limit is excluded from a target for deformation process. As a result, the deformation areas TA that cause a large amount of memory consumption required for deformation process due to their inclinations (angles β) on the target image TI may be excluded from a target for deformation process.

Next, in S172, as a second exclusion determination, the exclusion determination unit 270 determines whether at least a portion of the deformation area TA extends off an image region that is common to cropped images that are clipped from the target image TI through cropping based on a plurality of aspect ratios used for image output, and the deformation areas TA that at least partially extends off the image region are excluded from a target for deformation process. The above determination is made on each deformation area TA that is not determined to be excluded from a target for deformation process in S171.

In the present example embodiment, the printer 100 handles the target image TI as a piece of image data having the same size in the course of performing face shape correction. The image data of the target image TI, for example, has a QVGA (Quarter Video Graphics Array) size of 320 pixels in long side by 240 pixels in short side (aspect ratio 4:3). On the other hand, in the printer 100, various paper types available for printing the target image TI include A4-size paper, L-size paper, or letter-size paper, and an aspect ratio varies depending on the type of printing paper. Thus, when the target image TI is printed, the corresponding image data are appropriately cropped on the basis of the aspect ratio of the printing paper that is selected for use in printing.

Figure 31A:
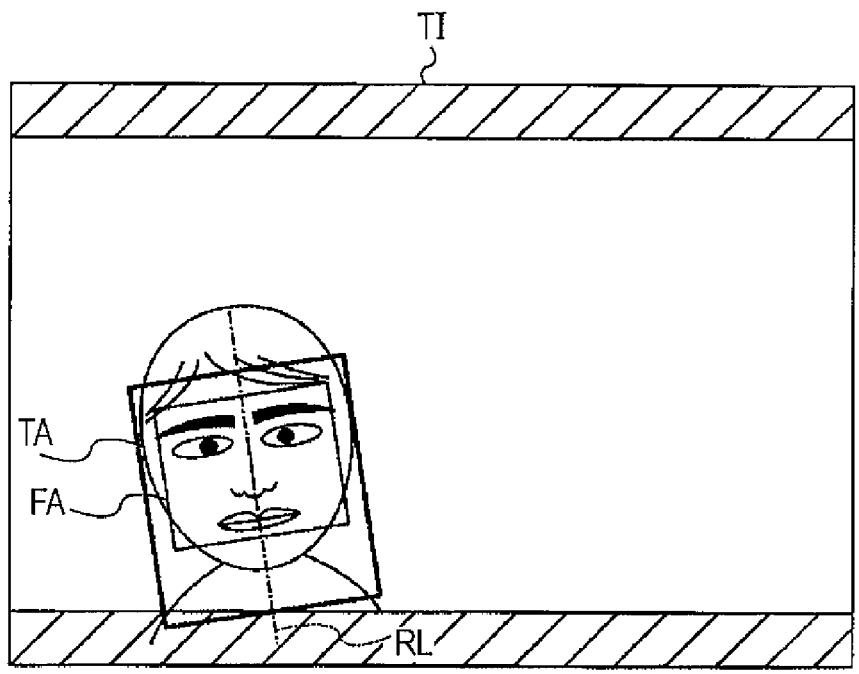
FIG. 31A and FIG. 31B are views illustrating the positional relationship between a cropped region and a deformation area on a target image.

FIG. 31A illustrates the case in which the target image TI is cropped on the basis of the aspect ratio of a certain printing paper. If the target image TI is cropped with an aspect ratio that is different from the aspect ratio of the target image TI, as shown in the drawing, a portion of the deformation area TA set on the target image TI may extend off a cropped region (into a hatched portion). Because a portion of data extending off the cropped region will be discarded, to perform the deformation process on a face that is included in the deformation area TA that partially extends off the cropped region in this way, it is necessary to reset (move or reduce the rectangular deformation area TA) the above deformation area TA that includes the face so that the entire deformation area TA is located inside a cropped region. However, resetting the deformation area TA increases the processing load and memory consumption in the printer 100.

Figure 31B:
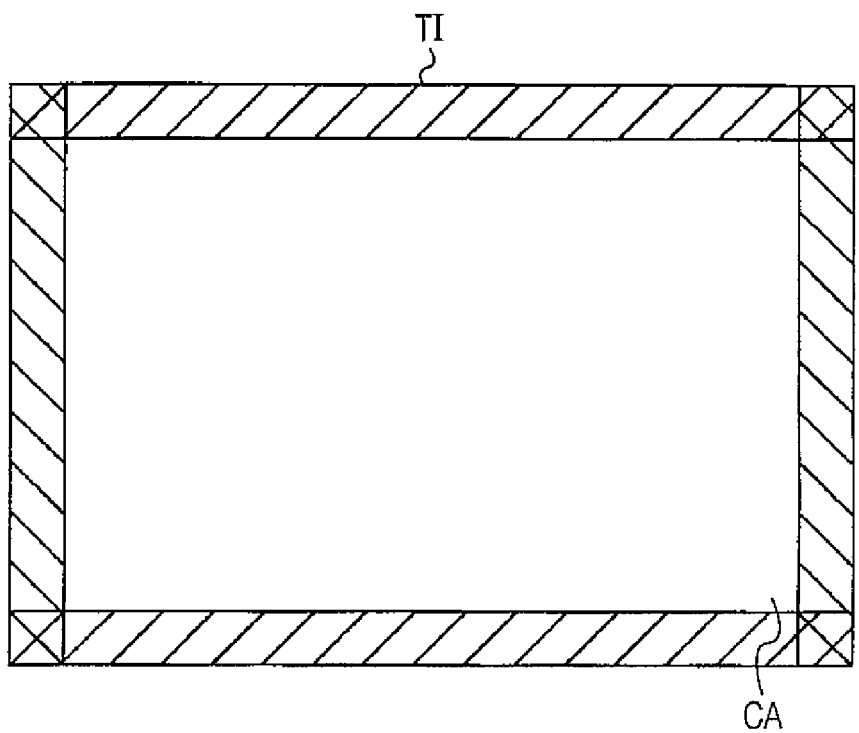

The exclusion determination unit 270, as shown in FIG. 31B, then sets on the target image TI a common image region CA that is common to cropped images that are clipped through cropping based on aspect ratios of all printing papers available for the printer 100. For easier description, in FIG. 31B, two aspect ratios that are aspect ratios of printing paper available in the printer 100 and that are different from the aspect ratio of the target image TI are prepared, and a hatched area of the target image TI is not clipped through cropping by the respective two aspect ratios and is discarded. That is, in FIG. 31B, a non-hatched area on the target image TI is a common image region CA. The exclusion determination unit 270 individually determines whether the deformation area TA, or a target for determination, extends off the common image region CA, and determines to exclude a deformation area TA that partially extends off the common image region CA from a target for deformation process.

As a result, because only the deformation area(s) TA that is/are entirely included in the common image region CA become(s) a target for deformation process, it is not necessary to reset the deformation area TA as described above, and increases in processing load and memory consumption in the printer 100 are avoided. In addition, because there are no circumstances under which deformation process is performed or not performed on a face in the target image TI depending on a difference in type of printing paper (difference in aspect ratio of a printing paper) used for printing, the user does not experience discomfort.

Next, in S173, as a third exclusion determination, the exclusion determination unit 270 determines whether the inclination of the deformation area TA belongs to a predetermined angular range on the target image TI, and excludes the one that does not belong to the predetermined angular range from a target for deformation process. The above determination is made on each deformation area TA that is not determined to be excluded from a target for deformation process in S171 and S172.

Figure 32:
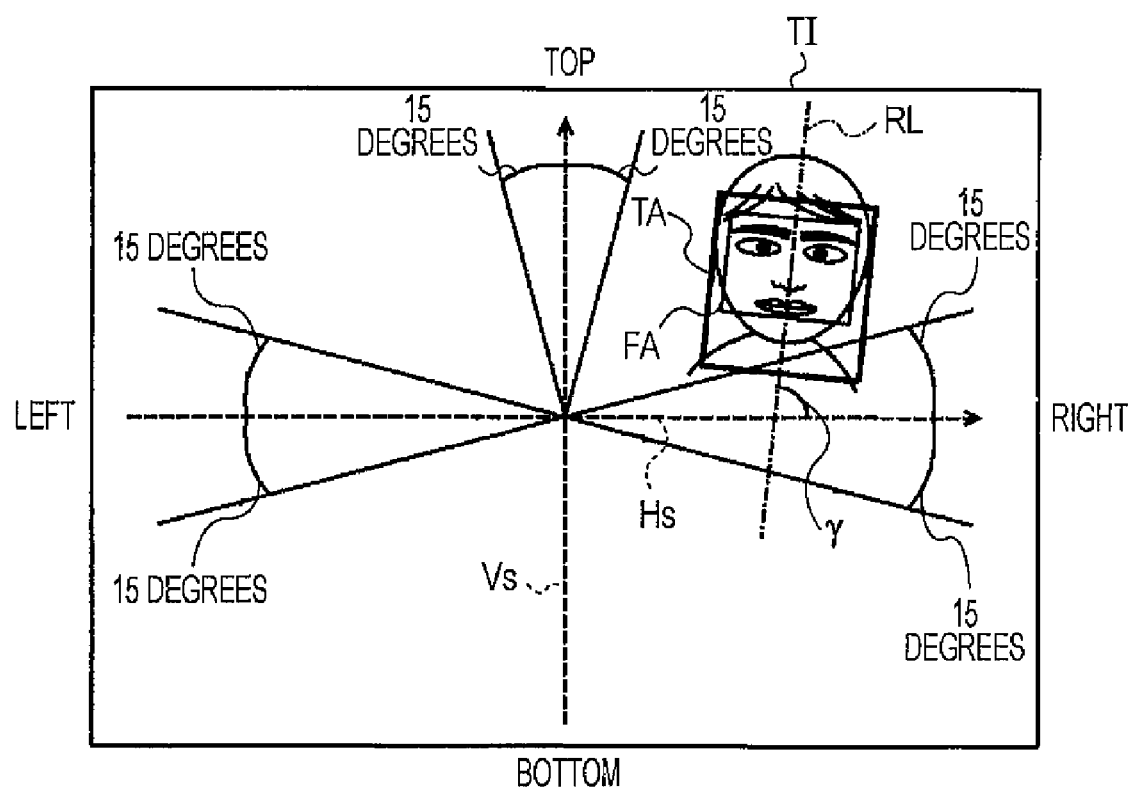
FIG. 32 is a view that illustrates predetermined angle ranges and a deformation area on a target image.

FIG. 32 shows one example of the predetermined angular range. In the present example embodiment, the above predetermined angular range is set to a range of ±15 degrees with respect to the positive direction (right-hand side of the target image TI, and 0 degree direction) of the horizontal reference line Hs, a range of ±15 degrees with respect to the positive direction (top side of the target image TI, and 90 degree direction) of the vertical reference line Vs and a range of ±15 degrees with respect to the negative direction (left-hand side of the target image TI, and 180 degree direction) of the horizontal reference line Hs. Of course, setting of the predetermined angular range is not limited to the above described values. In S173, the exclusion determination unit 270 determines whether the inclination of the reference line RL of each determination target deformation area TA belongs to the above predetermined angular range. At the time of this determination, the exclusion determination unit 270 needs to recognize which side among the top side or bottom side of the reference line RL, that is, both ends of the reference line RL is oriented toward the top side of the face.

Here, when detection of a face area FA is performed through a known face detection method, it is possible to obtain vertex position information that indicates that each of four vertexes of the rectangular face area FA corresponds to which one of a top right point of a face, a top left point of the face, a bottom right point of the face or a bottom left point of the face. Thus, for example, the face area detection unit 220 is able to specify the top right point and bottom right point (or top left point and bottom left point) of the face area FA with reference to the vertex position information, and then specify one of both ends of the reference line RL, adjacent to the specified top right point (top left point), as the top side of the reference line RL.

Which side of both ends of the reference line RL is oriented toward the top side of a face may be specified in the following manner. As is described with reference to FIG. 7, in S142, the evaluation unit 234 calculates evaluation values for detecting the position of an image of each eye in the reference area SA. As shown in FIG. 9, the evaluation values take a minimum value at the eye position Eh and also take a minimum value at a position other than the eye, of which R components are small, that is, at the image of an eyebrow or hair. Then, in the human face, eyebrows or hair are normally present on the upper side above the eyes. Then, the determination unit 236, together with the process to determine the height reference point Rh, performs a process to specify the side of a position on the reference line RL, corresponding to a minimum value that is different from a minimum value corresponding to the eye position as viewed from the position of the height reference point Rh, as the top side of the face. As a result, it is specified which one of both ends of the reference line RL is oriented toward the top side of the face.

In this way, because which one of both ends of the reference line RL of each deformation area TA is oriented toward the top side of the face is specified, the exclusion determination unit 270 determines, for each of the determination target deformation areas TA, whether an angle γ made by the right-hand side (0 degree direction) of the target image TI with the top side of the reference line RL in the counterclockwise direction belongs to the predetermined angular range illustrated in FIG. 32 on the basis of the specified result, and determines that the deformation areas TA of which the corresponding angle γ does not belong to any one of the predetermined angular ranges are excluded from a target for deformation process. In this manner, by roughly limiting faces, on which deformation process is performed, on the basis of inclinations of the faces on the target image TI, increases in processing load and memory consumption in the printer 100 are avoided.

In S174, as the fourth exclusion determination, the exclusion determination unit 270 determines whether the deformation area TA is used as a target for deformation process on the basis of which direction the top side of the face is oriented on the target image TI, and performs a process to exclude a deformation area TA having a face of which the top side is oriented in a direction other than a certain one direction from a target for deformation process. The above determination is performed on each deformation area TA that is not determined to be excluded from a target for deformation process in S171 to S173.

Figure 33:
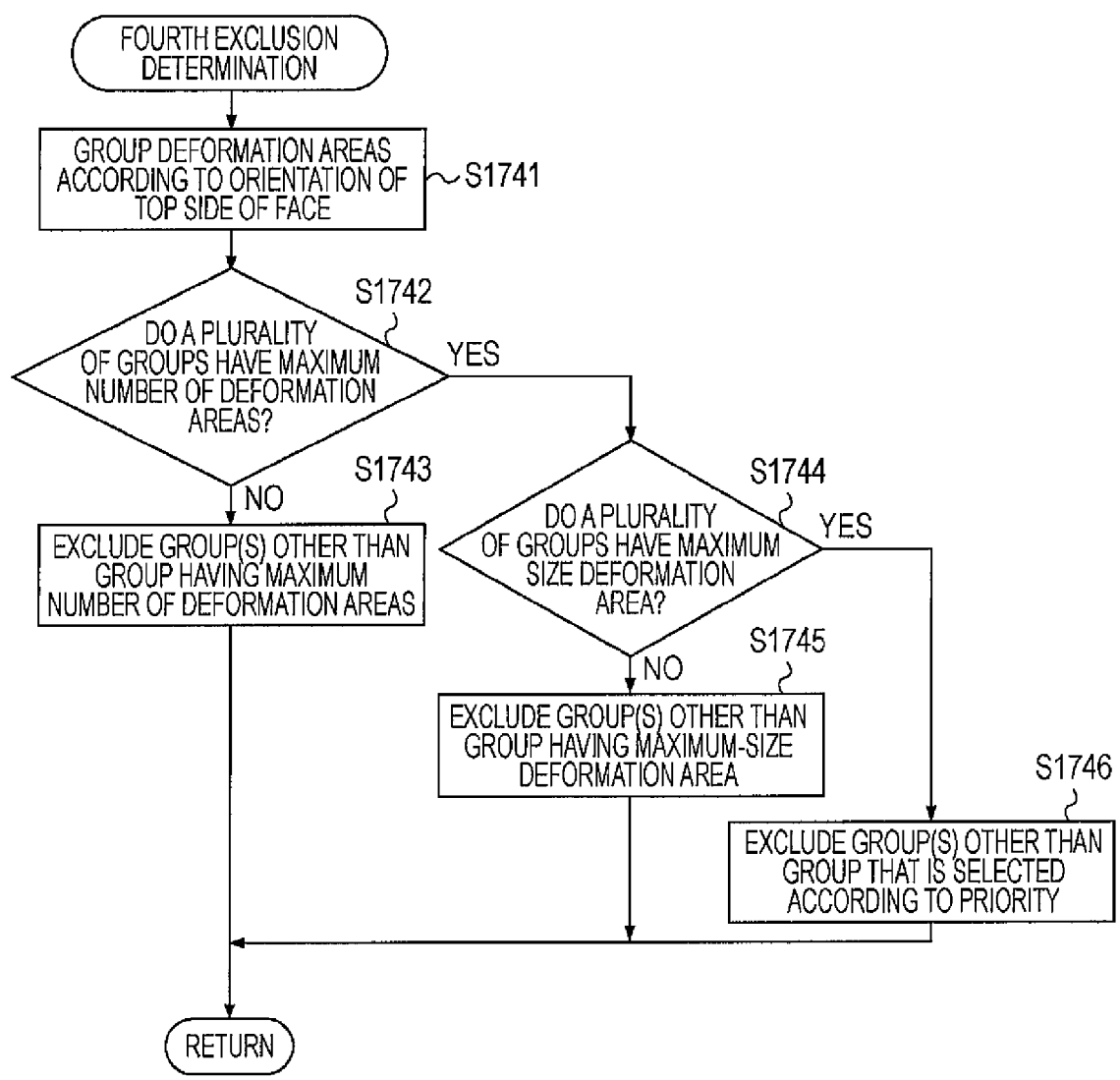
FIG. 33 is a flowchart of one example of a detailed portion of the exclusion determination process.

FIG. 33 is a flowchart that shows the detail of the process in S174. In S1741, the exclusion determination unit 270 initially groups the deformation areas TA on the target image TI according to which direction the top side of a face is oriented in. Through the processes until S173, on the target image TI, there can be a group of the deformation areas TA of which the top side of the face is oriented substantially upward in the target image TI (the angle γ belongs to a range of ±15 degrees with respect to the top side of the target image TI), a group of the deformation areas TA of which the top side of the face is oriented substantially rightward in the target image TI (the angle γ belongs to a range of ±15 degrees with respect to the right-hand side of the target image TI) and a group of the deformation areas TA of which the top side of the face is oriented substantially leftward in the target image TI (the angle γ belongs to a range of ±15 degrees with respect to the left-hand side of the target image TI). In addition, depending on accuracy of the process in S173, there may be occasionally a deformation area TA of which the top side of the face is oriented substantially downward in the target image TI (the angle γ belongs to a range of ±15 degrees with respect to the negative direction of the vertical reference line Vs).

The exclusion determination unit 270 divides the deformation area(s) TA on the target image TI into the above described top side, bottom side, right-hand side and left-hand side groups in accordance with the angle γ at which the top side of the reference line RL is oriented. In S1742, the exclusion determination unit 270 determines whether a plurality of groups have the maximum number of deformation areas TA belonging thereto. When one group has the maximum number of deformation areas TA belonging thereto, the process proceeds to S1743, and it is determined that a deformation area TA other than the deformation areas TA that belong to the group having the maximum number of deformation areas TA belonging thereto is excluded from a target for deformation process.

Figure 34:
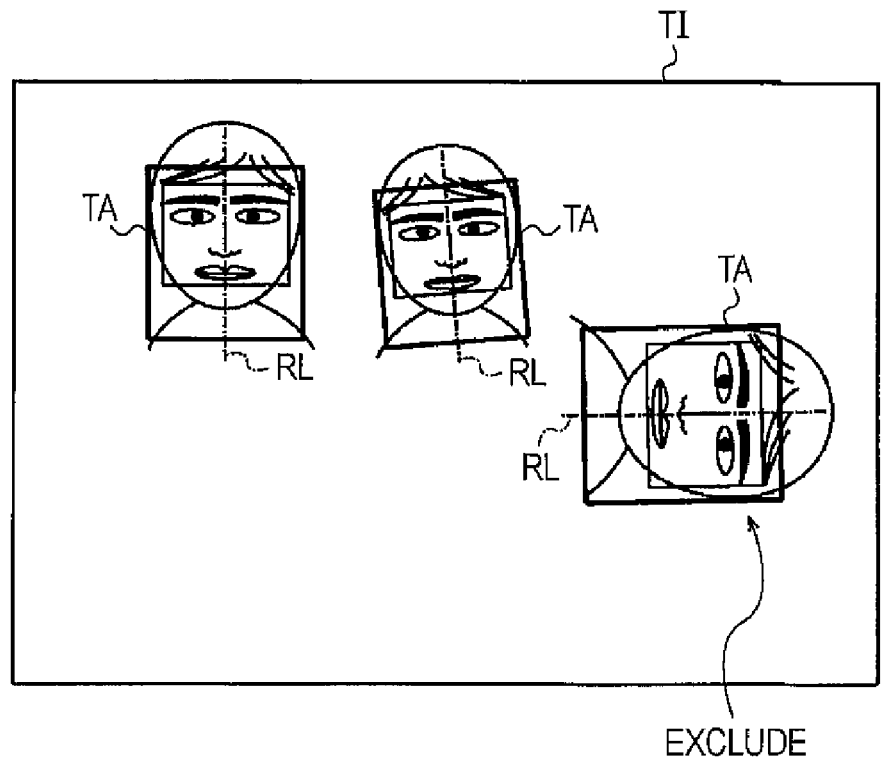
FIG. 34 is a view that illustrates a state in which a plurality of differently oriented deformation areas are set in a target image.

When a plurality of the deformation areas TA are set on the target image TI as illustrated in FIG. 34, the number of deformation areas TA of which the face is oriented substantially upward is two and is maximal, and there is no other direction (right-hand side, left-hand side or bottom side) in which two or more faces are substantially oriented in the same direction. Thus, in S1743, it is determined that the deformation areas TA that are oriented in directions other than the substantially upward direction are excluded from a target for deformation process.

On the other hand, in S1742, when it is determined that a plurality of groups have the maximum number of deformation areas TA belonging thereto, the exclusion determination unit 270 proceeds to S1744 and determines whether a plurality of groups that include the deformation area TA having the maximum-size face area FA are present among the groups having the maximum number of deformation areas TA belonging thereto. The size of the face area FA is as described above. When one group includes the deformation area TA having the maximum-size face area FA, the process proceeds to S1745, and it is determined that a deformation area TA, other than the deformation areas TA that belong to the group that includes the maximum number of deformation areas TA belonging thereto and that includes the deformation area TA having the maximum-size face area FA, are excluded from a target for deformation process.

Figure 35:
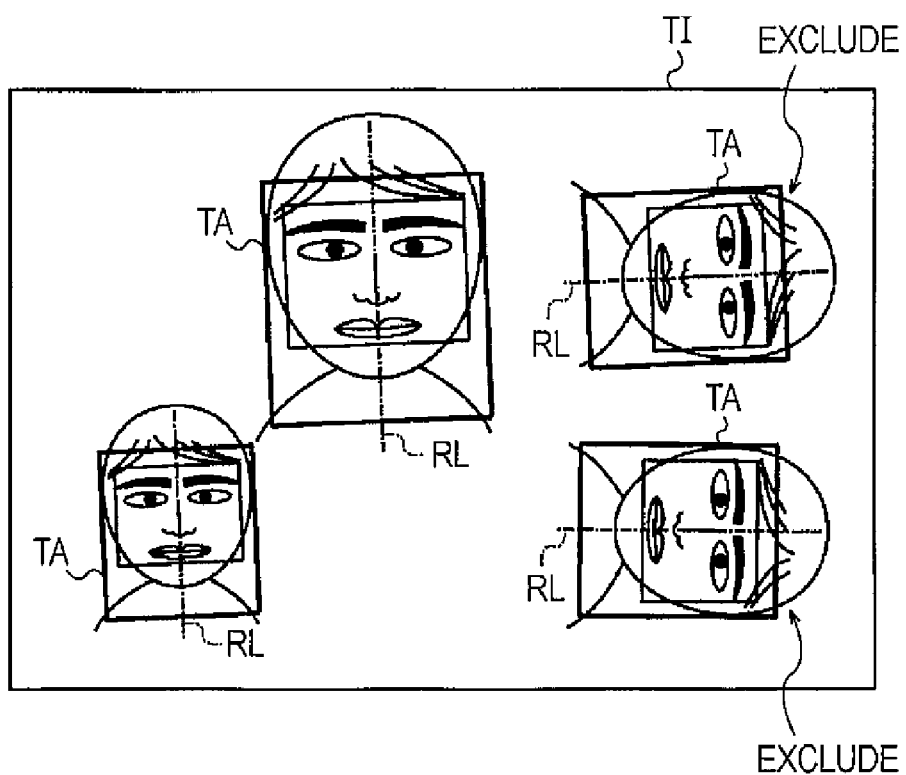
FIG. 35 is a view that illustrates a state in which a plurality of differently oriented deformation areas are set in a target image.

When a plurality of deformation areas TA are set on the target image TI as illustrated in FIG. 35, the number of deformation areas TA of which the face is oriented substantially upward and the number of deformation areas TA of which the face is oriented substantially rightward both are maximum number, that is, two, and the group of the deformation areas TA of which the face is oriented substantially upward includes the maximum-size face area FA. Thus, in S1745, it is determined that the deformation areas TA that are oriented in directions, other than the substantially upward direction, are excluded from a target for the deformation process.

On the other hand, when the groups having the maximum number of deformation areas TA belonging thereto include a plurality of groups that include the deformation area TA having the maximum-size face area FA, the exclusion determination unit 270 proceeds to S1746 and selects a group associated with one orientation from the plurality of groups in accordance with a predetermined order of priority. Then, it is determined that a deformation area TA, other than the deformation areas TA that belong to the selected group, is excluded from a target for deformation process. Here, the predetermined order of priority is an order in regard to top side, bottom side, right-hand side and left-hand side, and at least the top side is given a first priority. The order of priority in regard to left-hand side, right-hand side and bottom side is not specifically limited, and, for example, the order may be determined like bottom side, left-hand side and right-hand side.

Figure 36:
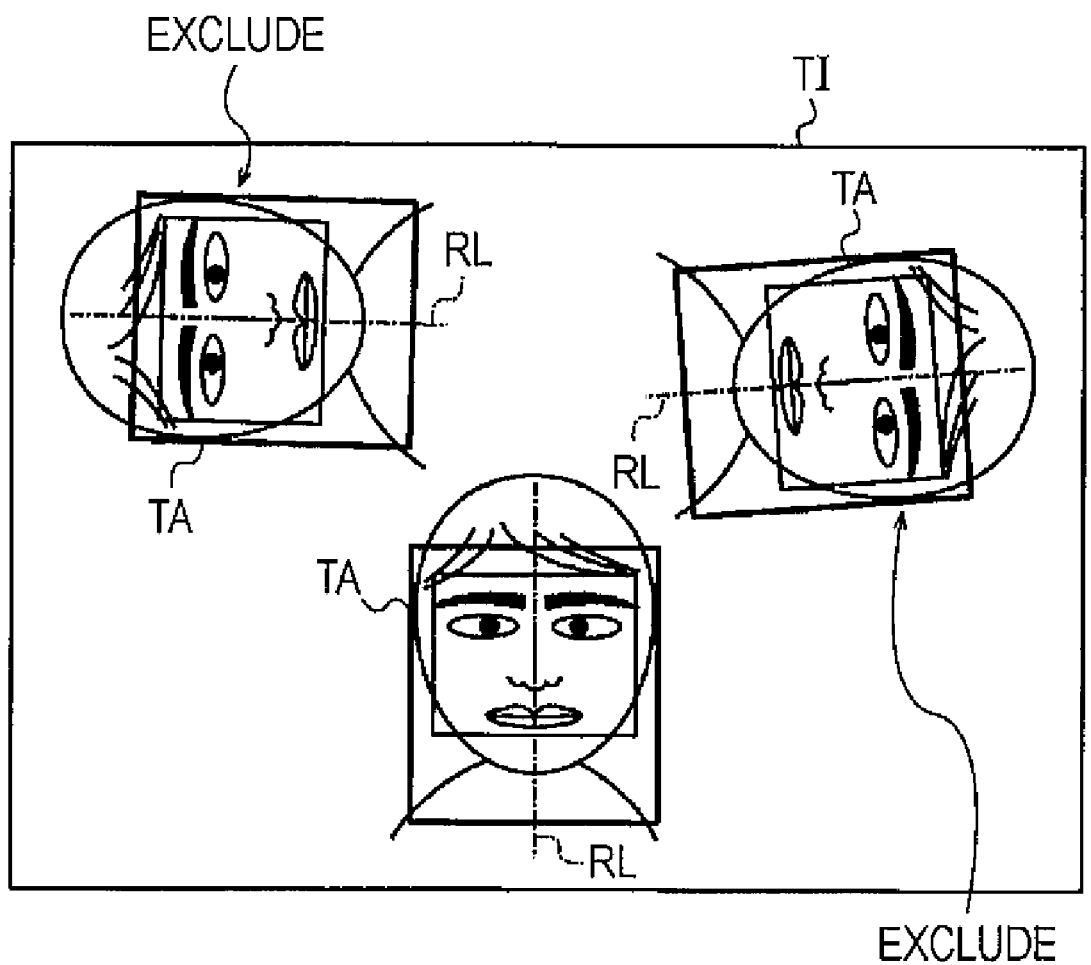
FIG. 36 is a view that illustrates a state in which a plurality of differently oriented deformation areas are set in a target image.

When a plurality of deformation areas TA are set on the target image TI as illustrated in FIG. 36, the number of deformation areas TA of which the face is oriented substantially upward, the number of deformation areas TA of which the face is oriented substantially rightward and the number of deformation areas TA of which the face is oriented substantially leftward are equal, and the deformation area TA of which the face is oriented substantially upward, the deformation area TA of which the face is oriented substantially rightward and the deformation area TA of which the face is oriented substantially leftward have the same-size face areas FA. Thus, in S1746, in accordance with the order of priority, it is determined that the deformation areas TA that are oriented in directions, other than the substantially upward direction, are excluded from a target for deformation process.

In this way, according to the process in S174, even when the top sides of the faces of the deformation areas TA set on the target image TI are different like substantially upward, substantially downward, substantially rightward or substantially leftward, only one orientation of the deformation area TA used as a target for deformation process is selected in accordance with the number or size of the deformation area TA in each orientation or the order of priority among the orientations. Thus, increases in processing load and memory consumption in the printer 100 are avoided. Note that the flowchart shown in FIG. 33 is just an example and the exclusion determination unit 270 does not necessarily perform the steps according to this flowchart. For example, after "Yes" is determined in S1742, the process may proceed to determination in S1746 without making determination in S1744. When the above process is employed, the process in S174 can be simplified.

In S175, as a fifth exclusion determination, the exclusion determination unit 270 performs a process to exclude one or more deformation areas TA from a target for deformation process so that, when there is an overlap between deformation areas TA, the overlap is eliminated. The above determination is made on each deformation area TA that is not determined to be excluded from a target for deformation process in S171 to S174.

Figure 37:
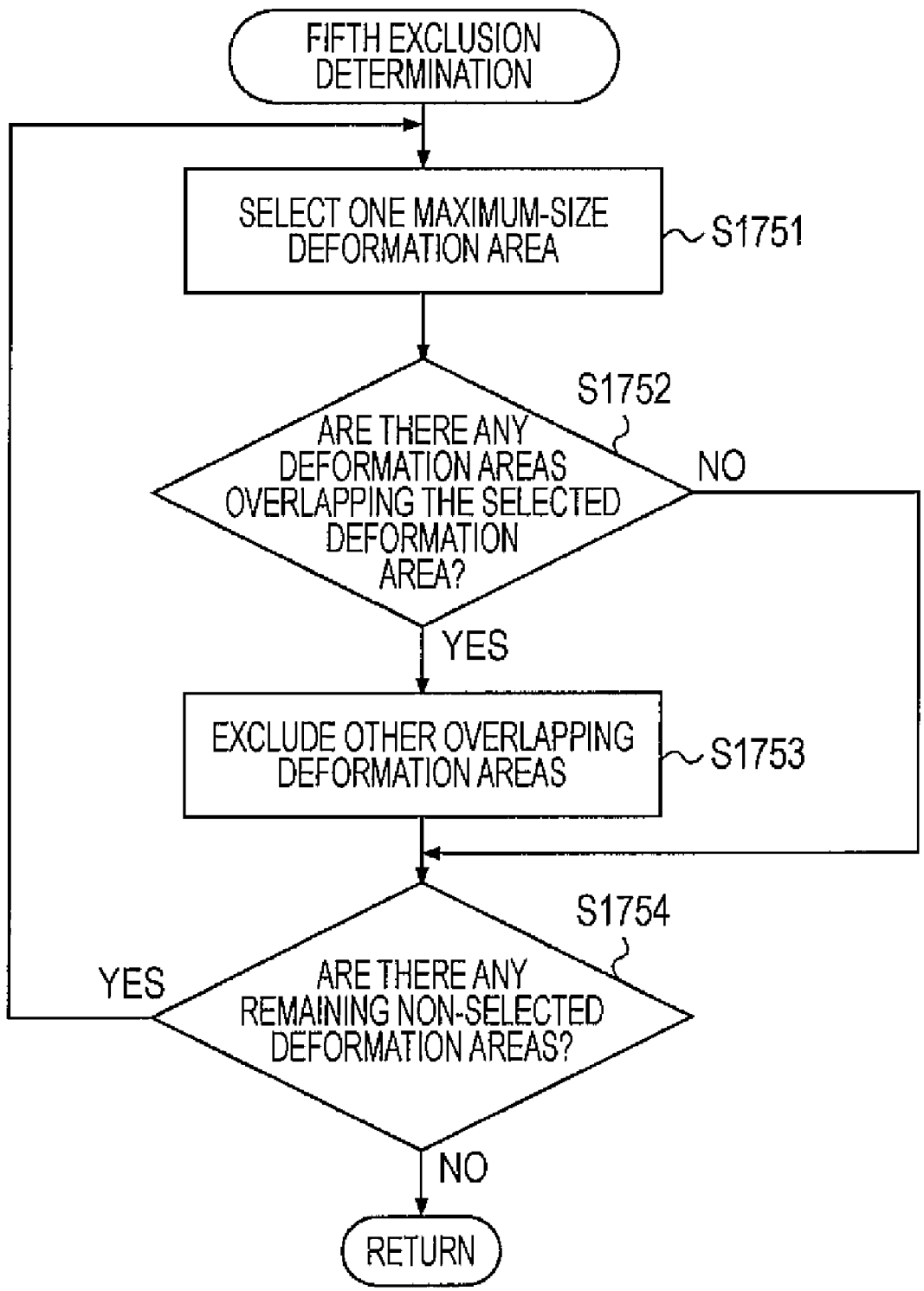
FIG. 37 is a flowchart of one example of a detailed portion of the exclusion determination process.

FIG. 37 is a flowchart that shows the detail of the fifth exclusion determination process of S175. In S1751, the exclusion determination unit 270 selects one deformation area TA having the maximum-size face area FA from among the deformation areas TA that have not determined to be excluded from a target for deformation process at that time. In S1752, it is determined whether there are other deformation areas TA that overlap the deformation area TA selected in the preceding S1751 and that have not been determined to be excluded from a target for deformation process at that time. When the overlapping other deformation areas TA are present, the exclusion determination unit 270 proceeds to S1753 and determines that all the overlapping other deformation areas TA are excluded from a target for deformation process.

After S1753, or when "No" is determined in S1752, the process proceeds to S1754. In S1754, the exclusion determination unit 270 determines whether, in addition to the deformation area TA selected in the previous S1751, there is a deformation area TA that has not been determined to be excluded from a target for deformation process at that time. When it is determined that the above deformation area TA is present, the process returns to S1751, and the exclusion determination unit 270 selects another deformation area TA other than the deformation area TA selected in the previous S1751 to repeat the process in S1752 and the following processes. On the other hand, when there is no deformation area TA that has not determined to be excluded from a target for deformation process at that time in addition to the deformation area TA selected in the previous S1751, the process of FIG. 37 is complete.

Figure 38:
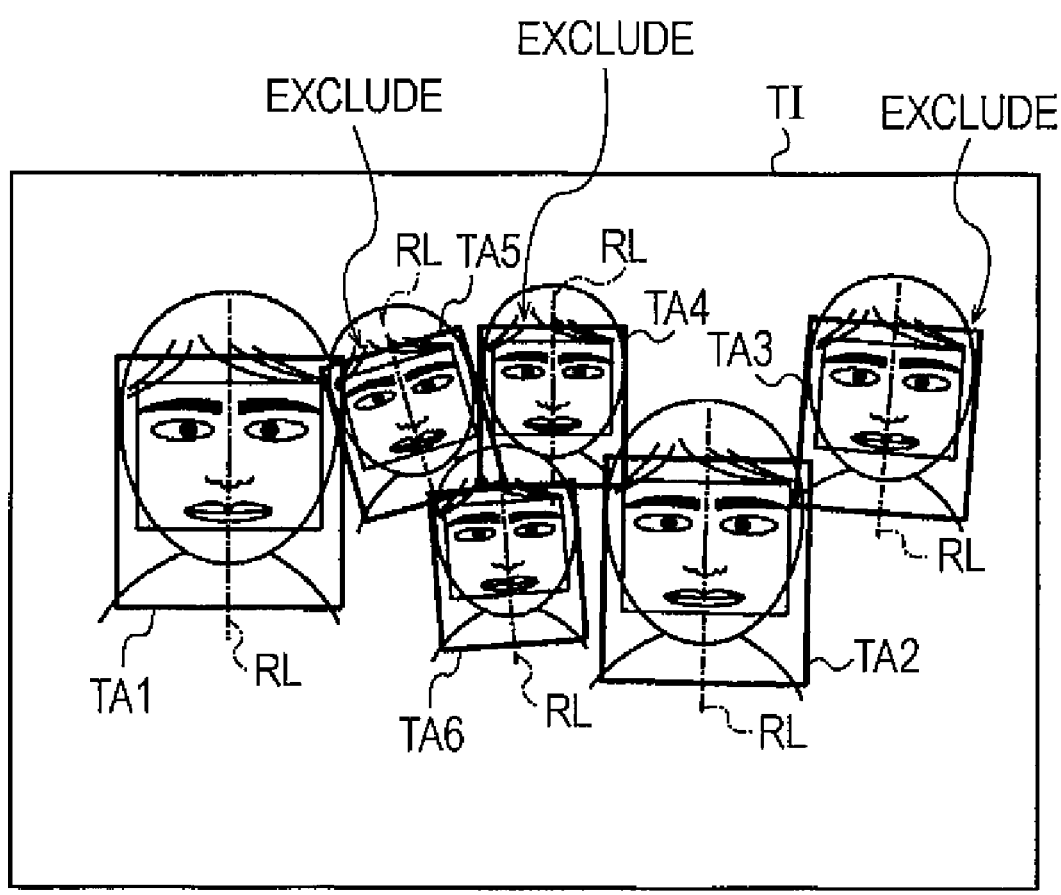
FIG. 38 is a view that illustrates a state in which a plurality of mutually overlapped deformation areas are set in a target image.

As shown in FIG. 38, taking the case in which a plurality of deformation areas TA overlap one another are set on the target image TI, for example, the process of FIG. 37 is described as follows. Because a deformation area TA1 has the maximum-size face area FA among deformation areas TA1 to TA6 shown in FIG. 38, the deformation area TA1 is initially selected in S1751. Then, because the deformation area TA5 overlaps the deformation area TA1, the deformation area TA5 is excluded from a target for deformation process. In the next S1751, the deformation area TA2 having the maximum-size face area FA among the deformation areas TA that have not selected in the previous S1751 is selected. Because the deformation area TA3 and the deformation area TA4 overlap the deformation area TA2, the deformation areas TA3 and TA4 are excluded from a target for deformation process. In the next S1751, the deformation area TA6 is selected. However, there is no other deformation area TA that has not excluded and that overlaps the deformation area TA6 at that time (No in S1752). In addition, because there is no deformation area TA that has not excluded from a target for deformation process at that time, other than the deformation areas TA1, TA2, and TA6 (No in S1754), the process of FIG. 37 is complete. As a result, in the example shown in FIG. 38, the deformation areas TA1, TA2, and TA6 are left without exclusion, and the overlap of the deformation areas TA is eliminated.

Here, when the deformation process is performed on each of the deformation areas TA that partially overlap each other on the target image TI, to deform one of the areas first and then deform the other area, it is necessary to save the deformed image data regarding the one of the areas separately from an original image (the target image TI for which deformation process has not yet been performed on any one of the deformation areas TA). This greatly increases memory utilization. In the present example embodiment, the exclusion determination unit 270 repeats a process to select one deformation area TA from among a plurality of deformation areas TA in descending order of the size of the face area FA and then excludes other deformation areas TA that overlap the selected deformation area TA from a target for the deformation process, thus avoiding the overlap of the deformation areas TA used as a deformation target. Thus, according to the present example embodiment, large faces that are presumably important for the user are left as a target for the deformation process while a large amount of memory consumption caused by the overlap of the deformation areas TA as described above is reduced.

The manner to eliminate the overlap of deformation areas TA is not limited to the above described manner. For example, the exclusion determination unit 270, when one deformation area TA is selected to eliminate the overlap of deformation areas TA, may not select the deformation area TA according to the size of the face area FA but may select the deformation area TA according to a command to select a deformation area TA, which is externally entered. That is, the exclusion determination unit 270 receives a selection command through operation of the operating unit 140 by the user. In this case, the exclusion determination unit 270 instructs the display processing unit 310 to make the display unit 150 display a user interface by which the deformation areas TA on the target image TI are selectable, and selects a deformation area TA in accordance with a selection command entered through the user interface by the user. Then, when there is another deformation area TA that overlaps the selected deformation area TA, it is determined to exclude all the overlapping other deformation area(s) TA from a target for deformation process. With the above configuration, the deformation area TA selected by the user is left as a target for deformation process while it is possible to eliminate the overlap of the deformation areas TA.

In S176, as a sixth exclusion determination, the exclusion determination unit 270 determines whether the number of deformation areas TA on the target image TI exceeds a predetermined threshold (maximum number of processes). When the number of determination areas TA exceeds the threshold, the deformation areas TA of which the number falls within the threshold are selected and determines that the non-selected deformation areas TA are excluded from a target for deformation process. The above determination is made on each deformation area TA that is not determined to be excluded from a target for deformation process in S171 to S175. The threshold may employ various values. In the present example embodiment, in consideration of performance of the printer 100, the above threshold is set to "five" as an example.

The exclusion determination unit 270, when the number of deformation areas TA on the target image TI exceeds the threshold, selects the deformation areas TA in number equal to or less than the threshold, for example, in a descending order of the size of the face area FA. As a result, large faces that are presumably important for the user are left as a target for deformation process while it is possible to avoid a situation in which the number of deformation areas TA that exceeds the performance of the printer 100 is set as a target for deformation process.

In S177, as a seventh exclusion determination, the exclusion determination unit 270 determines whether there is a deformation area TA that at least partially extends off a cropped image that is clipped on the basis of a cropping command that is externally entered and, when the deformation area TA is present, determines that the deformation area TA that at least partially extends off the cropped image is excluded from a target for deformation process. The above determination is made on each deformation area TA that is not determined to be excluded from a target for deformation process in S171-S176. In S172, the deformation area TA that partially extends off the common image region CA that always remains even when the target image TI is cropped on the basis of the aspect ratios of all printing papers available for the printer 100 is excluded; however, in S177, a deformation area TA that partially extends off a cropped region that may be selectively set by the user is also excluded from a target for deformation process.

In S177, the exclusion determination unit 270 acquires a cropping command that is externally entered. In this case, when the cropping command of the target image TI is issued by user's entry through the operating unit 140, an image region that will be clipped through cropping is set on the target image TI on the basis of the command. Alternatively, the exclusion determination unit 270 may instruct the display processing unit 310 to make the display unit 150 display a user interface for setting cropping on the target image TI, and may set an image region through cropping on the target image Ti on the basis of the cropping command entered by the user through the user interface. The exclusion determination unit 270 individually determines whether the deformation area TA used as a target for determination partially extends off the set image region for cropping and determines that a deformation area TA that at least partially extends off the image region is excluded from a target for the deformation process.

According to the process in S177, because only the deformation area(s) TA that is/are entirely included in the image region clipped through cropping instructed by the user can be a target for deformation process, it is not necessary to reset the deformation area(s) TA as described above, and increases in processing load and memory consumption in the printer 100 are avoided. However, the process in S177 is not executed when no cropping command is externally acquired.

In this way, in the present example embodiment, the above described first to seventh exclusion determinations are performed in the above described order, and the process in S180 and the following processes are performed on the deformation area(s) TA that has/have not been excluded through any exclusion determination and is/are left in the end. However, the above described order of the first to seventh exclusion determinations is just an example. The exclusion determination unit 270 is able to execute the processes of the exclusion determinations in any order or is able to execute only a portion of the first to seventh exclusion determinations.

(2-3) From Division of Deformation Area Until Printing Process

Figure 19:
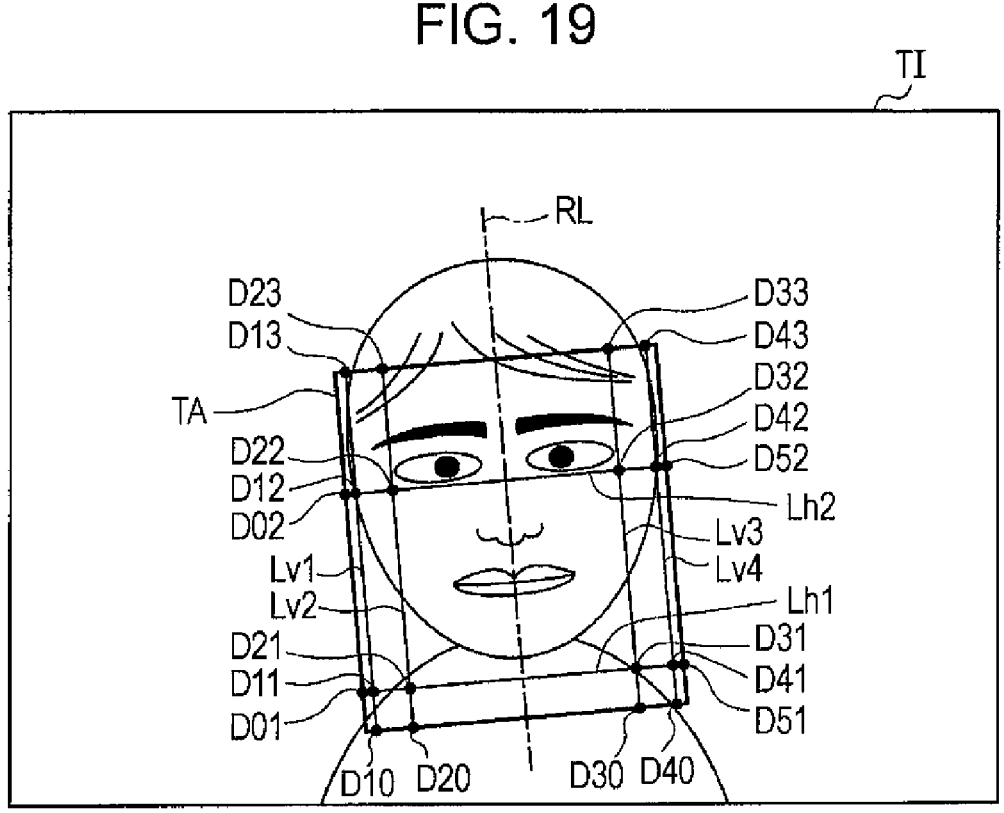
FIG. 19 is a view that illustrates one example of a method of dividing the deformation area into small areas.

In S180 (FIG. 4), the deformation area dividing unit 250 (FIG. 1) divides each deformation area TA into a plurality of small areas. FIG. 19 illustrates one example of a method of dividing the deformation area TA into small areas. The deformation area dividing unit 250 arranges a plurality of dividing points D in the deformation area TA and then divides the deformation area TA into a plurality of small areas using the straight lines that connect the dividing points D. When the plurality of deformation areas TA are present, each deformation area TA is divided into small areas.

The mode of arrangement of the dividing points D (the number and positions of the dividing points D) is defined in the dividing point arrangement pattern table 410 (FIG. 1) in association with a deformation type that is set in S120 (FIG. 4). The deformation area dividing unit 250 references the dividing point arrangement pattern table 410 and then arranges dividing points D in the mode that is associated with the deformation type set in S120. In the present example embodiment, as described above, because the deformation "type A" (see FIG. 5) for sharpening a face is set as the deformation type, the dividing points D are arranged in the mode that is associated with this deformation type.

As shown in FIG. 19, the dividing points D are arranged at intersections of horizontal dividing lines Lh and vertical dividing lines Lv and at intersections of the horizontal dividing lines Lh or vertical dividing lines Lv and the outer frame line of the deformation area TA. Here, the horizontal dividing lines Lh and the vertical dividing lines Lv are reference lines for arranging the dividing points D in the deformation area TA. As shown in FIG. 19, in arranging the dividing points D that are associated with the deformation type for sharpening a face, two horizontal dividing lines Lh perpendicular to the reference line RL and four vertical dividing lines Lv parallel to the reference line RL are set. The two horizontal dividing lines Lh are denoted as Lh1, Lh2 in the order from the lower side of the deformation area TA. In addition, the four vertical dividing lines Lv are denoted as Lv1, Lv2, Lv3, and Lv4 in the order from the left side of the deformation area TA.

In the deformation area TA, the horizontal dividing line Lh1 is arranged on the lower side relative to the image of the jaw, and the horizontal dividing line Lh2 is arranged immediately below the images of the eyes. In addition, the vertical dividing lines Lv1 and Lv4 each are arranged outside the image of the line of the cheek, and the vertical dividing lines Lv2 and Lv3 each are arranged outside the image of the outer corner of the eye. The arrangement of the horizontal dividing lines Lh and vertical dividing lines Lv is executed in accordance with the correspondence relationship with the size of the deformation area TA that is set in advance so that the positional relationship between the horizontal dividing lines Lh or vertical dividing lines Lv and the image eventually becomes the above described positional relationship.

In accordance with the above described arrangement of the horizontal dividing lines Lh and vertical dividing lines Lv, the dividing points D are arranged at the intersections of the horizontal dividing lines Lh and the vertical dividing lines Lv and at the intersections of the horizontal dividing lines Lh or vertical dividing lines Lv and the outer frame line of the deformation area TA. As shown in FIG. 19, the dividing points D that are located on the horizontal dividing line Lhi (i=1 or 2) are denoted as D0$i$, D1$i$, D2$i$, D3$i$, D4$i$, and D5$i$ in the order from the left side. For example, the dividing points D that are located on the horizontal dividing line Lh1 are denoted as D01, D11, D21, D31, D41, and D51. Similarly, the dividing points that are located on the vertical dividing line Lvj (j=any one of 1, 2, 3, and 4) are denoted as Dj0, Dj1, Dj2, and Dj3 in the order from the lower side. For example, the dividing points D that are located on the vertical dividing line Lv1 are denoted as D10, D11, D12, and D13.

As shown in FIG. 19, the dividing points D in the present example embodiment are arranged symmetrically with respect to the reference line RL. The deformation area dividing unit 250 divides the deformation area TA into a plurality of small areas using the straight lines that connect the arranged dividing points D (that is, the horizontal dividing lines Lh and the vertical dividing lines Lv). In the present example embodiment, as shown in FIG. 19, the deformation area TA is divided into 15 rectangular small areas. Because the arrangement of the dividing points D is determined on the basis of the number and positions of the horizontal dividing lines Lh and vertical dividing lines Lv, the dividing point arrangement pattern table 410 may be regarded that it defines the number and positions of the horizontal dividing lines Lh and vertical dividing lines Lv.

In S190 (FIG. 4), the deformation processing unit 260 (FIG. 1) executes the image deformation process on the deformation area TA of the target image TI. The deformation process is executed by the deformation processing unit 260 in such a manner that the positions of the dividing points D within the deformation area TA are moved in S180 to thereby deform the small areas. The process in S190 is also performed on each deformation area TA when the plurality of deformation areas TA are present.

The moving mode (moving direction and moving distance) of the position of each dividing point D for deformation process is determined in advance in association with the combinations of the deformation type and the degree of deformation, which are set in S120 (FIG. 4), by the dividing point moving table 420 (FIG. 1). The deformation processing unit 260 references the dividing point moving table 420 and moves the positions of the dividing points D using the moving direction and moving distance that are in association with the combination of the deformation type and the degree of deformation, which are set in S120.

In the present example embodiment, because the deformation "type A" (see FIG. 5) for sharpening a face is set as the deformation type, and the degree of extent "Middle" is set as the deformation degree, the positions of the dividing points D are moved using the moving direction and the moving distance, which are associated with the combination of this deformation type and degree.

Figures 20, 21:
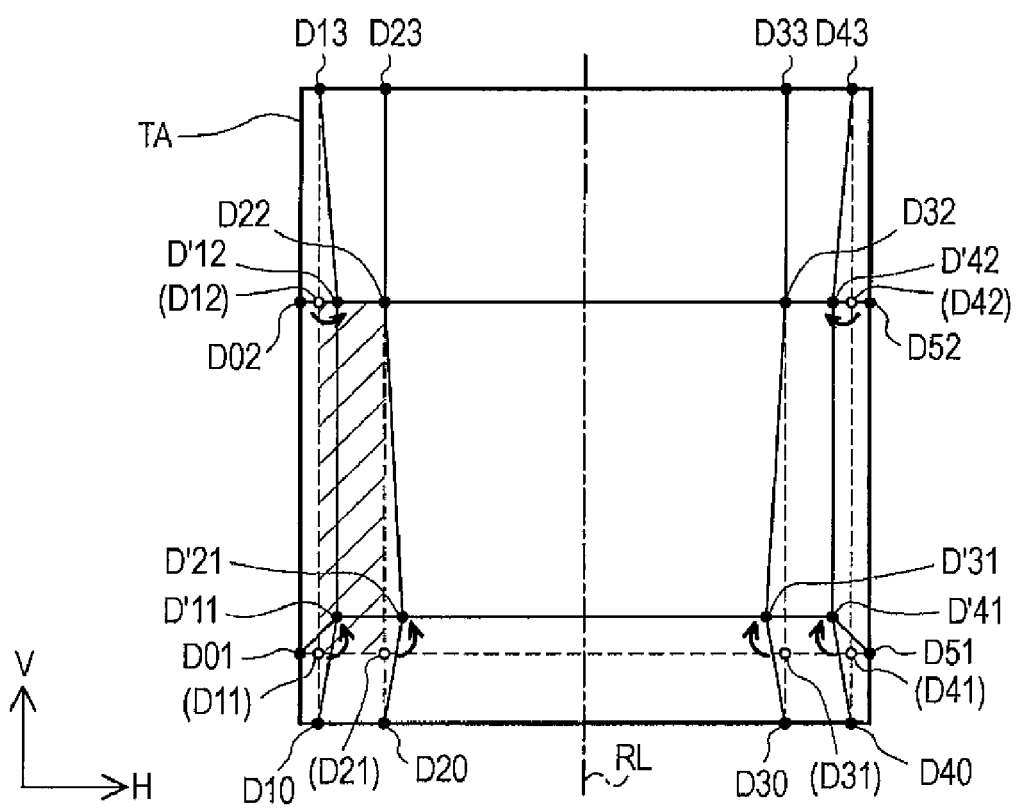
FIG. 20 is a view that illustrates one example of the content of a dividing point moving table.
FIG. 21 is a view that illustrates one example in which positions of dividing points are moved in accordance with the dividing point moving table.

FIG. 20 illustrates one example of the content of the dividing point moving table 420. In addition, FIG. 21 illustrates one example of movement of positions of dividing points D in accordance with the dividing point moving table 420. FIG. 20 shows, among the moving modes of the positions of the dividing points D defined by the dividing point moving table 420, a moving mode that is associated with the combination of the deformation type for sharpening a face and the deformation degree "Middle". As shown in FIG. 20, the dividing point moving table 420 indicates, with respect to each of the dividing points D, the amount of movement along a direction (H direction) perpendicular to the reference line RL and along a direction (V direction) parallel to the reference line RL. In the present example embodiment, the unit of the amount of movement shown in the dividing point moving table 420 is a pixel pitch PP of the target image TI. In addition, in regard to the H direction, the amount of movement toward the right side is indicated by a positive value and the amount of movement toward the left side is indicated by a negative value, while, in regard to the V direction, the amount of upward movement of a face is indicated by a positive value and the amount of downward movement of a face is indicated by a negative value. For example, the dividing points D11 are moved toward the right-hand side by a distance of seven times the pixel pitch PP along the H direction and are moved upward by a distance of 14 times the pixel pitch PP along the V direction. In addition, for example, the amount of movement of the dividing point D22 is zero in both the H direction and V direction, so that the dividing point D22 will not be moved.

In the present example embodiment, in order to avoid making the boundary between the images inside and outside the deformation area TA unnatural, the positions of the dividing points D (for example, the dividing point D10, and the like, shown in FIG. 21) located on the outer frame line of the deformation area TA are not moved. Thus, the dividing point moving table 420 shown in FIG. 20 does not define a moving mode with respect to the dividing points D that are located on the outer frame line of the deformation area TA.

FIG. 21 shows the dividing points D that have not yet been moved using the outline circle and shows the dividing points D that have been moved or the dividing points D of which the positions will not be moved using the solid circle. In addition, the dividing points D that have been moved are denoted by dividing points D'. For example, the position of the dividing point D11 is moved in an upper right direction in FIG. 21 and then it will be a dividing point D'11.

In the present example embodiment, the moving mode is determined so that all the pairs of the dividing points D that are symmetrically located with respect to the reference line RL (for example, the pair of the dividing point D11 and the dividing point D41) maintain the symmetrical positional relationship with respect to the reference line RL even after the dividing points D have been moved.

The deformation processing unit 260 executes the image deformation process on each of the small areas that constitute the deformation area TA so that the images of the small areas in a state where the positions of the dividing points D have not yet been moved become images of small areas that are newly defined through the position movement of the dividing points D. For example, in FIG. 21, the image of a small area (small area indicated by hatching) having vertexes of dividing points D11, D21, D22, and D12 is deformed into the image of a small area having vertexes of dividing points D'11, D'21, D22, and D'12.

Figure 22:
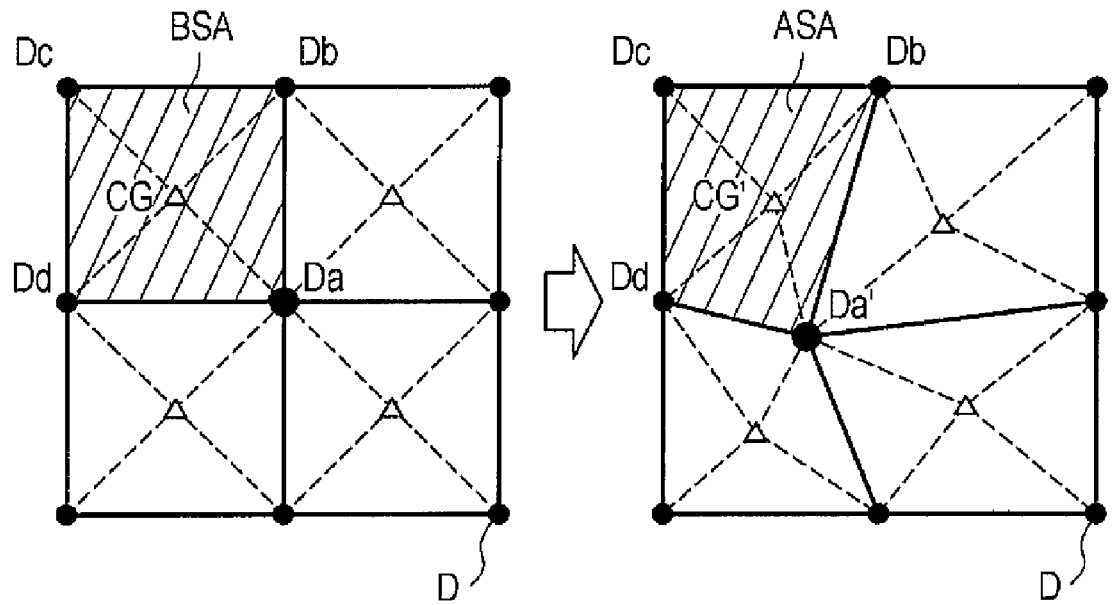
FIG. 22 is a view that illustrates the concept of a method of performing deformation on an image using a deformation processing unit.

FIG. 22 illustrates the concept of a deformation processing method of an image using the deformation processing unit 260. In FIG. 22, the dividing points D are shown using solid circles. FIG. 22 shows, with respect to four small areas, the state of dividing points D, of which the positions have not yet been moved, on the left-hand side and the state of dividing points D, of which the positions have been moved, on the right-hand side, respectively, for easy description. In the example shown in FIG. 22, a center dividing point Da is moved to the position of a dividing point Da', and the positions of the other dividing points will not be moved. In this manner, for example, the image of a rectangular small area (hereinafter, also referred to as "pre-deformation focusing small area BSA") having the vertexes of dividing points Da, Db, Dc, and Dd of which the positions of the dividing points D have not yet been moved is deformed into the image of a rectangular small area (hereinafter, also referred to as "post-deformation focusing small area ASA") having the vertexes of the dividing points Da', Db, Dc, and Dd.

In the present example embodiment, the rectangular small area is divided into four triangle areas using the center of gravity CG of the rectangular small area, and the image deformation process is executed on a triangle area basis. In the example of FIG. 22, the pre-deformation focusing small area BSA is divided into four triangle areas, each having one of the vertexes at the center of gravity CG of the pre-deformation focusing small area BSA. Similarly, the post-deformation focusing small area ASA is divided into four triangle areas, each having one of the vertexes at the center of gravity CG' of the post-deformation focusing small area ASA. Then, the image deformation process is executed for each of the triangle areas corresponding to the respective states of the dividing point Da before and after movement. For example, the image of a triangle area that has the vertexes of dividing points Da, Dd and the center of gravity CG within the pre-deformation focusing small area BSA is deformed into the image of a triangle area that has the vertexes of dividing points Da', Dd and the center of gravity CG' within the post-deformation focusing small area ASA.

Figure 23:
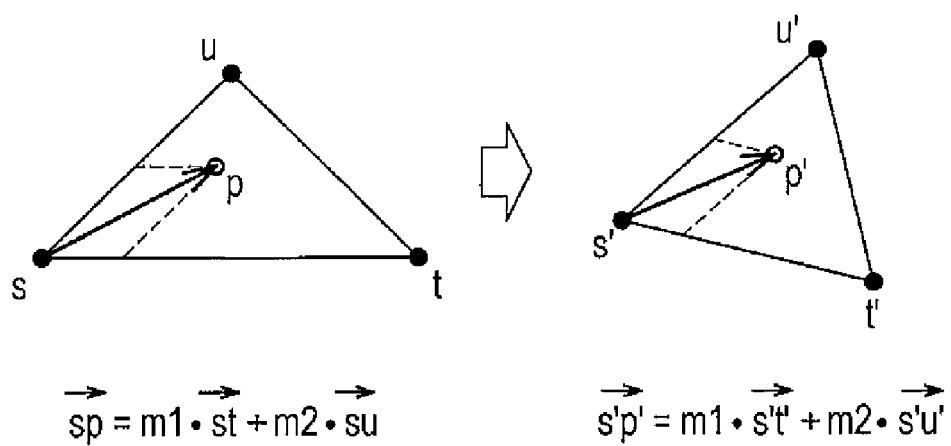
FIG. 23 is a view that illustrates the concept of a method of performing deformation process on an image in a triangle area.

FIG. 23 illustrates the concept of a method of performing deformation process on an image in a triangle area. In the example of FIG. 23, the image of a triangle area stu that has the vertexes of points s, t, and u is deformed into the image of a triangle area s't'u' that has the vertexes of points s', t', and u'. The deformation of an image is performed in such a manner that which one of the positions in the image of the triangle area stu that has not yet been deformed corresponds to each of the positions of pixels in the image of the triangle area s't'u' that has been deformed is calculated, and pixel values in the image that has not yet been deformed at the positions calculated are set to pixel values of the image that has been deformed.

For example, in FIG. 23, the position of a focusing pixel p' in the image of the triangle area s't'u' that has been deformed corresponds to a position p in the image of the triangle area stu that has not yet been deformed. The calculation of the position p is performed in the following manner. First, coefficients m1 and m2 that are used to represent the position of the focusing pixel p' using the sum of a vector s't' and a vector s'u' shown in the following equation (1) are calculated.

Equation 1

$$\vec{s'p'} = m1 \cdot \vec{s't'} + m2 \cdot \vec{s'u'} \quad (1)$$

Next, using the calculated coefficients m1 and m2, the sum of a vector st and a vector su in the triangle area stu that has not yet been deformed is calculated through the following equation (2) and, as a result, the position p is obtained.

Equation 2

$$\vec{sp} = m1 \cdot \vec{st} + m2 \cdot \vec{su} \quad (2)$$

When the position p in the triangle area stu that has not yet been deformed coincides with a pixel center position of the image that has not yet been deformed, the pixel value of that pixel is set as a pixel value of the image that has been deformed. On the other hand, when the position p in the triangle area stu that has not yet been deformed becomes a position deviated from the pixel center position of the image that has not yet been deformed, a pixel value at the position p is calculated by means of interpolation computing, such as bicubic, that uses the pixel values of pixels around the position p, and then the calculated pixel value is set to a pixel value of the image that has been deformed.

By calculating the pixel value as described above in regard to each pixel of the image in the triangle area s't'u' that has been deformed, an image deformation process by which the image of the triangle area stu is deformed into the image of the triangle area s't'u' is executed. The deformation processing unit 260, in terms of each of the small areas that constitute the deformation area TA shown in FIG. 21, defines the triangle area as described above and executes deformation process, thus executing the image deformation process on the deformation area TA.

Figure 24:
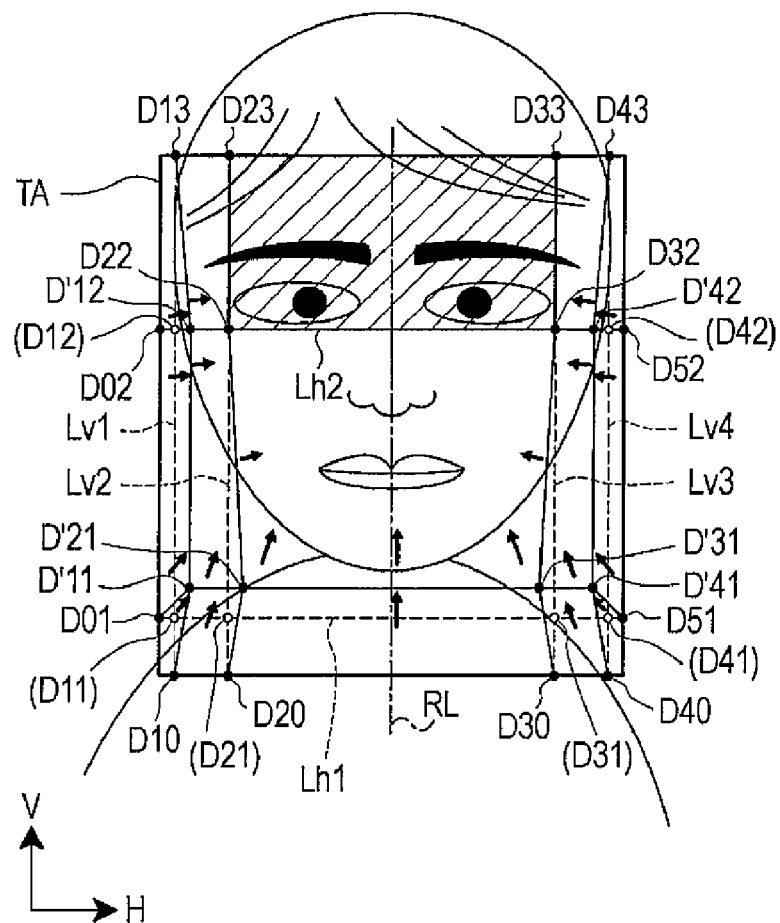
FIG. 24 is a view that illustrates a mode of face shape correction according to the present example embodiment.

The mode of face shape correction according to the present example embodiment is now described in more detail. FIG. 24 illustrates one example of the mode of face shape correction. In the present example embodiment, as described above, the deformation "type A" (see FIG. 5) for sharpening a face is set as the deformation type, and the degree of extent "Middle" is set as the deformation degree. In FIG. 24, the image of the deformation mode of each of the small areas that constitute the deformation area TA is shown by the arrow.

As shown in FIG. 24, with respect to a direction (V direction) parallel to the reference line RL, the positions of the dividing points D (D11, D21, D31, D41) that are arranged on the horizontal dividing line Lh1 are moved upward, while, on the other hand, the positions of the dividing points D (D12, D22, D32, D42) that are arranged on the horizontal dividing line Lh2 are not moved (see FIG. 20). Thus, the image located between the horizontal dividing line Lh1 and the horizontal dividing line Lh2 is reduced with respect to the V direction. As described above, because the horizontal dividing line Lh1 is arranged on the lower side relative to the image of the jaw, and the horizontal dividing line Lh2 is arranged immediately below the images of the eyes, in the face shape correction according to the present example embodiment, within the image of the face, the image of an area extending from the jaw to a portion below the eyes is reduced in the V direction. As a result, the line of the jaw in the image is moved upward.

On the other hand, with respect to a direction (H direction) perpendicular to the reference line RL, the positions of the dividing points D (D11, D12) that are arranged on the vertical dividing line Lv1 are moved to the right direction, and the positions of the dividing points D (D41, D42) that are arranged on the vertical dividing line Lv4 are moved to the left direction (see FIG. 20). Furthermore, among two dividing points D that are arranged on the vertical dividing line Lv2, the position of the dividing point D (D21) that is arranged on the horizontal dividing line Lh1 is moved to the right direction, and, among two dividing points D that are arranged on the vertical dividing line Lv3, the position of the dividing point D (D31) that is arranged on the horizontal dividing line Lh1 is moved to the left direction (see FIG. 20). Thus, the image that is located on the left side with respect to the vertical dividing line Lv1 is enlarged to the right side in the H direction, and the image on the right side with respect to the vertical dividing line Lv4 is enlarged to the left side in the H direction. In addition, the image that is located between the vertical dividing line Lv1 and the vertical dividing line Lv2 is reduced or moved to the right side in the H direction, and the image that is located between the vertical dividing line Lv3 and the vertical dividing line Lv4 is reduced or moved to the left side in the H direction. Furthermore, the image that is located between the vertical dividing line Lv2 and the vertical dividing line Lv3 is reduced in the H direction using the position of the horizontal dividing line Lh1 as a center.

As described above, the vertical dividing lines Lv1 and Lv4 each are located outside the image of the line of the cheek, the vertical dividing lines Lv2 and Lv3 each are arranged outside the image of the outer corner of the eye. Therefore, in the face shape correction according to the present example embodiment, within the image of the face, the images of portions outside both the outer corners of the eyes are entirely reduced in the H direction. In particular, the reduction ratio is high around the jaw. As a result, the shape of the face in the image is entirely narrowed in the width direction.

When the deformation modes in the H and V directions, described above, are combined, the shape of the face in the target image TI is sharpened through the face shape correction according to the present example embodiment. Such sharpening of the shape of a face may be expressed as becoming a so-called "small face".

The small areas (hatched areas) having the vertexes at the dividing points D22, D32, D33, and D23 shown in FIG. 24 include the images of both eyes when the above described method of arranging the horizontal dividing line Lh2 and the vertical dividing lines Lv2 and Lv3 is used. As shown in FIG. 20, because the dividing points D22 and D32 are not moved in the H direction or in the V direction, the small area that includes the images of both eyes is not deformed. In the present example embodiment as described above, the small area that includes the images of both eyes is not deformed, so that the image on which face shape correction has been executed becomes more natural and desirable.

Figure 25:
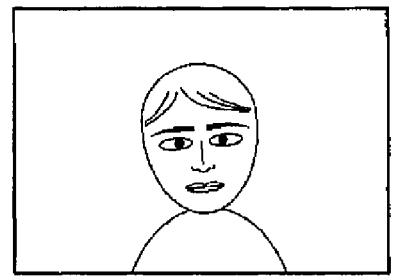
FIG. 25 is a view that illustrates one example of the state of a display unit that displays a target image on which face shape correction has been performed.

In S200 (FIG. 4), the face shape correction unit 200 (FIG. 1) instructs the display processing unit 310 to make the display unit 150 display the target image TI on which the face shape correction has been executed. FIG. 25 illustrates one example of the state of the display unit 150 on which the target image TI obtained after face shape correction is displayed. Using the display unit 150 on which the target image TI, on which the face shape correction has been executed, is displayed, a user is able to confirm the corrected target image TI. When the user is not satisfied with the correction result and then selects "GO BACK" button, for example, the screen to select a deformation type and a deformation degree, shown in FIG. 5, is displayed on the display unit 150. Then, resetting of the deformation type and degree is performed by the user.

When the user is satisfied with the correction result and then selects "PRINT" button, the following corrected image printing process is initiated.

Figure 26:
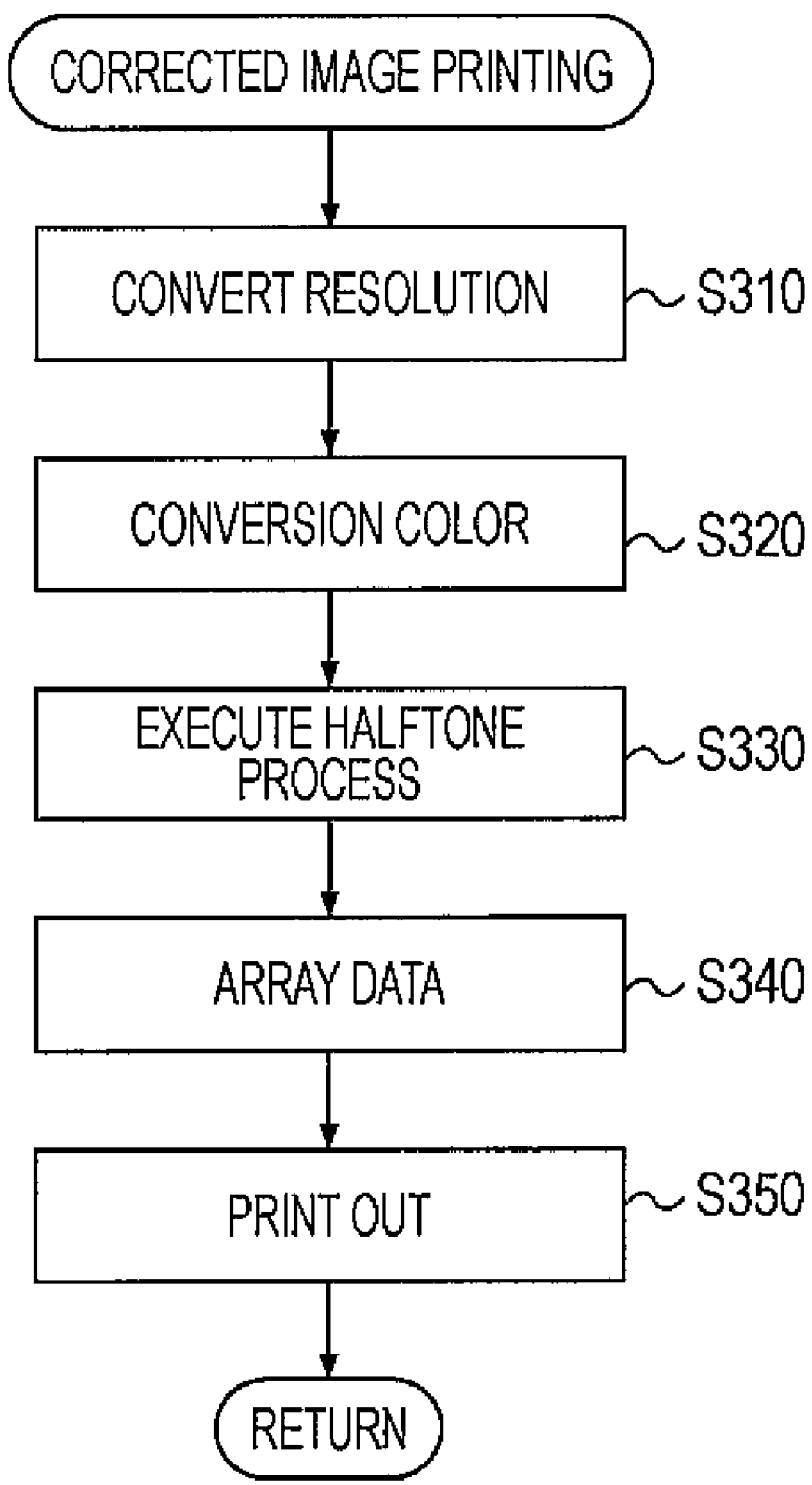
FIG. 26 is a flowchart of a corrected image printing process.

In S300 (FIG. 3), the print processing unit 320 (FIG. 1) controls the printer engine 160 to thereby print out the target image TI on which the face shape correction process has been executed. FIG. 26 is a flowchart of a face shape correction printing process according to the present example embodiment. The print processing unit 320 converts a resolution of image data of the target image TI on which the face shape correction process has been executed into a resolution that is suitable for printing process by the printer engine 160 (S310), and converts the image data on which the resolution has been converted into ink color image data that are expressed in gray-scales with a plurality of ink colors used for printing in the printer engine 160 (S320). In the present example embodiment, a plurality of ink colors used for printing in the printer engine 160 are four colors consisting of cyan (C), magenta (M), yellow (Y) and black (K). Furthermore, the print processing unit 320 executes a halftone process on the basis of gray-scale levels of ink colors in the ink color image data to thereby generate dot data that indicates a state in which ink dot is formed in each printing pixel (S330) and generate print data by arraying dot data (S340). The print processing unit 320 supplies the generated print data to the printer engine 160 and instructs the printer engine 160 to print out the target image TI (S350). In this manner, printing of the target image TI, on which the face shape correction has been executed, is completed.

As described above, in the face shape correction printing process performed by the printer 100 according to the present example embodiment, a plurality of dividing point D are arranged in the deformation area TA that is set on the target image TI, and the deformation area TA is divided into a plurality of small areas using straight lines that connect the dividing points D (horizontal dividing lines Lh and vertical dividing lines Lv). In addition, the deformation process of an image in the deformation area TA is executed in such a manner that the positions of the dividing points D are moved and thereby the small areas are deformed. In this way, image deformation is performed only by arranging dividing points D in the deformation area TA and then moving the arranged dividing points D. Thus, image processing for image deformation corresponding to various deformation modes is easily and effectively achieved.

In addition, according to the present example embodiment, the image deformation process is performed on the deformation areas TA that are not determined to be excluded from a target for deformation process through any of the above exclusion determinations among the deformation areas TA set on the target image TI on the basis of detection of face areas. Thus, it is possible to appropriately suppress an excessive processing load or a large amount of memory consumption in the CPU 110 of the printer 100, which has occurred because deformation process is executed on all the deformation areas TA set on the target image TI on the basis of detection of face areas in the existing art. In particular, when the printer 100 is a multifunctional printer as described above, because resources that can be ensured for face shape correction printing process are limited, limiting the deformation areas TA used as a target for deformation process as in the case of the present example embodiment leads to a stable operation of the printer 100.

(3) Additional Description and Other Alternative Example Embodiments

Figure 39A:
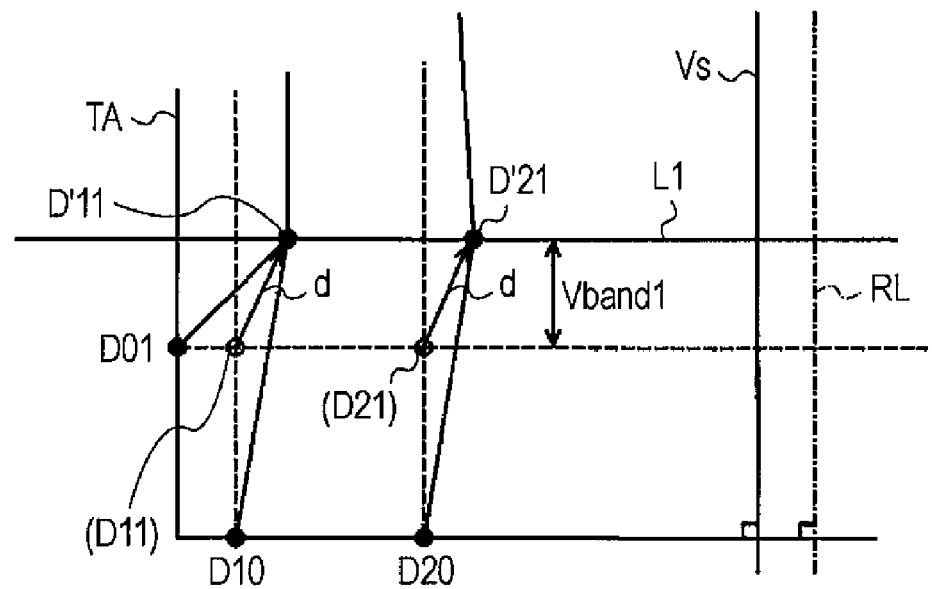
FIG. 39A and FIG. 39B are views illustrating part of region of a deformation area.
Figure 39B:
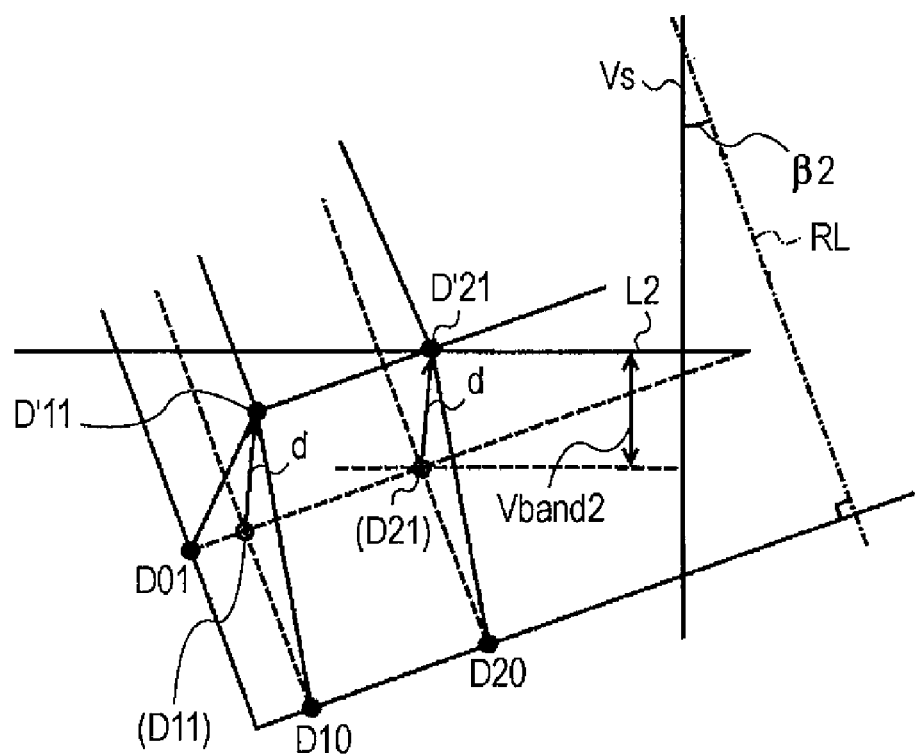

The situation that as the inclination (angle $\beta$) of a face area FA approaches to a certain upper limit angle (angle $\beta L$), memory consumption required for deformation process of a deformation area TA increases, as is referred to in the description of S171, is now described. FIG. 39A shows part of the deformation area TA of which the angle $\beta$ made by the vertical reference line Vs with the reference line RL is zero degrees. FIG. 39B shows part of the deformation area TA of which the angle $\beta$ made by the vertical reference line Vs with the reference line RL is a predetermined angle (for example, angle $\beta 2$) that is larger than zero degrees.

In the course of the deformation process in S190, the deformation processing unit 260 sequentially generates data of the deformed target image TI row by row (pixel row) perpendicular to the vertical reference line Vs. That is, the process to acquire a pixel value corresponding to each pixel of the deformed image from the target image TI before deformation (original image) is sequentially performed for each pixel row, and one piece of target image TI on which deformation has been performed is obtained in the end. In the course of the generation for each pixel row, the printer 100 temporarily saves data of a predetermined range on the original image necessary for acquiring a pixel value corresponding to each pixel of a pixel row in a predetermined buffer area, such as the internal memory 200, and uses the data for deformation process during the process to generate the pixel row. Thus, as a range on an original image necessary for acquiring a pixel value corresponding to each pixel of the deformed pixel row increases, memory consumption in the printer 100 increases.

FIGS. 39A and 39B specifically show a bottom left portion of the deformation area TA, including the dividing points D11 and D21. The dividing points D11 and D21 (similarly, the dividing points D31 and D41 on the right-hand side of the reference line RL) are moved at the longest moving distance d between before and after deformation in the deformation process according to the present example embodiment (see the dividing point moving table 420). Taking movement of such dividing points D that are moved at a long moving distance for example, the difference in memory utilization required for deformation process is described. For example, in the deformation process in S190, to generate a pixel row L1 that includes the dividing point D'21 shown in FIG. 39A, at least data of the dividing point D21 on the original image before being moved to the dividing point D'21 is necessary. In addition, because, to generate the pixel row L1, other pixels on the pixel row L1, other than the dividing point D'21, are also required to acquire pixel values from the original image, data of a pixel row at the corresponding position of the pixel row L1 on the original image and data of a pixel row at a position that is not spaced as in the case of the dividing point D21 but spaced a certain distance away from the pixel row L1 on the original image are necessary.

Thus, at the time of generation of the pixel row L1, at least image data of a width (Vband1) from a pixel row at the corresponding position of the pixel row L1 to a pixel row that includes the dividing point D21 within data of the original image are temporarily saved in a buffer area as described above and then used for deformation process. On the other hand, as shown in FIG. 39B, when a pixel row L2 that includes the dividing point D'21 is generated in a state where the deformation area TA is inclined on the target image TI, data, or the like, of the dividing point D21 on the original image before being moved to the dividing point D'21 is necessary. Thus, at the time of generation of the pixel row L2, at least image data of a width (Vband2) from a pixel row at the corresponding position of the pixel row L2 to a pixel row that includes the dividing point D21 within data of the original image are temporarily saved in a buffer area and then used for deformation process.

Even when the deformation area TA is inclined or not inclined with respect to the vertical reference line Vs, a moving distance d of each dividing point D substantially does not change. However, in the deformation process according to the present example embodiment, as is apparent from the description with reference to FIG. 24, and the like, almost all the dividing points that move during deformation not in a direction parallel to the reference line RL but in a direction oblique to the reference line RL. The dividing point D21 also moves not in a direction parallel to the reference line RL but moves in a top right direction in the deformation area TA. Thus, when the deformation area TA is inclined with respect to the vertical reference line Vs as shown in FIG. 39B, the moving direction of the dividing point D21 approaches to a direction parallel to the vertical reference line Vs and, therefore, a distance in a direction parallel to the vertical reference line Vs between the dividing point D21 before movement and the dividing point D'21 after movement increases. That is, as shown in FIGS. 39A and 39B, when the deformation area TA is inclined with respect to the vertical reference line Vs at an angle of zero degrees, a buffer area required for generating the pixel row L1 that includes the dividing point D'21 just needs to have space that is able to store image data of the original image corresponding to an amount of Vband1, whereas when the deformation area TA is inclined with respect to the vertical reference line Vs at an angle of β2, a buffer area required for generating the pixel row L2 that includes the dividing point D'21 needs to have space that is able to store the image data corresponding to an amount of Vband2 that is larger in band width than the Vband1.

In the present example embodiment, the deformation process is performed on the deformation area TA symmetrically with respect to the central reference line RL. Thus, as shown in FIG. 39B, when the deformation area TA is inclined with respect to the vertical reference line Vs, right and left dividing points D that are symmetrical with respect to the reference line RL (for example, the relationship between the dividing point D21 and the dividing point D31) approach a state in which the moving direction of one of the right and left dividing points D is substantially parallel to the vertical reference line Vs and the moving direction of the other dividing point D is substantially perpendicular to the vertical reference line Vs. However, because the size of a buffer area that should be ensured for the image deformation process needs to be a necessary maximum amount, the size of a required buffer area will be larger when the deformation process is performed in the case of FIG. 39B than when the deformation process is performed in the case of FIG. 39A. Additionally, the relationship between the reference line RL and the vertical reference line Vs is used for description; however, the same applies to the relationship between the reference line RL and the horizontal reference line Hs. That is, in comparison with the case in which the reference line RL is parallel to the horizontal reference line Hs, the moving directions of the above dividing points D11 and D21 (or dividing points D31 and D42), or the like, approach to a parallel relation to the vertical reference line Vs when the angle β is formed between the reference line RL and the horizontal reference line Hs.

In the present example embodiment as described above, even when the size of the face area FA is the same, a larger amount of memory is required for deformation process as the moving direction of a dividing point D in deformation approaches to a parallel relation to the vertical reference line Vs or the horizontal reference line Hs because of inclination of the face area FA (deformation area TA) on the target image TI. For this reason, as described above, as the inclination (angle β) of the face area FA approaches to the upper limit angle βL, the upper limit of size of the face area FA that can be used as a target for deformation process is reduced, thus suppressing memory consumption in the printer 100.

The value of the upper limit angle βL may be defined on the basis of the moving direction of a dividing point D that has a long moving distance in deformation within the deformation area TA. For example, on the basis of moving distances of the dividing point D21 in the H direction (direction perpendicular to the reference line RL) and in the V direction (direction parallel to the reference line RL), which are defined in the dividing point moving table 420, the moving direction of the dividing point D21 in the deformation area TA may be specified to set an angle made by the moving direction of the dividing point D21 with the V direction to the upper limit angle βL. In addition, because the moving direction of each dividing point D in the deformation area TA differs depending on the deformation degree, or the like, set in S120, the upper limit angle βL (the face area size upper limit table 430 that defines the upper limit angle βL, or the like) may be defined for each deformation degree set in S120.

Alternatively, the value of the upper limit angle βL may be set in consideration of the process in S173 (third exclusion determination) performed after S171. In the present example embodiment, because of the third exclusion process, only a deformation area TA of which the angle γ made by the positive direction of the horizontal reference line Hs with the upper direction of the reference line RL falls within a range of ±15 degrees with respect to the positive direction of the horizontal reference line Hs, a range of ±15 degrees with respect to the positive direction of the vertical reference line Vs and a range of ±15 degrees with respect to the negative direction of the horizontal reference line HS is left as a target for deformation process. Thus, the above 15 degrees may be used as the upper limit angle βL. In a state where the upper limit angle βL is set to 15 degrees, when a value larger than 15 degrees is detected as the angle β in S1711 (FIG. 28), the deformation area TA from which the above angle β has been detected does not need to further continue the first exclusion determination. In this case, the deformation area TA from which the above angle β has been detected is determined to be excluded from a deformation target through the third exclusion determination.

In addition, when the top sides of faces are random on the target image TI as well, a region of the original image required for acquiring a pixel value corresponding to each pixel of the deformed pixel row increases and, as a result, a load due to deformation process increases. For example, it is assumed that another deformation area TA (not shown) is present at a position on the right-hand side or on the left-hand side of the deformation area TA shown in FIG. 39A and located on the pixel row L1 in the drawing. When the top side of the another deformation area TA is the same as the top side of the deformation area TA shown in FIG. 39A (when the top sides of both the deformation areas TA are oriented substantially upward in the target image TI), a region of the original image required for acquiring a pixel value of each pixel in the pixel row L1 is approximately limited to a group of pixel rows consisting of the pixel row L1 and a plurality of pixel rows located below the pixel row L1. However, when the top side of the another deformation area TA is oriented substantially downward, substantially rightward or substantially leftward, the moving direction of each pixel in a deformation area TA differs in each of the deformation areas TA. Thus, a region on the original image required for acquiring a pixel value of each pixel in the pixel row L1 tends to increase in the upward direction and downward direction of the pixel row L1 and, as a result, a large amount of buffers are required. Then, in the present example embodiment, as described above, the orientations of faces in the deformation areas TA used as a target for deformation process are substantially unified (fourth exclusion determination), so that an increase in memory consumption due to random top sides of faces on the target image TI is prevented.

Furthermore, according to another example embodiment, the exclusion determination unit 270 may detect free space available in a memory of the printer 100 point by point in the course of the first to seventh exclusion determinations. Then, when it is determined that the detected free space is necessary and sufficient space for performing deformation process on all the deformation areas TA that have not been excluded from a target for deformation process at that time, the process in S170 may be interrupted immediately and all the deformation areas TA that have not been excluded from a target for deformation process at that time may be used in the process in S180 and the following processes.

(4) Resetting of Deformation Area

In the above described exclusion determination process (S170 in FIG. 4), in view of suppressing memory consumption and amounts of processing, in S172 and S177 (FIG. 27), a deformation area TA that at least partially extends off an image region clipped from the target image Ti through various types of cropping is excluded from a target for deformation process. However, appropriate handling on the deformation area(s) TA that at least partially extend(s) off the cropped image region is not limited to exclusion from a target for deformation process. For example, the exclusion determination unit 270 may execute only the process in S171, S173-S176 from among S171-S177 shown in FIG. 27 and not execute the processes in S172 and S177. In this case, in S180 (FIG. 4) and the following processes, the deformation area(s) TA that has/have been set in the preceding S160 (FIG. 4) and that partially extend(s) off the cropped image region may also be a target for deformation process. Then, the deformation area(s) TA that partially extend(s) off the cropped image region is/are reset to be included within the cropped region, and then used as a target for deformation process.

Figure 40:
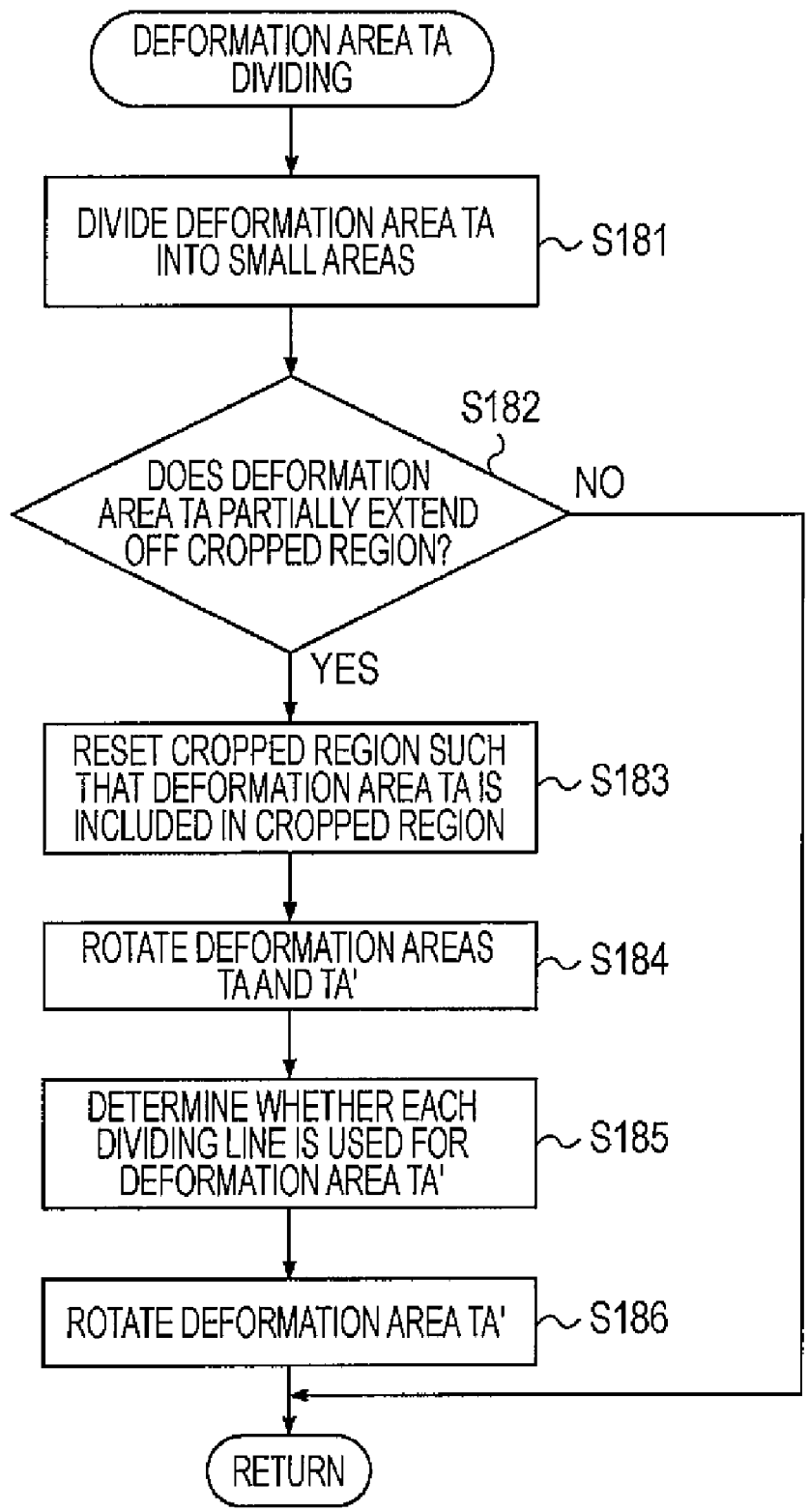
FIG. 40 is a flowchart of one example of a process using a deformation area dividing unit.

FIG. 40 is a flowchart that shows the detail of the process in S180 (FIG. 4) after the process in S170 has not executed the processes in S172 and S177. The process shown in FIG. 40 is performed on each of the deformation areas TA that have not been excluded in the end in the process in S170. In S181, the deformation area dividing unit 250 divides each deformation area TA into a plurality of small areas. That is, as is described above, the deformation area dividing unit 250 references the dividing point arrangement pattern table 410 to arrange dividing points D in the deformation area TA, and divides the deformation area TA into a plurality of small areas using straight lines that connect the dividing points D (horizontal dividing lines Lh and vertical dividing lines Lv).

In S182, the deformation area dividing unit 250 determines whether the deformation area TA at least partially extends off the image region clipped through cropping. Specifically, the deformation area dividing unit 250 determines the deformation area TA, which at least partially extends off the above described common image region CA, as the deformation area TA that extends off the image region clipped through cropping. In addition, when a cropping command is entered from the outside, the deformation area dividing unit 250 determines the deformation area TA, which at least partially extends off the cropped image clipped on the basis of the command, as the deformation area TA that extends off the image region that is cropped through cropping.

When in S182, it is determined that the deformation area TA at least partially extends off the image region that is clipped through cropping, the process proceeds to S183, and the deformation area dividing unit 250 resets the range of the deformation area TA so that the deformation area TA is included within the image region that is clipped through cropping.

Figure 41:
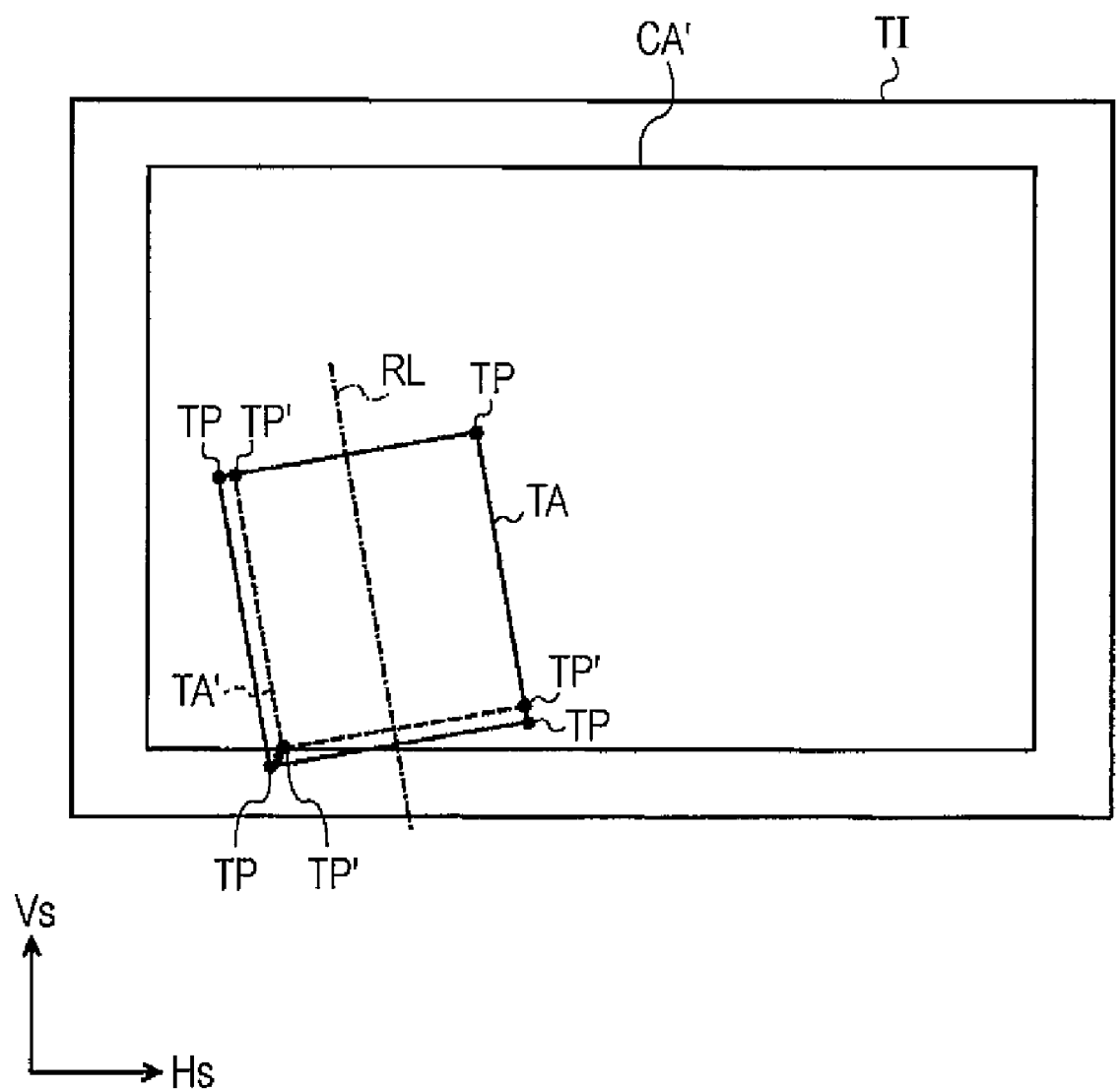
FIG. 41 is a view that illustrates one example of a state in which a deformation area is reset.

FIG. 41 illustrates a state in which a deformation area TA is reset. In FIG. 41, a rectangle that defines a common image region CA' in the target image TI is shown. The common image region CA' is a region that is common to the common image region CA and the cropped image that is clipped on the basis of the external cropping command. When no external cropping command is issued, the common image region CA coincides with the common image region CA'. In S183, the deformation area dividing unit 250 determines whether the coordinates of each of four vertexes (referred to as vertex TP) of the deformation area TA in the target image TI are included in the common image region CA'. Then, when there is a vertex TP that is located outside of the common image region CA', as shown in FIG. 41, the vertex TP that is located outside of the common image region CA' is moved to a position that is included in the common image region CA'.

The above movement is, for example, performed so that a rectangle surrounded by the vertexes TP before movement is similar to a rectangle surrounded by the four vertexes that include the vertexes TP after movement. Thus, when a certain vertex TP that is located outside of the common image region CA', other vertexes TP that define both ends of boundaries of the deformation area together with the moving vertex TP are also moved. However, the positions of the dividing points D that are arranged in the deformation area TA in the process in S181 are not changed. The deformation area dividing unit 250 sets a rectangle surrounded by the four vertexes TP that include the moved vertexes TP as a reset deformation area TA'. In FIG. 41 and in FIGS. 42A and 42B, which will be described later, the moved vertexes TP are denoted by TP'.

In S184, the deformation area dividing unit 250 rotates each of the rectangles of the deformation area TA and the deformation area TA' on the target image TI until the height direction (a direction parallel to the reference line RL) of the deformation area TA (TA') is parallel to the vertical reference line Vs of the target image TI. In S185, the deformation area dividing unit 250 determines whether each dividing line (horizontal dividing line Lh and vertical dividing line Lv) in the deformation area TA is employed as a line that divides the deformation area TA' into small areas on the basis of positional relationship with respect to the deformation area TA'.

Figure 42A:
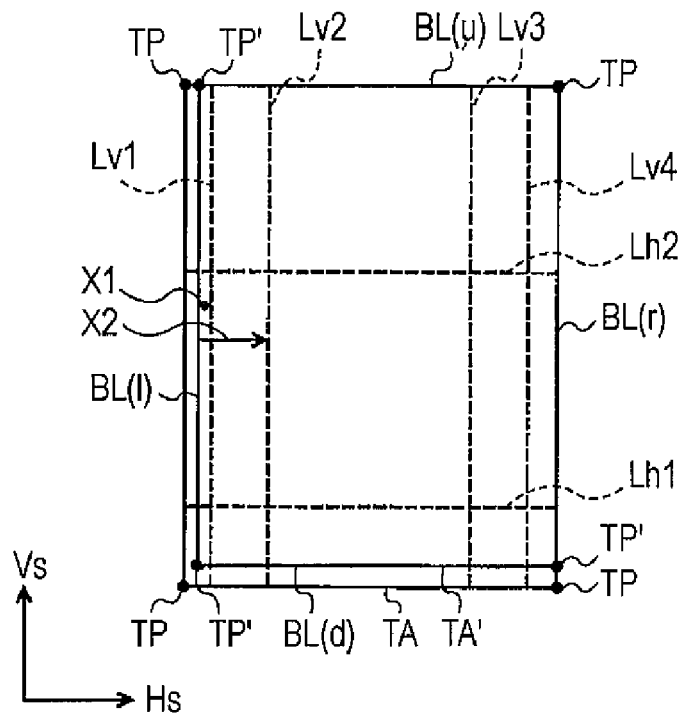
FIG. 42A and FIG. 42B are views illustrating the positional relationship between each dividing line of a deformation area and a reset deformation area.
Figure 42B:
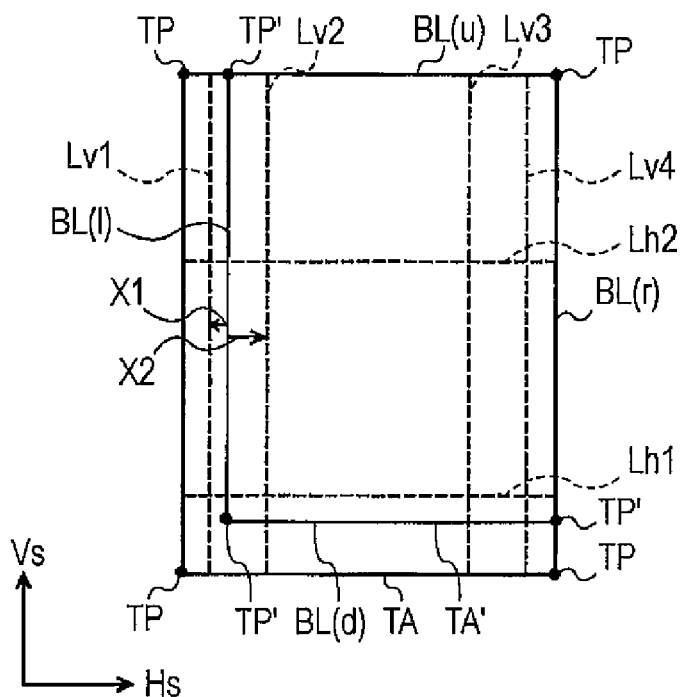

FIGS. 42A and 42B illustrate the positional relationship between each dividing line (horizontal dividing lines Lh1 and Lh2, and vertical dividing lines Lv1, Lv2, Lv3 and Lv4) in the deformation area TA and the reset deformation area TA'. In FIGS. 42A and 42b, the deformation areas TA and TA' are indicated by solid line, and each dividing line is indicated by chain line. Although not shown in the drawing, points of intersection, or the like, of the dividing lines are dividing points D. In S185, the deformation area dividing unit 250, for example, measures a difference in position on the coordinates between each of the vertical dividing lines Lv1, Lv2, Lv3 and Lv4 and the boundary lines parallel to the vertical reference line Vs of the deformation area TA', and determines whether each of the vertical dividing lines Lv1, Lv2, Lv3 and Lv4 is employed as a ling that divides the deformation area TA' into small areas depending on whether the above difference satisfies a predetermined reference value. For example, the deformation area dividing unit 250 measures a difference X1 along a horizontal reference line Hs (right-hand side is positive) between the left boundary line BL(l), out of the right and left boundaries BL(l) and BL(r) parallel to the vertical reference line Vs of the deformation area TA', to the vertical dividing line Lv1, and, when the difference X1 is larger than a predetermined value (positive value equal to or more than 0), determines to employ the vertical dividing line Lv1.

That is, in this case, because the vertical dividing line Lv1 at least passes the inside of the deformation area TA', the vertical dividing line Lv1 may be used to divide the deformation are TA' into small areas. Similarly, the deformation area dividing unit 250 measures a difference X2 along the horizontal reference line Hs (right-hand side is positive) from the boundary line BL(l) to the vertical dividing line Lv2 and, when the difference X2 is larger than a predetermined value (positive value equal to or more than 0), determines to employ the vertical dividing line Lv2. For the right vertical dividing lines Lv3 and Lv4, differences along the horizontal reference line Hs (right-hand side is positive) from the boundary line BL(r) to the vertical dividing lines Lv3 and Lv4 are respectively measured and, when each of the differences is smaller than a predetermined value (negative value equal to or less than 0), it is determined to employ the vertical dividing lines Lv3 and Lv4, respectively.

In addition, the deformation area dividing unit 250, for example, measures a difference in position on the coordinates between each of the horizontal dividing lines Lh1 and Lh2 and a boundary line parallel to the horizontal reference line Hs of the deformation area TA' and determines whether each of the horizontal dividing lines Lh1 and Lh2 is employed as a line that divides the deformation area TA' into small areas depending on whether the corresponding difference satisfies a predetermined reference value. For example, the deformation area dividing unit 250 measures a difference along the vertical reference line Vs (upper side is positive) from the lower boundary line BL(d), out of the upper and lower boundaries BL(u) and BL(d) parallel to the horizontal reference line Hs of the deformation area TA' to the horizontal dividing line Lh1 and, when the difference is larger than a predetermined value (positive value equal to or more than 0), determines to employ the horizontal dividing line Lh1. In addition, the deformation area dividing unit 250 measures a difference along the vertical reference line Vs (upper side is positive) from the upper boundary line BL(u) to the horizontal dividing line Lh2 and, when the difference is smaller than a predetermined value (negative value equal to or less than 0), determines to employ the horizontal dividing line Lh2.

In the example shown in FIG. 42A, because all the horizontal dividing lines Lh1 and Lh2 and the vertical dividing lines Lv1, Lv2, Lv3 and Lv4 pass the inside of the deformation area TA', these dividing lines are basically employed as a line that divides the deformation area TA' into small areas. On the other hand, in the example shown in FIG. 42B, because the vertical dividing line Lv1 passes the outside of the deformation area TA' among the horizontal dividing lines Lh1 and Lh2 and the vertical dividing lines Lv1, Lv2, Lv3 and Lv4, at least the vertical dividing line Lv1 is not employed as a ling that divides the deformation area TA' into small areas. In S186, the deformation area dividing unit 250 performs a process to return the inclination of the deformation area TA' to the inclination equal to the inclination of the original deformation area TA on the target image TI. That is, rotation that is reverse to the rotation performed on the deformation area TA' in S184 is performed.

After the process shown in FIG. 40, the deformation processing unit 260 (FIG. 1) performs the deformation process as described above (S190 in FIG. 4). Here, when the deformation area TA is reset in S183 (FIG. 40) by the deformation area dividing unit 250, the deformation processing unit 260 moves the positions of the dividing points D on the divining lines, which are determined to be employed in S185 (FIG. 40), to thereby deform each of the small areas within the deformation area TA' divided by the dividing lines that are determined to be employed.

According to the present invention, when at least a portion of the deformation area TA that is once set partially extends off the image region clipped through cropping, a rectangle of the extended deformation area TA may be reset so as to be included in a cropped image and dividing points used as a target for movement at the time of deformation process may be reselected. As a result, a face regarding the extended deformation area may also be naturally deformed. That is, according to the present invention, it is possible to provide a choice such that the deformation area TA that is partially located outside is excluded from a target for the deformation process to suppress memory consumption, or the like, and a choice such that an appropriate deformation process is executed on the deformation area TA that is partially located outside.

The aspects of the invention are not limited to the example embodiments described above, and may be modified into various alternative embodiments without departing from the scope of the appended claims. In the above example embodiment, the face shape correction printing process by the printer 100, which serves as an image processing device, is described; however, the face shape correction printing process may be performed in such a manner that, for example, the face shape correction (step S100) is executed by a personal computer and only the printing process (step S300) is executed by the printer. In addition, the printer 100 is not limited to an ink jet printer, but it may include printers of other types, such as a laser printer or a dye sublimation printer, for example.

What is claimed is:

1. An image processing device that executes deformation of an image, comprising:
   a candidate area setting unit that sets candidate areas, each of which includes a specific image, on a target image used as a target for a deformation process;
   an exclusion determination unit that, when there is a candidate area that partially extends off a cropped image that is clipped from the target image through predetermined cropping, excludes the candidate area, which at least partially extends off the cropped image, from the target for the deformation process; and
   a deformation processing unit that performs deformation of an image on the candidate areas other than the excluded candidate areas.

2. The image processing device according to claim 1, wherein the exclusion determination unit acquires information of a plurality of aspect ratios used for image output and excludes a candidate area, which at least partially extends off an image region that is common to cropped images clipped through cropping on the basis of the acquired aspect ratios, from the target for the deformation process.

3. The image processing device according to claim 1, wherein the exclusion determination unit excludes a candidate area, which at least partially extends off a cropped image that is clipped on the basis of a cropping command that is externally entered, from the target for the deformation process.

4. The image processing device according to claim 1, wherein the exclusion determination unit detects the inclination of each specific image on the target image and determines whether the detected inclination belongs to a predetermined angular range, and then excludes a candidate area, of which the inclination of the specific image falls outside the predetermined angular range, from the target for the deformation process.

5. The image processing device according to claim 1, wherein the exclusion determination unit, when the number of candidate areas exceeds a predetermined threshold, selects a candidate area of which the number falls within the predetermined threshold in accordance with the size of the specific image and excludes a non-selected candidate area from the target for the deformation process.

6. The image processing device according to claim 1, wherein the candidate area setting unit detects a face image from the target image as the specific image and sets a candidate area for each face image on the basis of the detected face image.

7. The image processing device according to claim 1, wherein the deformation processing unit arranges a plurality of dividing points in candidate areas, which serve as the target for deformation, divides each candidate area into a plurality of small areas using straight lines that connect the dividing points and performs deformation of an image in such a manner that at least one position of the dividing point is moved to deform the small areas.

8. The image processing device according to claim 1, further comprising:
   a printing unit that prints out the target image on which the image deformation is performed.

9. An image processing method that executes deformation of an image, comprising:
   setting candidate areas, each of which includes a specific image, on a target image used as a target for deformation process;
   when there is a candidate area that partially extends off a cropped image that is clipped from the target image through predetermined cropping, excluding the candidate area, which at least partially extends off the cropped image, from the target for the deformation process; and
   performing deformation of an image on the candidate areas other than the excluded candidate areas.

10. A non-transitory computer readable storage medium that stores an image processing program that causes a computer to execute a deformation process on an image, the program comprising instructions for:
   setting candidate areas, each of which includes a specific image, on a target image used as a target for deformation process;
   when there is a candidate area that partially extends off a cropped image that is clipped from the target image through predetermined cropping, excluding the candidate area, which at least partially extends off the cropped image, from the target for the deformation process; and
   performing deformation of an image on the candidate areas other than the excluded candidate areas.

* * * * *